US011520166B2

(12) United States Patent
Wright et al.

(10) Patent No.: US 11,520,166 B2
(45) Date of Patent: Dec. 6, 2022

(54) COSMETIC CONTACT LENS WITH REVERSIBLE EFFECTS

(71) Applicant: Johnson & Johnson Vision Care, Inc., Jacksonville, FL (US)

(72) Inventors: Dawn D. Wright, St. Augustine, FL (US); Ashley Nicholl Sever, Jacksonville, FL (US); Edmund Jolley, Jacksonville, FL (US); Anastasia P. Bergen, Jacksonville, FL (US); Shahrokh Shawn Zeinali, Jacksonville, FL (US); Robert Ryan Valdomar, Jacksonville, FL (US); Philippe F. Jubin, Fernandina Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 21 days.

(21) Appl. No.: 17/031,105

(22) Filed: Sep. 24, 2020

(65) Prior Publication Data

US 2022/0091436 A1     Mar. 24, 2022

(51) Int. Cl.
  *G02C 7/02*  (2006.01)
  *B41M 3/00*  (2006.01)
  *G02C 7/04*  (2006.01)

(52) U.S. Cl.
  CPC .............. *G02C 7/021* (2013.01); *B41M 3/003* (2013.01); *G02C 7/046* (2013.01); *G02C 7/048* (2013.01)

(58) Field of Classification Search
  CPC ......... G02C 7/027; G02C 7/081; G02C 7/088
  (Continued)

(56) References Cited

U.S. PATENT DOCUMENTS

2004/0061828 A1 *  4/2004  Newman ............... G02C 7/04
                                                351/159.03
2004/0156013 A1 *  8/2004  Lindacher ............. G02C 7/045
                                                351/159.41
(Continued)

FOREIGN PATENT DOCUMENTS

EP     1364248 B1     8/2015

OTHER PUBLICATIONS

PCT International Search Report, dated Nov. 18, 2021, for PCT Int'l Appln. No. PCT/IB2021/057953.

*Primary Examiner* — James R Greece
(74) *Attorney, Agent, or Firm* — Raef M. Shaltout

(57) ABSTRACT

A reversible eye enhancement contact lens comprises a main body comprising a first surface and a second surface opposite the first surface, the main body having a diameter, a base curve, a peripheral thickness, and a center thickness, wherein, one or more of the diameter, the base curve, the peripheral thickness, or the center thickness are configured such that a dSag is less than 1.3% when comparing a first orientation of the main body with at least a portion of the first surface abutting an eye of a wearer and a second orientation of the main body with at least a portion of the second surface abutting the eye of the wearer; the main body further comprising a first region corresponding to the scleral region of an eye; a second region corresponding to the limbal region of an eye; a third region corresponding to an iris region of an eye; wherein colorants are incorporated into the first region, the second region, the third region, or combinations thereof and configured to create a cosmetic design in the first orientation that is different than the cosmetic design in the second orientation. The cosmetic designs in the first and second orientations may differ in colorant, color, limbal design graphics, inner effect design graphics, outer effect design graphics, barrier layers, clear (Continued)

coat base layers, or combinations thereof. The colorants may comprise metal oxide pigments, coated metal oxide pigments, organic dyes, interference pigments, and combinations thereof.

51 Claims, 64 Drawing Sheets

(58) Field of Classification Search
USPC .................................................. 351/159.42
See application file for complete search history.

(56) References Cited

U.S. PATENT DOCUMENTS

| | | |
|---|---|---|
| 2016/0306189 A1 | 10/2016 | Bowers et al. |
| 2017/0276959 A1 | 9/2017 | Bowers |

* cited by examiner

1460

1560

1660

1760

1860

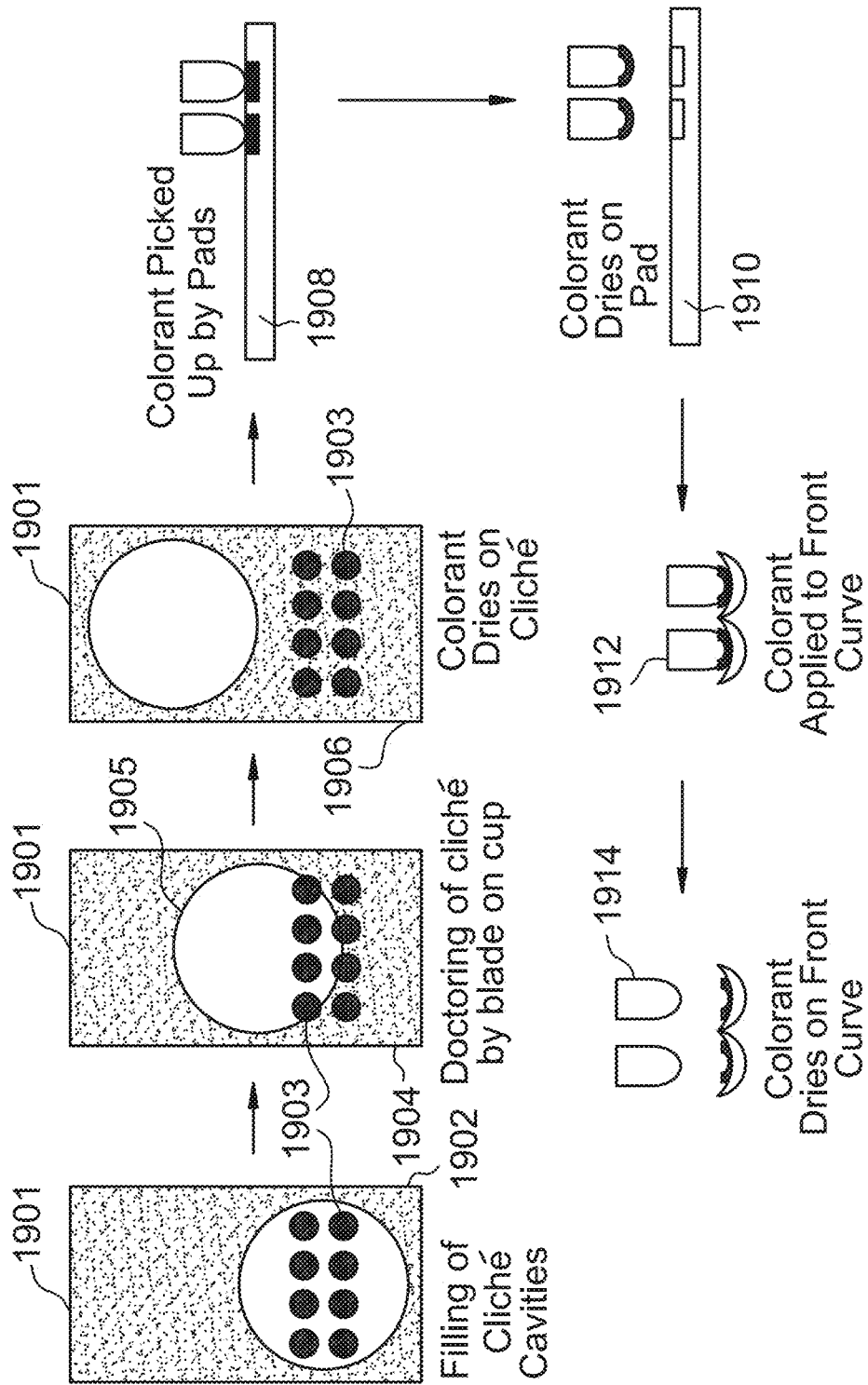

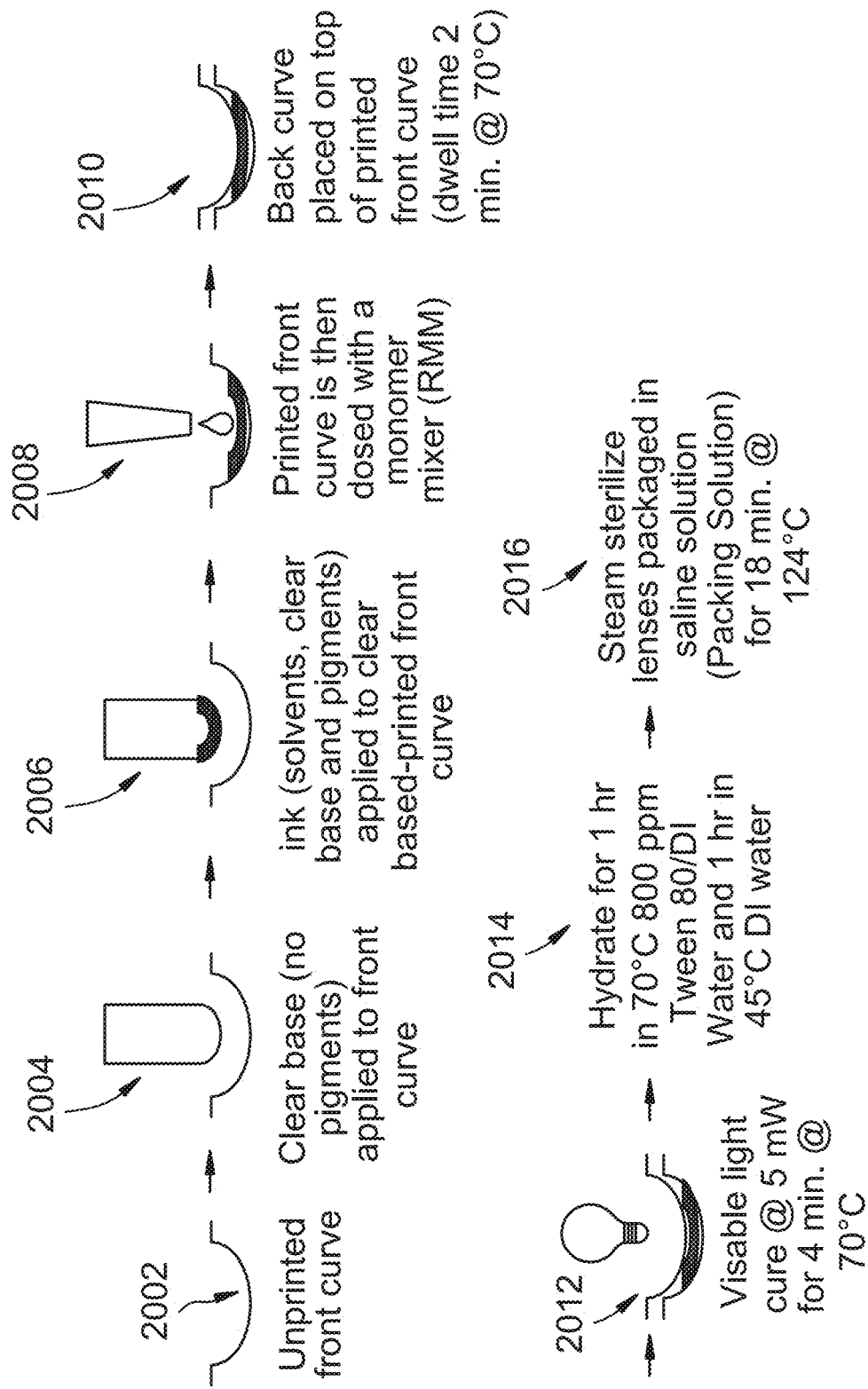

Primary

Primary

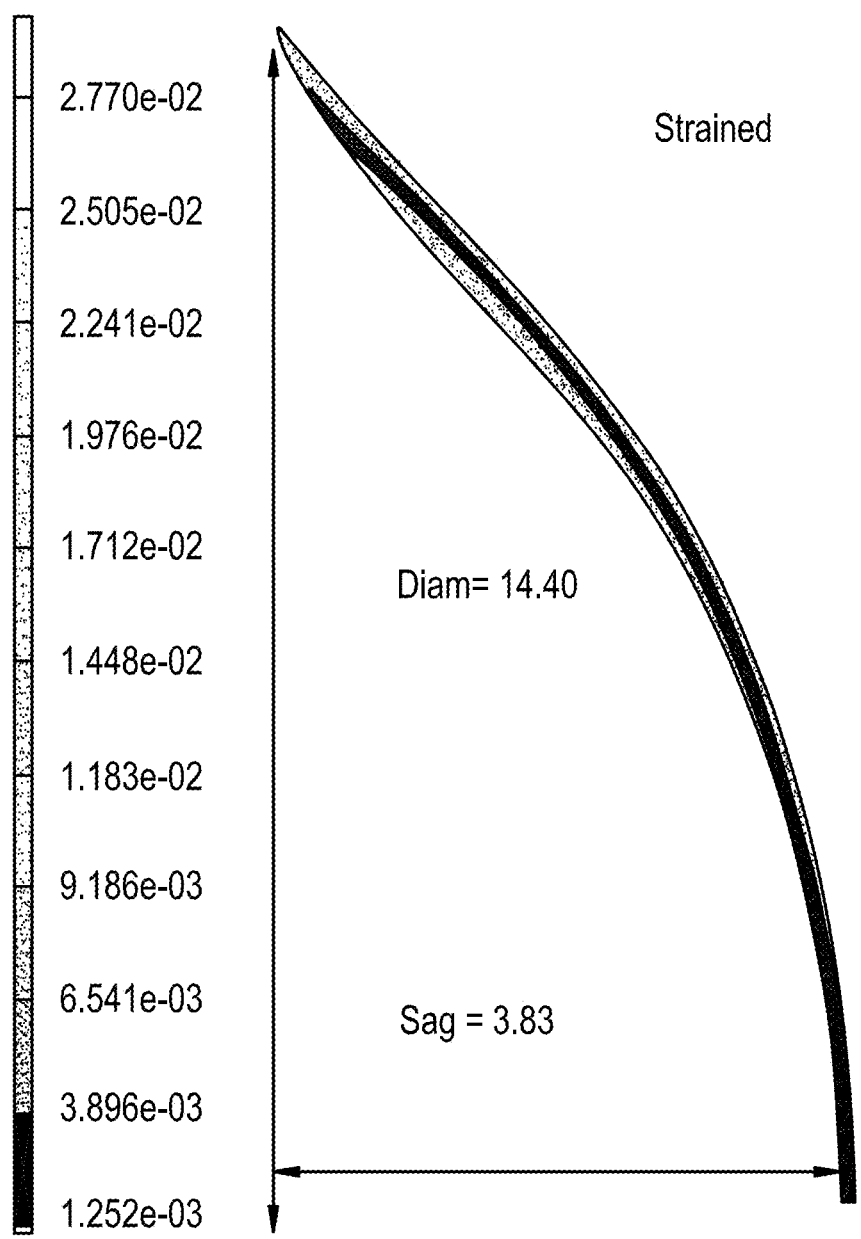

FIG. 30A

| | | | | | |
|---|---|---|---|---|---|
| RRV | 3180-84-01 | 3180-84-03 | 3180-84-04 | 3180-84-05 | 3180-84-06 |
| Ease of Telling I/O | 4 | 2 | 2 | 2 | 1 |
| Ease of Handling | 3 | 3 | 1 | 2 | 3 |
| RS | 3180-84-01 | 3180-84-03 | 3180-84-04 | 3180-84-05 | 3180-84-06 |
| Ease of Telling I/O | 4 | 2 | 1 | 2 | 3 |
| Ease of Handling | 3 | 3 | 2 | 3 | 4 |
| BDS | 3180-84-01 | 3180-84-03 | 3180-84-04 | 3180-84-05 | 3180-84-06 |
| Ease of Telling I/O | 3 | 1 | 1 | 2 | 2 |
| Ease of Handling | 2 | 2 | 1 | 2 | 2 |
| ALR | 3180-84-01 | 3180-84-03 | 3180-84-04 | 3180-84-05 | 3180-84-06 |
| Ease of Telling I/O | 4 | 3 | 1 | 1 | 3 |
| Ease of Handling | 4 | 4 | 2 | 3 | 3 |
| PYG | 3180-84-01 | 3180-84-03 | 3180-84-04 | 3180-84-05 | 3180-84-06 |
| Ease of Telling I/O | 4 | 3 | 1 | 1 | 1 |
| Ease of Handling | 4 | 3 | 1 | 3 | 3 |
| MC | 3180-84-01 | 3180-84-03 | 3180-84-04 | 3180-84-05 | 3180-84-06 |
| Ease of Telling I/O | 1 | 3 | 2 | 2 | 3 |
| Ease of Handling | 2 | 3 | 1 | 1 | 3 |

FIG. 30B

| GAR | 3180-84-01 | 3180-84-03 | 3180-84-04 | 3180-84-05 | 3180-84-06 |
|---|---|---|---|---|---|
| Ease of Telling I/O | 3 | 1 | 1 | 1 | 3 |
| Ease of Handling | 2 | 2 | 3 | 3 | 2 |
| GH | 3180-84-01 | 3180-84-03 | 3180-84-04 | 3180-84-05 | 3180-84-06 |
| Ease of Telling I/O | 4 | 1 | 1 | 2 | 1 |
| Ease of Handling | 4 | 3 | 3 | 3 | 3 |
| XW | 3180-84-01 | 3180-84-03 | 3180-84-04 | 3180-84-05 | 3180-84-06 |
| Ease of Telling I/O | 2 | 3 | 2 | 3 | 1 |
| Ease of Handling | 4 | 4 | 2 | 3 | 3 |
| YL | 3180-84-01 | 3180-84-03 | 3180-84-04 | 3180-84-05 | 3180-84-06 |
| Ease of Telling I/O | 4 | 4 | 1 | 4 | 4 |
| Ease of Handling | 4 | 1 | 4 | 4 | 4 |
| TM | 3180-84-01 | 3180-84-03 | 3180-84-04 | 3180-84-05 | 3180-84-06 |
| Ease of Telling I/O | 4 | 3 | 1 | 2 | 2 |
| Ease of Handling | 3 | 3 | 1 | 2 | 2 |
| SP | 3180-84-01 | 3180-84-03 | 3180-84-04 | 3180-84-05 | 3180-84-06 |
| Ease of Telling I/O | 4 | 2 | 1 | 3 | 4 |
| Ease of Handling | 3 | 1 | 3 | 3 | 3 |
| VK | 3180-84-01 | 3180-84-03 | 3180-84-04 | 3180-84-05 | 3180-84-06 |
| Ease of Telling I/O | 4 | 1 | 1 | 1 | 1 |
| Ease of Handling | 3 | 3 | 1 | 3 | 3 |

LD-USZ231+0000 - no Wrap

— Primary
-- Inverted

LD-USZ231+0000 - no Wrap

— Primary
-- Inverted

LD-USZ231+0000 - Wrapped

LD-USZ231+0000 - Wrapped

LD-USZ231-0400 - no Wrap

LD-USZ231-0400 - no Wrap

LD-USZ231-0400 - Wrapped

LD-USZ231-0400 - Wrapped

LD-USZ231+0400 - no Wrap

LD-USZ231+0400 - no Wrap

LD-USZ231+0400 - Wrapped

LD-USZ231+0400 - Wrapped

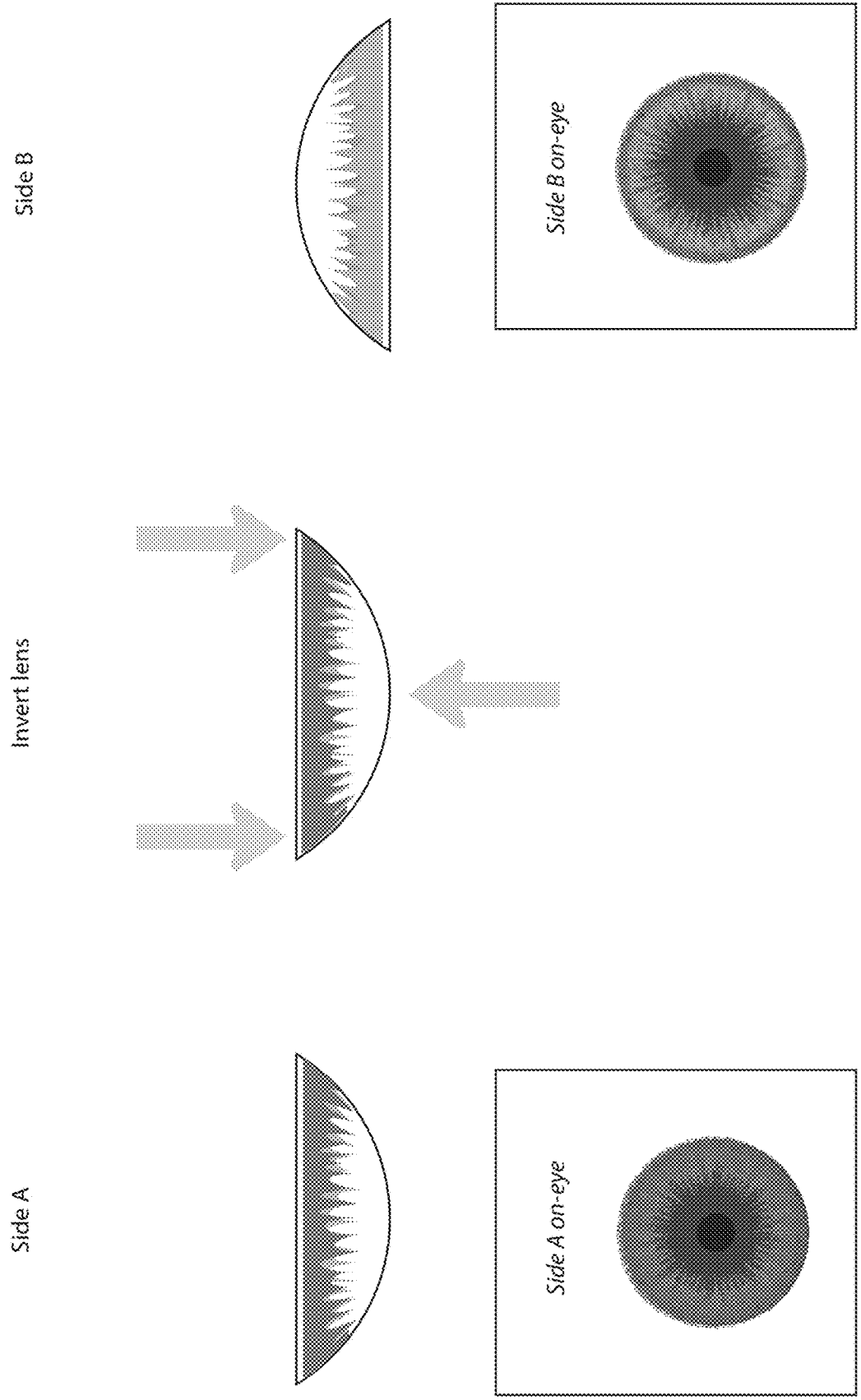

COSMETIC CONTACT LENS WITH REVERSIBLE EFFECTS

BACKGROUND OF THE INVENTION

1. Field of the Invention

The present invention relates to ophthalmic lenses, and more particularly to cosmetic contact lenses that are reversible, thereby providing different enhancements to the eyes' appearance depending on if worn in the non-inverted or inverted orientation. Such a reversible cosmetic contact lens is made by incorporating multiple effect layers with different patterns, degrees of overlap, and levels of opacity from a variety of dyes, pigments, and tints into a contact lens mechanically designed for comfort in the non-inverted and inverted orientations. By minimizing the differences in diameter, base curve, center thickness, and/or peripheral thickness between the non-inverted and inverted contact lenses, a comfortable, reversible cosmetic contact lens can be fabricated. The reversible cosmetic contact lens also comprises at least one annular shaped clear layer to encapsulate the multiple effect layers and provide high quality optics in the optical zone of the lens. Although any colorant can be used, the reversible cosmetic contact lens may also incorporate pearlescent pigments in one or more regions to create a shiny, radiant and iridescent appearance in either the non-inverted or inverted orientation or in both orientations.

2. Discussion of the Related Art

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability values and are generally more comfortable to wear than the contact lenses made of the earlier hard materials. Rigid gas permeable hard contact lenses, on the other hand, are made from siloxane-containing polymers but are more rigid than soft contact lenses and thus hold their shape and are more durable.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a transparent or translucent tint that is meant to enhance one's natural eye color, the color tint contact lens comprises an opaque tint meant to change one's eye color, and the light filtering tint contact lens functions to enhance certain colors while muting others. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Current contact lens designs are intended to fit in one orientation, and hence, the disparity between primary (non-inverted), e.g., having a defined inside surface for contact with the eye, and inverted orientations is maximized to prevent confusion between correct and incorrect orientation during insertion onto the eye. Therefore, the lens fit, vision, and comfort are negatively impacted when the lens is used in its inverted orientation.

EP1364248B1 describes a soft contact lens for fitting to an eye of a wearer in either a right way out (non-inverted) orientation or in an inside out (inverted) orientation, wherein in said right way out (non-inverted) orientation there is provided an anterior convex surface and a posterior concave surface and in said inside out (inverted) orientation said right way out (non-inverted) anterior convex surface is converted to a posterior concave surface and said right way out (non-inverted) posterior concave surface is converted to a convex anterior surface. In accordance with EP1364248B1, said conversion is affected by flexing of the lens, wherein said lens flexure is accommodated by at least one formation resulting in an adjustment to a surface contour of either of said first and second surfaces. According to EP1364248B1, the natural resistance to being inside out (inverted) and the abstract and uncontrolled curvature changes that occur as a result may be reduced or eliminated by the relieving areas placed within the lens.

Cosmetic contact lenses may comprise patterns composed of one or more elements that completely, or more preferably, partially overlie the wearer's iris. These lenses may also comprise a limbal ring. A limbal ring is essentially an annular band of color that when the lens is on the eye and centered, partially or completely overlies the lens wearer's limbal region which is the junction of the sclera and the cornea. The inclusion of a limbal ring may make the iris appear larger, darker and/or more defined. The combination of the limbal ring and an iris pattern makes the appearance of the lens on eye more natural. In other words, an iris pattern allows the limbal ring to blend in naturally with the wearer's eyes and the combination of an iris pattern and a limbal ring creates blending, depth, contrast and definition.

Other cosmetic contact lenses focus on the sclera rather than or in addition to the iris. For example, a contact lens may comprise a brightly colored peripheral portion, i.e. outside of the iris region, that may be opaque, semi-opaque and/or translucent. The bright portion may extend from the edge of the limbus to the edge of the contact lens creating the impression of a brighter or whiter sclera. These contact lenses may also include a limbal ring which as stated above, may make the iris appear larger, darker and/or more defined than it would otherwise.

While the above described cosmetic contact lenses do enhance eye appearance, there exists a need in the cosmetic lens area for lenses comprising designs to imply and demonstrate depth within a given pattern, to create variations within the iris region, to alter the color of the iris, to enlarge the iris, and to create negative space to allow the natural iris to contribute to the effect of the overall design.

In addition, cosmetic contact lens wearers may also want to change the type of lens they are wearing in order to change the effect, for example the color or design. This change may be more often than once a day. This would normally require access to a new set of contact lenses which may be expensive and/or time consuming. Accordingly, there exists a need for a single contact lens that provides for multiple effects. In other words, there exists a need for a reversible cosmetic contact lens that has two different eye enhancing effects depending on which way it is worn, non-inverted or inverted. Moreover, there exists a need for such a reversible cosmetic contact lens to be comfortable in both non-inverted and inverted orientations.

SUMMARY OF THE INVENTION

The cosmetic contact lens with reversible effects of the present invention overcomes the limitations associated with the prior art as briefly described above.

Cosmetic contact lenses may be designed to alter the appearance of the eyes upon which they are worn in any number of ways, including the color of the entire eye and/or different regions of the eye. While not a requirement, cosmetic contact lenses may also be utilized to correct refractive error. Cosmetic contact lenses may also have a direct medical application. For example, cosmetic contact lenses may be utilized to restore the appearance of a damaged eye. Cosmetic contact lenses may include transparent, translucent, opaque-color enhancements or tints. Tints may include organic/inorganic pigments, dyes or special effect pigments. Printed regions on the contact lens may include the iris region (iris patterns), the limbal region (limbal rings), the scleral region (sclera brightening), or any combination thereof. In addition, patterns may be continuous, intermittent or any combination thereof.

The present invention relates to cosmetic contact lenses that are reversible, thereby providing different enhancements to the eyes' appearance depending on if worn in the non-inverted or inverted orientation. Such a reversible cosmetic contact lens is made by incorporating multiple effect layers or design elements with different patterns, degrees of overlap, and levels of opacity from a variety of dyes, pigments, and tints into a contact lens mechanically designed for comfort in the non-inverted and inverted orientations. By minimizing the differences in diameter, base curve, center thickness, and/or peripheral thickness between the non-inverted and inverted contact lenses, a comfortable, reversible cosmetic contact lens can be fabricated. The reversible cosmetic contact lens also comprises at least one annular shaped clear layer to encapsulate the multiple effect layers and provide high quality optics in the optical zone of the lens. The reversible cosmetic contact lens may also incorporate pearlescent pigments in one or more regions to create a shiny, radiant and iridescent appearance in either the non-inverted or inverted orientation or in both orientations The reversible cosmetic contact lenses of the present invention utilize multiple effect layers to achieve unique visual appearances in the non-inverted and inverted orientations. The multi-layer design may be utilized to enhance and/or highlight the appearance of the eyes upon which the contact lenses are positioned while maintaining a natural look. These exemplary designs may comprise three layers; namely, a unique limbal design graphic, a unique inner effect graphic and a unique outer effect graphic. The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture may be utilized to create variation in the iris. As used in two-dimensional art, texture is created by the juxtaposition of light and dark features. Light and dark elements, as well as overlapping elements, may also be utilized to imply depth and form. In order to provide different eye enhancements in the non-inverted and inverted orientations, the multi-effect layers may also be augmented with a barrier layer that may be continuous, intermittent or any combination thereof that restricts an effect (color or graphical pattern) to either the non-inverted or inverted orientation only. The efficiency of the barrier layer depends on its location and opacity and may fully or partially exclude an effect in one orientation or another.

The reversible cosmetic contact lenses of the present invention may comprise any of the above described multi-effect layers with the incorporation of pearlescent pigments to add a shiny, radiant and iridescent appearance to a wearer's eyes. The pigments may be added to any region of the lens, including the regions overlying the iris and/or the sclera. For example, if they are utilized in the region overlying the sclera, the combination or incorporation of pearlescent pigments will result in a brighter white sclera region that has a wet reflective appearance and which also looks natural. The incorporation of pearlescent pigments does not have any significant impact on the cosmetic contact lens manufacturing process; accordingly, a natural and shiny appearance may be achieved without significant changes.

The present disclosure relates to reversible cosmetic contact lenses and methods for designing and optimizing the same, for example, by in-silico performance analysis and prototyping. As an example, the peripheral region of the lens can be designed in such a way that the disparity in base curve and diameter between the primary (non-inverted) and the inside-out (inverted) orientations is minimized. The impact of peripheral thickness on this disparity, depends on lens diameter, base curve, and center thickness which have to be optimized along with the peripheral thickness for the best performance. When the lens base curve and diameter are comparable between the primary (non-inverted) and the inside-out (inverted) orientations, the on-eye fit, comfort, and vision performance are expected to be comparable.

Lens base curve and diameter may be identified as determining factors of inverted fit. In accordance with the present disclosure, one or more of the base curve and diameter of a lens may be configured between primary (non-inverted) and inside-out (inverted) orientations. Hence, the peripheral region of the lens may be designed in such a way that deviation in diameter or sagittal depth (dDiam or dSag) between primary (non-inverted) and inside-out (inverted) orientation is minimized. Moreover, the impact of peripheral thickness may depend on lens diameter, base curve, and center thickness. One or more of lens diameter, base curve, and center thickness may be optimized for best performance.

In particular, the reversible cosmetic contact lens of the present invention may comprise a main body comprising a first surface and a second surface opposite the first surface, the main body having a diameter, a base curve, a peripheral thickness, and a center thickness, wherein, one or more of the diameter, the base curve, the peripheral thickness, or the center thickness are configured such that a dSag is less than 1.3% when comparing a first orientation (non-inverted) of the main body with at least a portion of the first surface abutting an eye of a wearer and a second orientation (inverted) of the main body with at least a portion of the second surface abutting the eye of the wearer.

Alternatively, the reversible cosmetic contact lens of the present invention may comprise a main body comprising a first surface and a second surface opposite the first surface, the main body having a diameter, a base curve, a thickness profile, and an edge profile, wherein, the edge profile and one or more of the diameter, the base curve, or the thickness profile are configured such that an apex height measured from an edge apex to a nearest surface of the eye is less than or equal to 0.020 millimeters when the lens is in an inverted orientation with at least a portion of the second surface abutting the eye of the wearer.

Methods for making reversible cosmetic contact lenses are disclosed.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 19 is a diagrammatic representation of a generalized pad printing process.

FIG. 20 is a diagrammatic representation of a more detailed pad printing process.

FIGS. 29A-29B illustrate strain modeling of a soft contact lens in accordance with the present invention (e.g., with optimized peripheral thickness), where the lens is in a primary orientation (FIG. 29A) and inverted or inside-out orientation (FIG. 29B).

FIGS. 30A-30B shows a listing of the ratings of a survey of fourteen (14) subjects.

FIG. 40 illustrates the change in cosmetic design that occurs with inversion of a reversible contact lens.

DETAILED DESCRIPTION OF THE PREFERRED EMBODIMENTS

Figure 1:
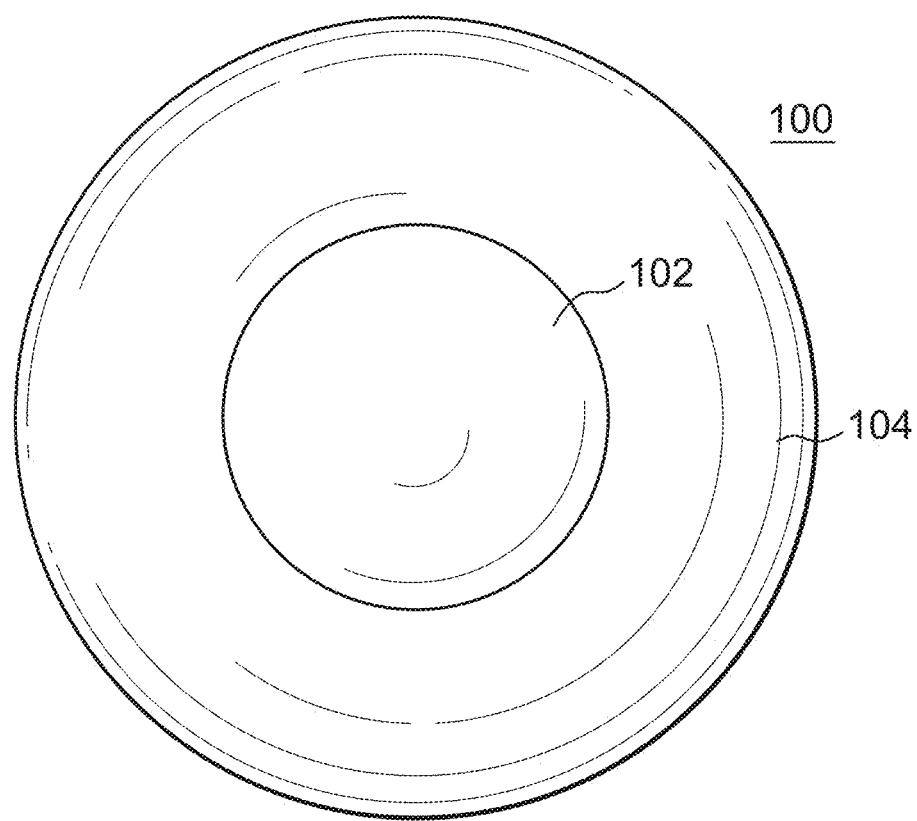
FIG. 1 is a plan view of an exemplary non-cosmetic contact lens.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

The present invention relates to cosmetic contact lenses that are reversible, thereby providing different enhancements to the eyes' appearance depending on if worn in the non-inverted or inverted orientation. Such a reversible cosmetic contact lens is made by incorporating multiple effect layers with different patterns, degrees of overlap, and levels of opacity from a variety of dyes, pigments, and tints into a contact lens mechanically designed for comfort in the non-inverted and inverted orientations. By minimizing the differences in diameter, base curve, center thickness, and/or peripheral thickness between the non-inverted and inverted contact lenses, a comfortable, reversible cosmetic contact lens can be fabricated. The reversible cosmetic contact lens also comprises at least one annular shaped clear layer to encapsulate the multiple effect layers and provide high quality optics in the optical zone of the lens. The reversible cosmetic contact lens may also incorporate pearlescent pigments in one or more regions to create a shiny, radiant and iridescent appearance in either the non-inverted or inverted orientation or in both orientations The reversible cosmetic contact lenses of the present invention utilize multiple effect layers to achieve unique visual appearances in the non-inverted and inverted orientations. The multi-layer design may be utilized to enhance and/or highlight the appearance of the eyes upon which the contact lenses are positioned while maintaining a natural look. These exemplary designs may comprise three layers; namely, a unique limbal design graphic, a unique inner effect graphic and a unique outer effect graphic. The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture may be utilized to create variation in the iris. As used in two-dimensional art, texture is created by the juxtaposition of light and dark features. Light and dark elements, as well as overlapping elements, may also be utilized to imply depth and form. In order to provide different eye enhancements in the non-inverted and inverted orientations, the multi-effect layers may also be augmented with a barrier layer that may be continuous, intermittent or any combination thereof that restricts an effect (color or graphical pattern) to either the non-inverted or inverted orientation only. The efficiency of the barrier layer depends on its location and opacity and may fully or partially exclude an effect in one orientation or another.

Multi-Effects Layers

Referring now to FIG. 1, there is illustrated a plan view of an exemplary non-cosmetic contact lens 100. The contact lens 100 comprises an optic zone 102, a peripheral zone 104 surrounding the optic zone 102, a back curve surface designed to make contact with an individual's eye when worn and a front curve surface opposite the back curve surface. The optic zone 102 is the portion of the contact lens 100 through which vision correction may be obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended.

The lens 100 illustrated in FIG. 1 is circular but may be any convenient shape for a contact lens, such as an elliptical or truncated circular shape. In addition to being round or non-round, the contact lens 100 may be planar or non-planar.

A cosmetic contact lens is designed to enhance or alter the appearance of the eye upon which it is worn. While not a requirement, cosmetic contact lenses may also be utilized for the correction of refractive error. In addition, cosmetic contact lenses may also have direct medical application, for example, to restore the appearance of a damaged eye. Individuals who suffer from aniridia, the absence of an iris, dyscoria, damage of the iris, and/or arcus senilis or arcus senilus corneae, a disorder that lightens or discolors the limbus area, may utilize colored contact lenses that will give the appearance of a complete iris. Cosmetic contact lenses may include translucent/transparent color enhancement, tint, opaque color tint, artificial iris patterns, limbal rings, sclera brightening tints and/or any combination of the above.

More specifically, cosmetic contact lenses may be utilized to brighten the sclera and/or have a pattern that includes a limbal ring that serves to enhance the definition of the wearer's iris resulting in the iris appearing larger to viewers of the lens wearer. Additionally, cosmetic contact lenses may have additional pattern elements that completely or, preferably, partially overlie the wearer's iris. The cosmetic lenses may be utilized for enhancing a dark-eyed individual's iris, but also may be used to enhance the iris of a light-eyed lens wearer as well.

Figure 2:
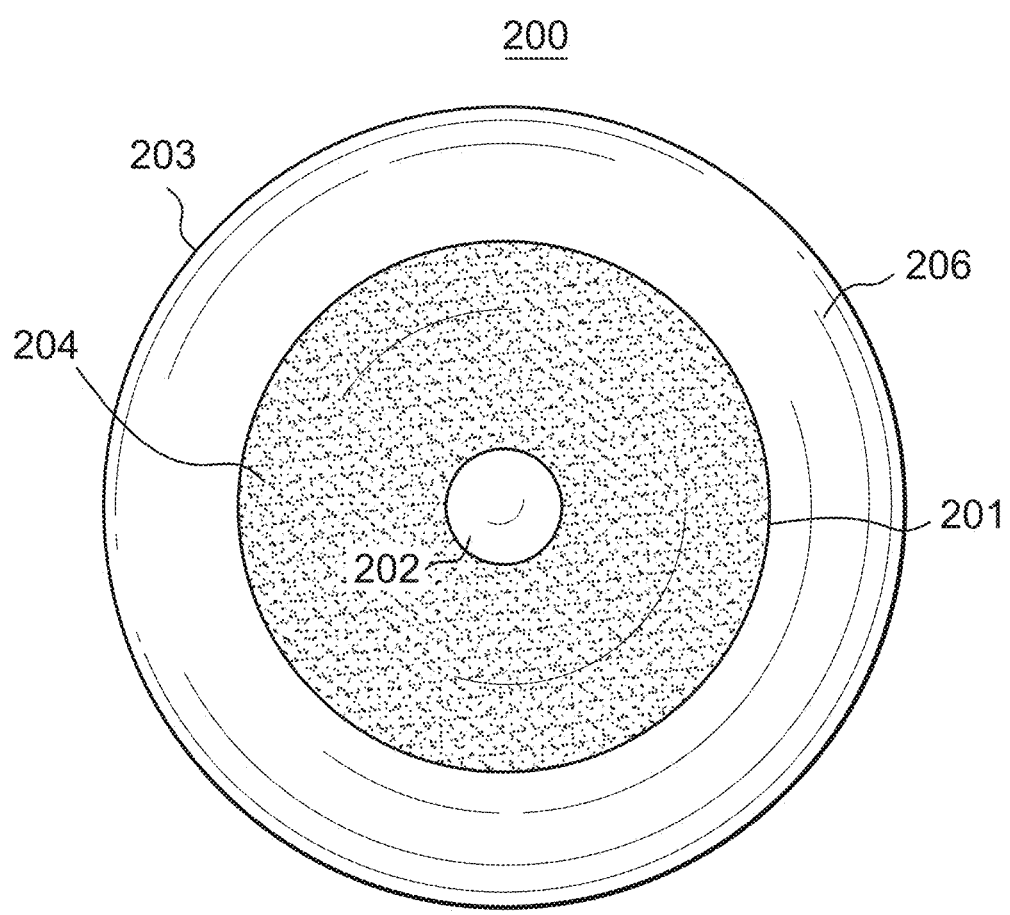
FIG. 2 is a plan view of a first exemplary cosmetic contact lens.

Referring to FIG. 2, there is illustrated a first exemplary cosmetic contact lens 200. While this lens 200 comprises an optic zone and a peripheral zone within the meaning set forth above with respect to the contact lens 100 of FIG. 1, different terms are utilized to describe the various regions of a cosmetic contact lens. The cosmetic contact lens 200 comprises a center region 202 that is sized to substantially correspond to the size and location of an individual pupil. The center region 202 typically has no coloring or design so as not to interfere with visual acuity. A central portion 204 surrounds the center region 202 and is sized to substantially correspond to the size and location of an individual's iris. The central portion 204 may comprise one or more colors and/or a pattern formed by one or more colors to enhance the appearance of the wearer's iris. Disposed about the central portion 204 and extending to the surrounding edge of the contact lens 200 is a peripheral portion 206. The peripheral portion 206 comprises an annular shape with an inner diameter measured from point 201 and an outer diameter measured from point 203 which may but need not necessarily coincide with the outer edge of the contact lens 200 as a whole. The peripheral portion 206 may be colored with a bright color, for example, white, near white, off white, light yellow, pale blue, light pink, light green or any combination of the above. The bright colors are disposed so as to blend gradually with the wearer's sclera.

The peripheral portion 206 is colored to enhance the appearance of the sclera. The coloring of the peripheral portion 206 may be opaque, translucent, or somewhere between the two, or semi-opaque. Exemplary embodiments enhance the appearance of the sclera by providing the sclera with a refreshed, natural appearance. Opaque as utilized herein shall be understood to mean a color that permits an average light transmittance in the 380 to 780 nm range of 0 to about 50 percent, and preferably 7 to about 50 percent. Translucent as utilized herein shall be understood to mean a color that permits an average light transmittance in the 380 to 780 nm range of about 50 to about 85 percent, and preferably from about 65 to about 85 percent.

Figure 3:
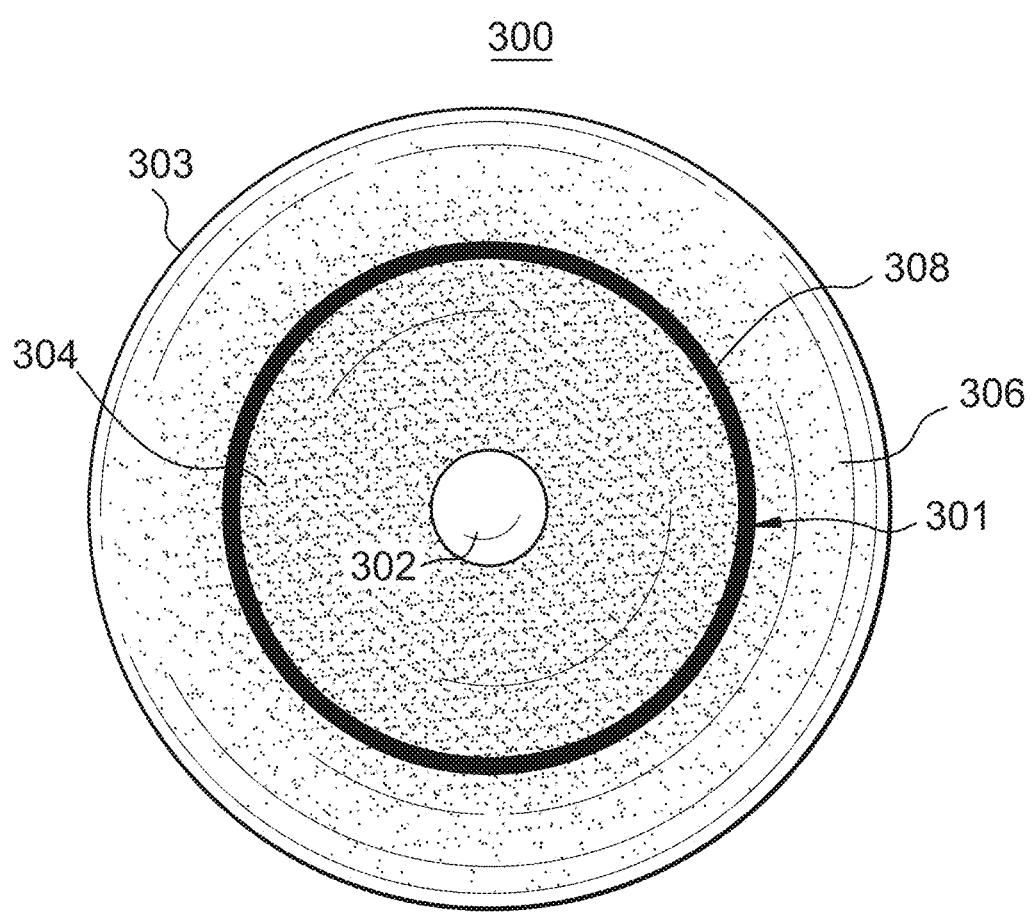
FIG. 3 is a plan view of a second exemplary cosmetic contact lens.

FIG. 3 illustrates a second exemplary cosmetic contact lens 300. The cosmetic contact lens 300 comprises a center region 302, a central portion 304 that surrounds the center region 302, a peripheral portion 306 that surrounds the central portion 304 and a limbal ring 308. As set forth herein, a limbal ring is essentially an annular band of color that, when the lens is on the eye and centered, partially or completely overlies the lens wearer's limbal region. In some exemplary embodiments, a limbal ring may be larger to create a halo effect. In this exemplary embodiment, the coloring in the peripheral portion 306 is or may be graduated from opaque to translucent or transparent from the inner diameter measured from point 301 to the outer diameter measured from point 303. As in the previously described exemplary embodiment, the central portion 304 may comprise one or more colors and/or a pattern formed by one or more colors to enhance the appearance of the wearer's iris. This combination provides the most natural iris along with the contrast of a dark limbal ring, while providing the additional benefit of a bright coloring applied in the peripheral portion 306. The limbal ring 308 may be of any suitable width or pattern that allows the ring 308 to blend naturally with the iris, the central portion coloring/pattern 304 and the bright colored peripheral portion 306. The limbal ring 308 may be translucent or opaque.

Figure 4:
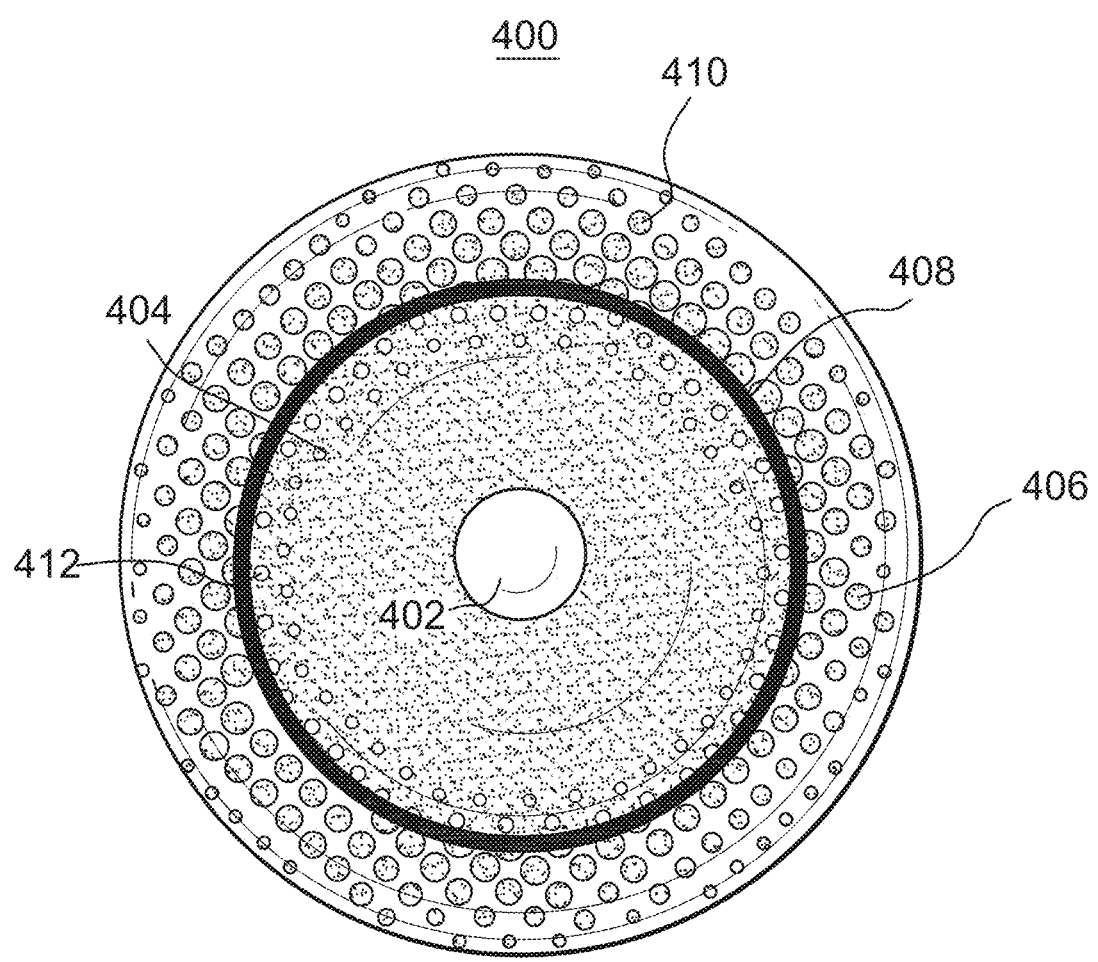
FIG. 4 is a plan view of a third exemplary cosmetic contact lens.

FIG. 4 illustrates a third exemplary cosmetic contact lens 400 with a bright coloring in the peripheral portion 406 applied in the form of a geometric pattern. The cosmetic contact lens 400 comprises a center region 402, a central portion 404 that surrounds the center region 402, the peripheral portion 406 that surrounds the central portion 404 and a limbal ring 408. The difference between the contact lens of FIGS. 3 and 4 lies in the geometric pattern in the peripheral portion 406. In this exemplary cosmetic lens 400, the geometric pattern takes on the appearance of circles 410 removed from the lens surface that would otherwise be colored white, so that each circle 410 touches its neighboring circle 410 at a tangent proximate the limbal ring 408 and separates at the extreme outer diameter of the pattern in order to blend with the natural sclera. In a preferred embodiment, the sclera print, the region corresponding to the peripheral portion 406 goes from opaque at the limbal edge to a matrixed pattern to blend with the natural sclera. While this exemplary embodiment utilizes circles 410 as the geometric shape, it is important to note that any geometric shape may be utilized. It may also be thought of as rows and columns of cross shaped brightly colored structures formed by the circles 410. As illustrated, circles 412 may also extend into the pattern in the central portion 404.

Figure 5:
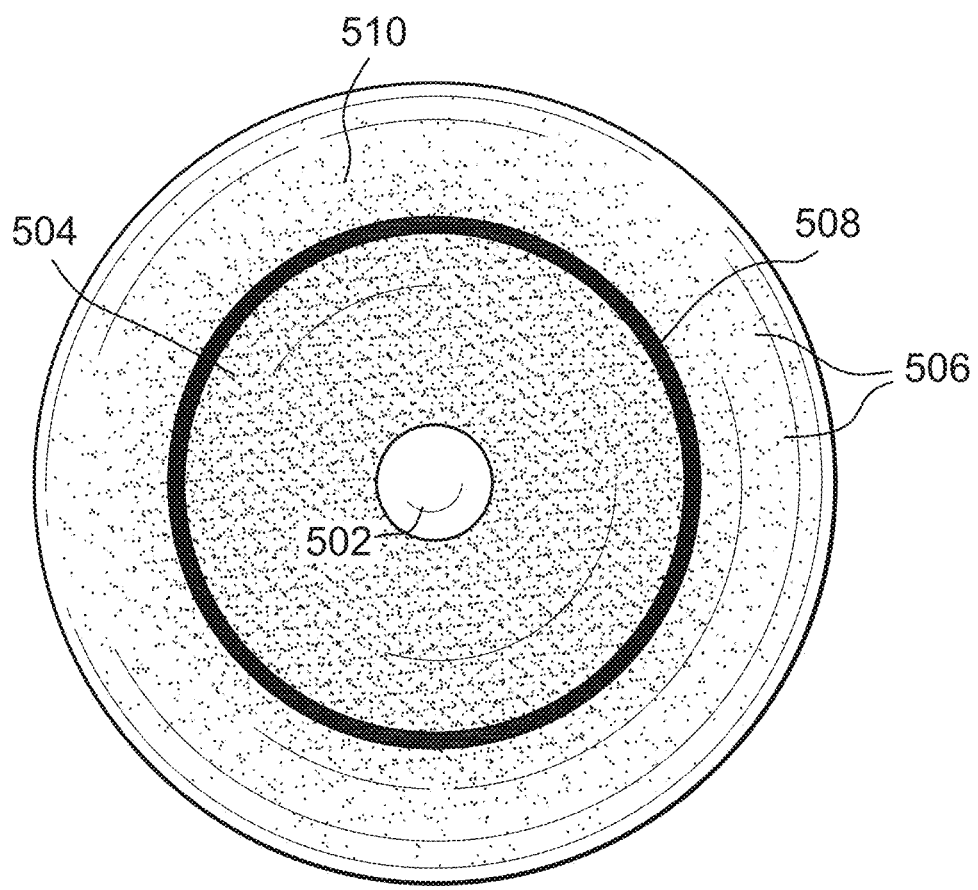
FIG. 5 is a plan view of a fourth exemplary cosmetic contact lens.

Patterning comprising geometric shapes may be formed from regularly shaped structures as described above with respect to FIG. 4, or from a plurality of random dots or shapes 510 which are in both the central portion 504 and the peripheral portion 506 of a cosmetic contact lens 500 as illustrated in FIG. 5. The central region 502 and the limbal ring 508 do not have patterns in this exemplary contact lens 500, for example, no spokes or blending. Any convenient shapes for conveying a realistic or enhanced sense of color may be utilized, particularly, where such geometric shapes contribute to a desired hue or shade. The dots utilized may comprise any size and shape. Dots aid in blending of the boarders of the different elements of the cosmetic contact lenses.

In accordance with other exemplary embodiments, a cosmetic lens may comprise a limbal ring and a plurality of tapered spokes. As set forth above, a limbal ring is an annular band of color that, when the lens is on-eye and centered, partially or substantially completely overlies the lens wearer's limbal region, or the junction of the sclera with the cornea. Preferably, the limbal ring substantially completely overlies the limbal region. The innermost border or edge closest to the geometric center of the lens, of the limbal ring may form a circle having a diameter of about 8 mm to about 12 mm, preferably about 9 to about 11 mm, the circle being centered at the lens' geometric center. The ring may be of any suitable width and preferably is about 0.5 to about 2.5 mm in width, more preferably about 0.75 to about 1.25 mm in width.

Extending inwardly from the innermost border of the limbal ring toward the geometric center of the lens are substantially triangular-shaped structures that resemble spokes in a wheel. The tapered spokes may, but preferably do not, extend over the entire iris portion of the lens, meaning the portion of the lens that overlies the iris when the lens is on-eye and centered. Rather, preferably the spokes extend inwardly from the innermost edge of the limbal ring so that the innermost edge of the spoke pattern is located at about 6 mm or more, more preferably about 7 mm or more from the geometric center of the lens. The spokes may be of uniform or varying shapes and sizes and preferably are about 1 to about 2 mm in length.

Figure 6:
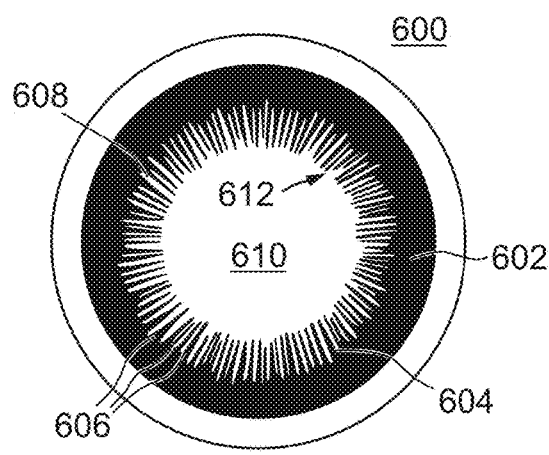
FIG. 6 is a plan view of a first exemplary limbal ring/spoke pattern cosmetic contact lens.

In FIG. 6, there is illustrated a first exemplary embodiment of the limbal ring-tapered spoke pattern on a contact lens 600. In this exemplary embodiment, the limbal ring 602 is a black opaque band that is approximately 1 mm in width. Beginning at the innermost border 604 of the limbal ring 602 and extending inwardly towards the geometric center of the contact lens 600 are a plurality of randomly arranged tapered spokes 606, the innermost border 612 of which forms a circle with a diameter of 7 mm as measured from the geometric center of the contact lens 600. Although all of the spokes 606 are generally similarly configured, preferably no one of the spokes 606 is exactly the same as another of the spokes 606. The spokes 606 are interspersed, or bordered, by spaces 608 in which spaces there are no elements. Spaces 608 are also generally all similarly configured, but preferably no one of the spaces 608 is of the exact same configuration as any of the other of the spaces 608 or spokes 606. Area 610 is a region in which there are no pattern elements, which area as shown will partially compose the iris portion of the wearer's eye as well as the whole of the pupil portion of the wearer's eye, or portion of the lens that overlies the wearer's pupil while the lens is on-eye and centered. As shown, area 610 is clear, but it may be translucently or opaquely colored as well. Innermost border 604 as shown is of an even, regular shape, but may be an uneven, irregular border. Similarly, although tapered spoke border 612 forms a substantially even border, it may form an uneven border.

Figure 7:
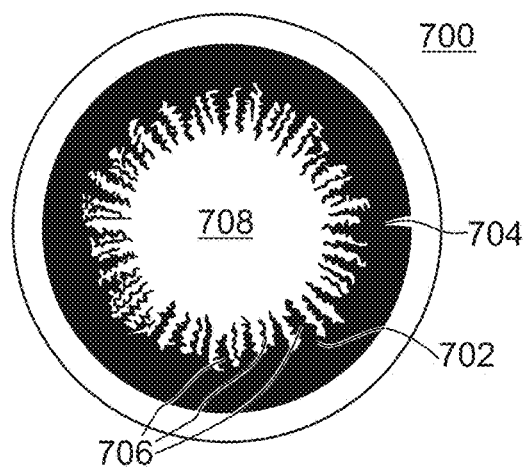
FIG. 7 is a plan view of a second exemplary limbal ring/spoke pattern cosmetic contact lens.

FIG. 7 illustrates an alternate tapered spoke pattern on a contact lens 700. In this exemplary embodiment, beginning at the innermost border 702 of the limbal ring 704 and extending inwardly towards the geometric center of the contact lens 700 is a plurality of randomly arranged tapered spokes 706. In this exemplary embodiment, tapered spokes 706 comprise one or more wavy lines that taper as one moves toward the geometric center of the contact lens 700. The innermost limbal ring border 702, as illustrated, is of an uneven, irregular shape. Area 708 is a region in which there are no pattern elements, which area will partially compose the iris portion of the wearer's as well as the whole of the pupil portion of the wearer's eye as described above.

Figure 8:
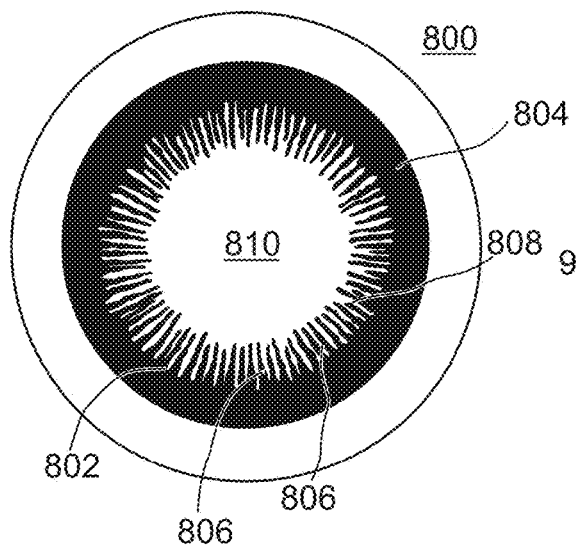
FIG. 8 is a plan view of a third exemplary limbal ring/spoke pattern cosmetic contact lens.

FIG. 8 illustrates yet another tapered spoke pattern on a contact lens 800. In this exemplary embodiment, beginning at the innermost border 802 of the limbal ring 804 and extending inwardly to the geometric center of the contact lens 800 are a plurality of spokes 806 and 808, with spokes 806 being longer than spokes 808 and both of which spokes 806, 808 are formed by wavy lines. As shown, spokes 806 and 808 are spaced at substantially regular intervals from one another but may be irregularly spaced as well. Additionally, each of the spokes 806 are all of the substantially same shape, but they may be of differing shapes as may be the case for spokes 808. Area 810 is a region in which there are no pattern elements, which area will partially compose the iris portion of the wearer's eye as well as the whole of the wearer's pupil as described above.

Figure 9:
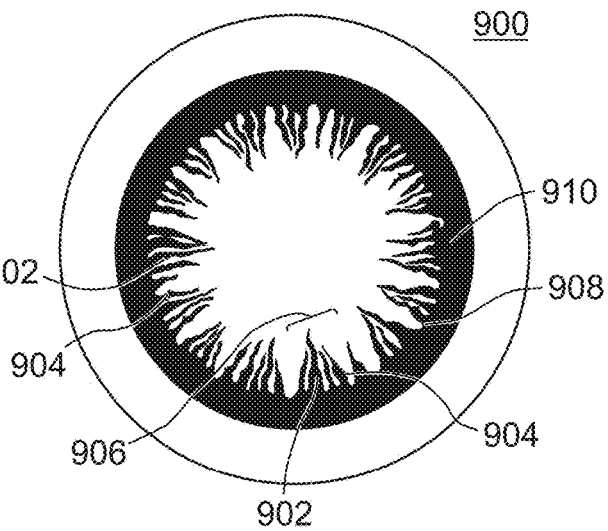
FIG. 9 is a plan view of a fourth exemplary limbal ring/spoke pattern cosmetic contact lens.

FIG. 9 illustrates still another exemplary tapered spoke pattern on a contact lens 900, which is a variation of the pattern illustrated in FIG. 8. In this exemplary embodiment, the spoke pattern has multiple spokes 902 and 904, with spokes 902 being longer than spokes 904, and both of which spokes 902, 904 are formed by wavy lines. As shown, spokes 902 and 904 are randomly grouped together to form clusters 906. These clusters 906 extend from the inner most radius 908 of limbal ring 910.

Figure 10:
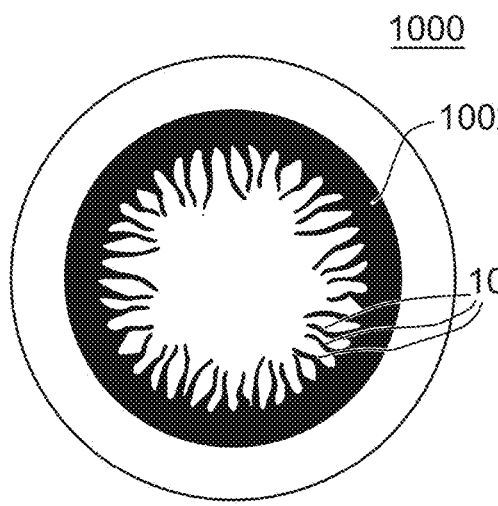
FIG. 10 is a plan view of a fifth exemplary limbal ring/spoke pattern cosmetic contact lens.

FIG. 10 illustrates an exemplary tapered spoke pattern on a contact lens 1000 in which there is a limbal ring 1002 and extending inwardly therefrom are a plurality of randomly spaced spokes 1004. In this exemplary embodiment, the spokes 1004 are bent at one or more locations.

In all of the patterns described with respect to FIGS. 6-10, the spokes may extend inwardly to the geometric center of the lens. Preferably, however, the innermost border of the spokes, or edge relative to the geometric center of the lens, is located at about 6.5 mm or greater, preferably about 7 mm or greater from the geometric center of the lens.

Figure 11:
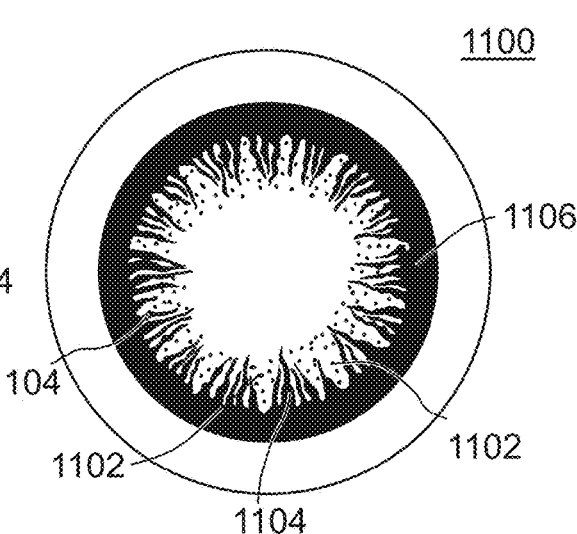
FIG. 11 is a plan view of a sixth exemplary limbal ring/spoke pattern cosmetic contact lens.

In addition to the spokes and limbal ring elements, the patterns may include any of a number of additional components. Such components may include geometric structures, such as dots and lines, or fanciful structures, including striae, feather-like shapes, and the like, and combinations thereof. In one exemplary embodiment, as illustrated in FIG. 11, a contact lens 1100 may comprise a plurality of random dots 1102 that overlay the spokes 1104 and the spaces between spokes 1104.

Alternatively, the plurality of dots may overlay only a portion of the area of the spokes and spaces therebetween, such as overlaying only their innermost portions or portions closest to the limbal ring 1106 or about one (1) to about ninety (90) percent, preferably about twenty-five (25) to seventy-five (75) percent, of that area. As yet another alternative, the random dot pattern may be such that, as one moves inwardly toward the lens' geometric center, the dots become less numerous forming a dot density gradient. The dots aid in blending of the border between limbal ring 1106 and the spokes 1104.

Figure 12:
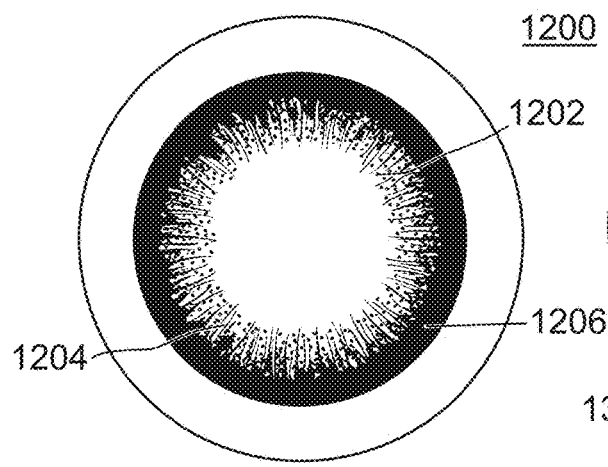
FIG. 12 is a plan view of a seventh exemplary limbal ring/spoke pattern cosmetic contact lens.

As yet another alternative, in FIG. 12, there is illustrated a contact lens 1200 having a plurality of random dots 1202, overlaying spokes 1204 and the spaces between spokes. The dots 1202 overlay the entirety of spokes 1204 and the spaces therebetween. The spokes extend from the limbal ring 1206. The dots used in the patterns of the invention may be of any size and preferably are about 0.060 to about 0.180 mm in diameter, more preferably about 0.0075 to about 0.0125 mm in diameter.

In any of the patterns of the cosmetic contact lenses set forth herein, the center preferably is clear to ensure no impact on visual acuity. However, the center region may be an area of translucent/transparent or opaque color or any combination of opaque and translucent/transparent colors.

As used in a contact lens for either enhancing or altering the wearer's eye color, preferably the limbal ring element is a solid band of color that masks the color of the lens wearer's limbal region and more preferably, the masking color is an opaque color. Once again, limbal rings, sized appropriately, may be utilized to create a halo effect. The remaining elements, the spokes, dots and other pattern elements may be translucent or opaque depending on the desired cosmetic on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T.

The color selected for each of the limbal ring and iris pattern elements will be determined by the natural color of the lens wearer's iris and the enhancement or color change desired. Thus, elements may be any color, including any of a variety of hues and chromas of blue, green, gray, brown, black, yellow, red, or combinations thereof. Preferred colors for the limbal ring include any of the various hues and chromas of black, brown, gray, dark blue and dark green.

Figure 13:
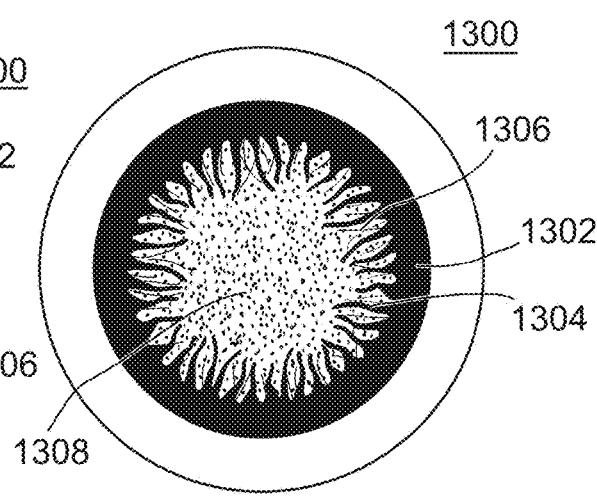
FIG. 13 is a plan view of an eighth exemplary limbal ring/spoke pattern cosmetic contact lens.

The color of the limbal ring, spokes and other pattern elements may also be substantially the same as, or complementary to, each other. For example, in FIG. 13 there is illustrated a contact lens 1300 comprising a pattern in which a limbal ring 1302 and spokes 1304 are of the same color. Spokes 1306 are of a different, but complementary color to that of limbal ring 1302 and spokes 1304. Pupil portion 1308 is of yet another color complementary to the limbal ring and spoke colors. Preferably, the pupil portion is clear, meaning that it is colorless.

The brightly colored element comprising the peripheral portion may be pure white, near white, off white, light yellow, pale blue, light pink, light green, or any combination of the above. Preferably, it is matched so that it does not starkly contrast with the visible portion of the sclera that is not covered by the lens. These colors are preferably obtained by use of titanium dioxide ($TiO_2$) with higher amounts yielding greater opacity and contrast. The addition of pigments include iron oxide black, iron oxide brown, iron oxide yellow, iron oxide red, titanium dioxide, and the like, and combinations thereof, in small amounts to adjust the whiter colored element. In addition to these pigments, soluble and non-soluble dyes may be used, including dichlorotriazine and vinyl sulfone-based dyes. One exemplary embodiment being a colorant with 10 percent to 20 percent $TiO_2$ and 80 percent to 90 percent clear binding polymer to provide appropriate translucency.

In general, the colored elements may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include pthalocyanine blue, pthalocyanine green, carbazole violet, vat orange #1, and the like as well as combinations thereof. Examples of useful inorganic pigments include iron oxide black, iron oxide brown, iron oxide yellow, iron oxide red, titanium dioxide, and the like, as well as combinations thereof. In addition to these pigments, soluble and non-soluble dyes may be used, including dichlorotriazine and vinyl sulfone-based dyes. Useful dyes and pigments are commercially available.

In accordance with the present invention, a contact lens comprising a multi-layer design may be utilized to enhance the appearance of the eyes upon which the contact lenses are positioned while maintaining a natural look. The exemplary designs each comprise three layers; namely, a unique limbal design graphic, a unique inner effect graphic and a unique outer effect graphic. The order and color of printing the various layers has an impact on the final design as set forth in more detail below. In addition, each of the three layers may vary in color and design to create a unique appearance on eye.

The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture created through contrasting colors and shapes may be utilized to create variation in the iris. As used in two dimensional art, texture is created by the use of light and dark features. Light and dark elements may also be utilized to imply depth and form.

As set forth above, the present invention utilizes three distinct layers to provide more depth and variation in the overall pattern. The limbal design graphic is the portion of the overall pattern that surrounds the outer diameter of the iris and is closest to the sclera and is meant to highlight, enhance and/or define the limbal region of the eye; however, it also comprises elements that extend into the iris. The inner effect graphic layer is the portion of the overall pattern that is meant to enhance the iris; however, it may comprise a portion that also contributes to highlighting, enhancing and/or defining the limbal region of the eye. The outer effect graphic layer is the portion of the overall pattern that is meant to enhance the iris; however, it may comprise a portion that also contributes to highlighting, enhancing and/or defining the limbal region of the eye. The multiple layer approach of the present invention may be utilized to create varying levels of transparency and/or opacity utilizing overlapping and non-overlapping translucent layers.

Various design elements, as explained above, may be utilized to achieve various effects. As with the limbal ring/tapered spoke patterns described above, the multi-layered design in accordance with the present invention may also use similar features. For example, spokes, fingers, hair-like structures, as well similar structures and/or dots may be utilized to blend a solid limbal band into the iris. In addition, various other geometric shapes, including those that are found in a natural iris may be incorporated into the various layers.

Figure 14A:
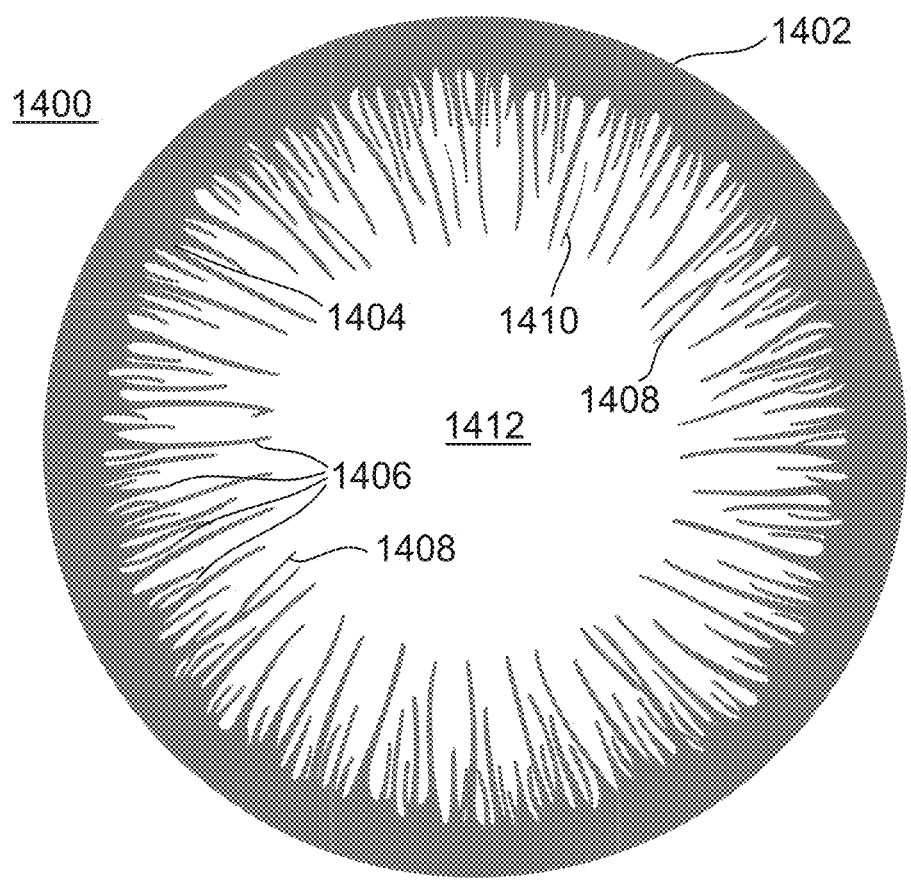
FIG. 14A is a plan view of a first exemplary limbal design graphic in accordance with the present invention.

Referring to FIG. 14A, there is illustrated a first exemplary embodiment of a limbal design graphic 1400 in accordance with the present invention. In this exemplary embodiment, the limbal design graphic 1400 comprises a translucent annular band 1402 that is approximately 0.89 mm in width. Connected to and extending from the innermost border 1404 of the annular band 1402 towards the geometric center of the limbal design graphic 1400 are plurality long, medium and short hair-like structures 1406. Some of the hair-like structures have branches 1408 off of the main structure 1406. Additional hair-like structures 1410 which are not connected to the translucent band 1402 are interspersed between the other hair-like structures 1406. These hair-like structures are designed to look like naturally occurring structures within the iris, for example, pupillary muscle structures, folds or radial furrows, crypts, ciliary structures and the like. The translucent annular band 1402 is designed to overlie and enhance the wearer's limbal region while the protruding structures 1406, 1408 and 1410, which are also translucent, are designed to enhance the wearer's iris and blend the translucent annular band 1402 in with the wearer's iris. The space between the hair-like structures creates shapes depending on overlapping and underlying elements, including pigmented shapes and features as well as exposed iris. The central portion 1412 of the design graphic 1400 may be clear as this portion of the design corresponds to the pupil. It is important to note; however, that tints may be utilized in this central portion 1412. In addition, the space between the elements of the design may be clear or tinted.

In this exemplary embodiment, the entire limbal design graphic 1400 is a translucent medium brown formed from a composition comprising red iron oxide, titanium dioxide, trans-oxide yellow, yellow iron oxide, brown iron oxide, and black iron oxide pigments in proportions to create a color in the brown to black family. It is important to note that while the limbal design graphic 1400 is translucent in this exemplary embodiment, other designs may comprise opaque elements or a combination of opaque and translucent elements. This limbal design graphic 1400 is printed utilizing the techniques described in detail subsequently and it is printed first. In other words, it is the first graphic layer of the overall design that is to be incorporated into the lens. The order of printing affects the overall design as described in greater detail subsequently.

Figure 14B:
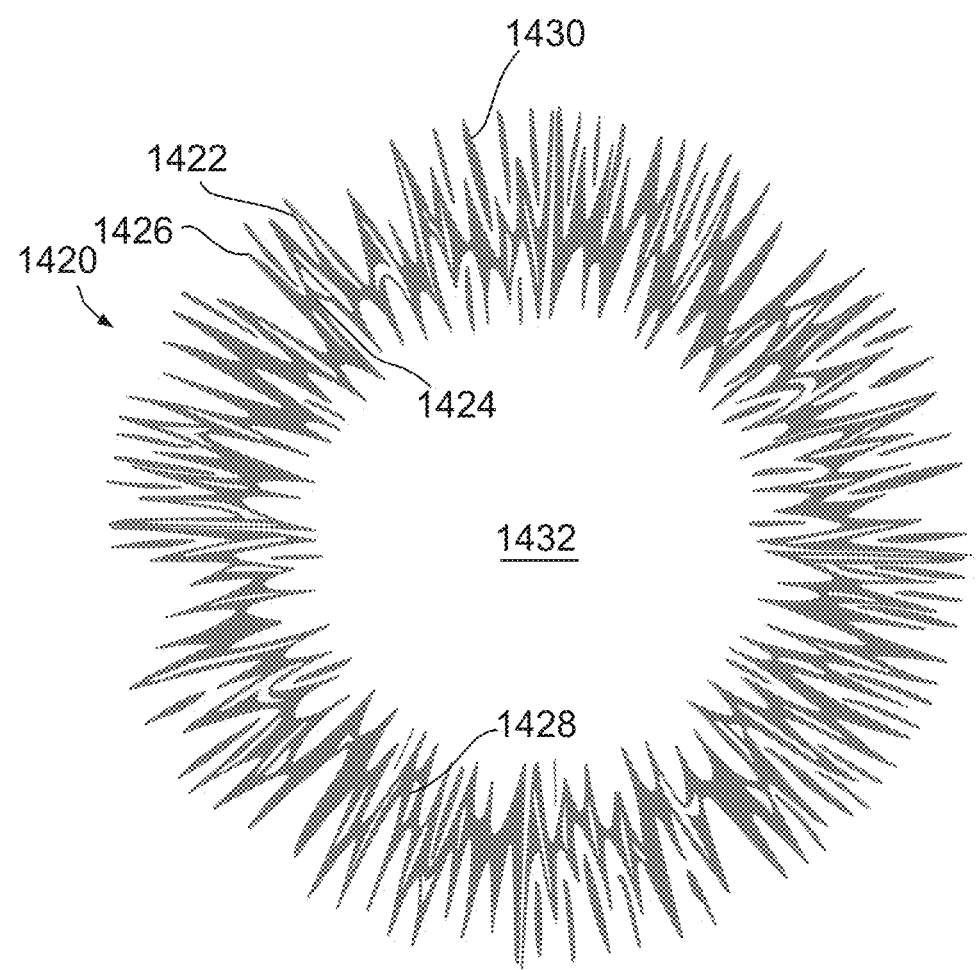
FIG. 14B is a plan view of a first exemplary inner effect design graphic in accordance with the present invention.

FIG. 14B illustrates a first exemplary embodiment of an inner effect design graphic 1420 in accordance with the present invention. The inner effect graphic 1420 comprises an annular band including a wave-like ring structure 1422 with geometric shapes having a plurality of rounded troughs 1424 and pointed peaks 1426 with various shaped elements of negative space 1428 (the negative space exists as closed features within printed elements and open shapes outside of printed elements) therein, i.e. no pattern, and a plurality of elongated, substantially elliptical structures 1430 of varying length and width interspersed in the troughs 1424. The substantially elliptical structures 1430 may or may not have tapered end points. The overall effect may resemble a sinusoidal pattern or mimic a natural iris. More specifically, the overall effect is designed to look like naturally occurring structures within the iris, for example, pupillary muscle structures, folds or radial furrows, crypts, ciliary structures and the like. The inner effect design graphic 1420 is designed to overlie and enhance the wearer's iris and at least partially overlaps with the translucent annular band 1402 of the limbal design graphic 1400. In addition, the inner effect design graphic 1420 overlies the protruding structures 1406, 1408, and 1410 of the limbal design graphic 1400 in such a way as to have overlapping translucent sections as well as filling in some or a portion of the negative space between the protruding structures 1406, 1408, and 1410. The sections of overlapping translucent pigment create additional hues within the pattern that may be darker or lighter depending on the colors utilized in the underlying individual structures as well as differing levels of translucency. The space between the elements of the pattern creates shapes, depending on overlapping and underlying elements, including pigmented shapes and features as well as exposed iris. The central portion 1432 of the design graphic 1420 may be clear as this portion of the design corresponds to the pupil. It is important to note; however, that tints may be utilized in this region. In addition, the negative space may be clear or tinted.

In this exemplary embodiment, the entire inner effect design graphic 1420 is a translucent orange formed from a composition comprising red iron oxide, trans-oxide yellow, brown iron oxide, and trans-oxide red pigments in proportions to create a color in the orange family. The orange family includes yellows and golds. These colors or colors in this family are meant to highlight the underlying natural iris color for individuals with eyes that are of a darker hue, for example, browns, dark browns, dark hazels and the like. Different colors would be utilized for individuals with eyes of a lighter hue, for example, blues, greens, light hazels, greys and the like. It is important to note that while the inner effect graphic 1420 comprises translucent elements, in other embodiments, it may comprise opaque elements and/or a combination of translucent and opaque elements. This inner effect graphic 1420 is printed utilizing the techniques described in detail subsequently and is printed second after the limbal graphic 1400. In other words, the inner effect graphic 1420 is printed after and on top of the limbal design graphic 1400. This printing order is from a manufacturing standpoint. From an observer's perspective, this layer, the inner effect design graphic 1420, would appear behind the graphic 1400. The outer diameter of the inner effect design graphic 1420 is less than the outer diameter of the limbal design graphic 1400 while the inner diameters are substantially equal.

Figure 14C:
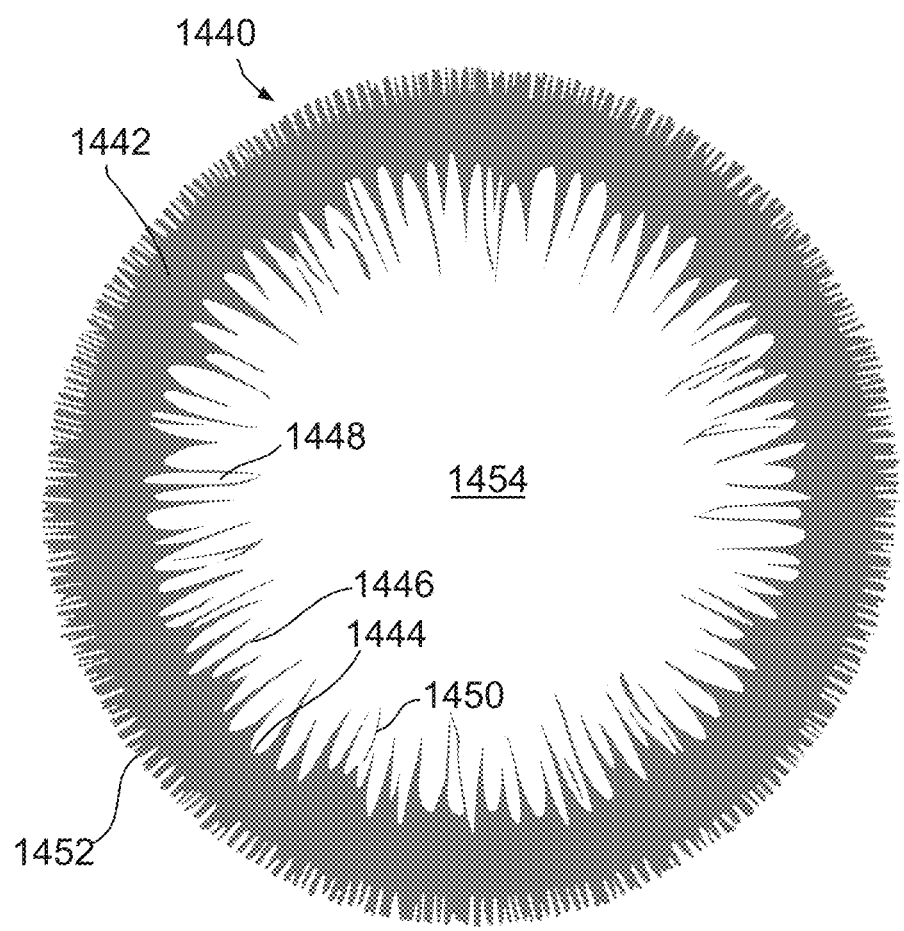
FIG. 14C is a plan view of a first exemplary outer effect design graphic in accordance with the present invention.

FIG. 14C illustrates a first exemplary embodiment of an outer effect design graphic 1440 in accordance with the present invention. In this exemplary embodiment, the outer effect design graphic 1440 comprises a translucent annular band 1442 that is approximately 1.44 mm in width. Connected to and extending from the innermost border 1444 of the translucent annular band 1442 is a plurality of long, medium, and short substantially triangular shaped structures 1446. Some of the substantially triangular shaped structures touch one another at the apex to form an enclosed space 1448. The outer effect design graphic 1440 also comprises a plurality of lines 1450 which are not connected to the translucent annular band 1442 and are interspersed between the substantially triangular shaped structures and oriented in the same direction; namely, towards the geometric center of the outer effect design graphic 1440. These structures are designed to look like naturally occurring structures within the iris, for example, pupillary muscle structures, folds or radial furrows, crypts, ciliary structures and the like. The outer perimeter of the translucent annular band 1442 comprises comb-like structure 1452 which alters the appearance of the annular band 1442 to a less defined structure. The comb-like structure 1452 is intended to soften and blend the overlapping line created by overlapping translucent colors from the three layers; namely, the limbal design graphic 1400, the inner effect design graphic 1420 and the outer effect design graphic 1440. The outer effect design graphic 1440 is designed to overlie and enhance the translucent annular band 1402 of the limbal design graphic 1400 as well as the entire inner effect design graphic 1420 and the protruding structures 1406, 1408, and 1410 of the limbal design graphic 1400. The outer layer design graphic 1440 fills in more negative space and the overlapping sections or positive space create areas of additional hues, areas of different levels of opacity and different designs separate and distinct from any single layer or graphic. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1454 may be clear as this portion of the lens corresponds to the pupil. It is important to note; however, that tints may be utilized in this section. In addition, the negative space between the elements may be tinted. The comb-like structure 1452 alters the outer diameter of the annular band 1402 of the limbal design graphic by creating a shape that disrupts the hard line of the transparent limbal design graphic 1400.

In this exemplary embodiment, the entire outer effect design graphic 1440 is a translucent black formed from a composition comprising brown iron oxide and black iron oxide pigments. In this exemplary embodiment, where the outer effect design graphic 1440 and the limbal design graphic 1400 overlap, they create a darker, more defined/opaque area, while the portions of the designs that do not overlap leave a more translucent coloring providing translucent blending from opaque to clear. This technique allows for blending with the natural iris. The outer effect design graphic 1440 comprises a translucent design in this exemplary embodiment; however, in other embodiments, the design may comprise opaque elements and/or a combination of translucent and opaque elements. The outer effect graphic 1440 is printed utilizing the techniques described in detail subsequently and is printed third in order after and on top of the inner effect graphic layer 1420. This printing order is from the manufacturing standpoint. From an observer's perspective, this layer would appear behind the inner effect design graphic 1420. The outer diameter of the outer effect graphic 1440 is less than the outer diameter of the limbal design graphic 1400 while the inner diameters are substantially equal.

Figure 14D:
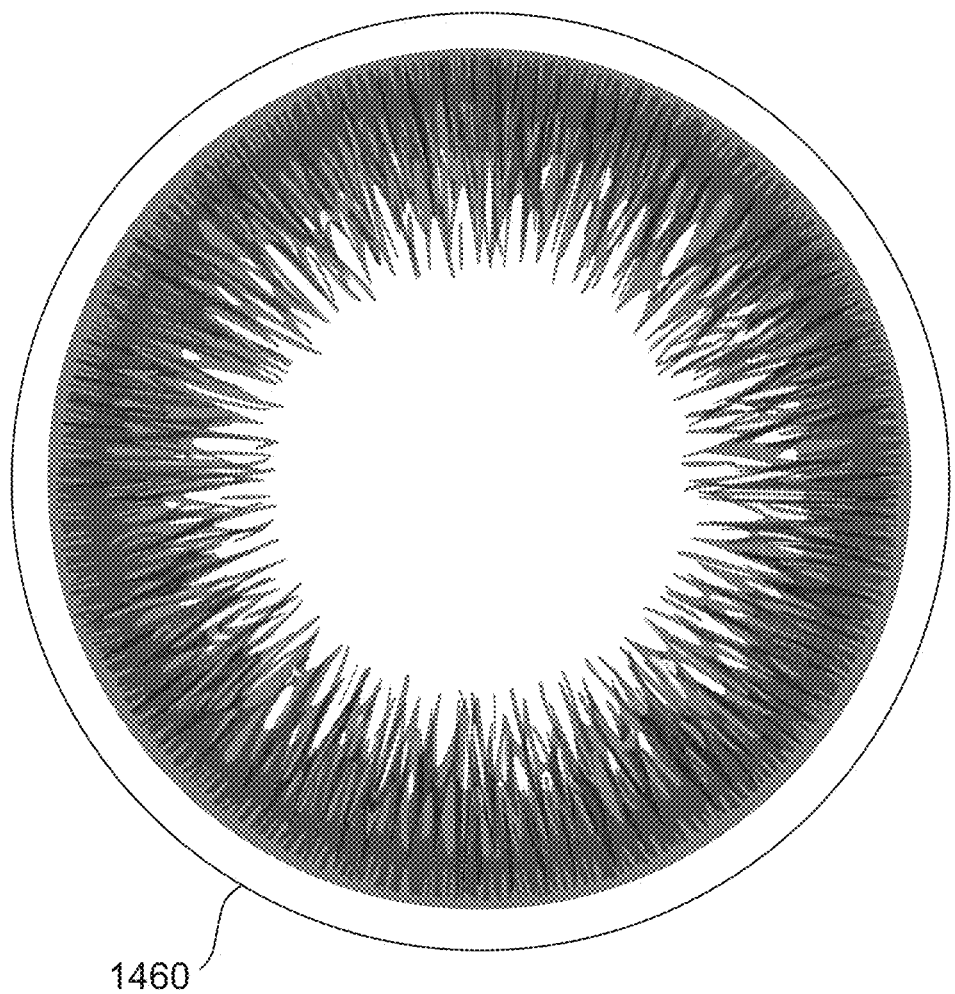
FIG. 14D is a plan view of a first exemplary cosmetic contact lens comprising the three design graphics of FIGS. 14A, B and C in accordance with the present invention.

FIG. 14D illustrates a first exemplary embodiment of a cosmetic contact lens 1460 comprising all three layers or design graphics 1400, 1420 and 1440 printed in the order described above. While the printing order is described from a manufacturing perspective, when an observer is viewing the contact lens on eye, the visual effect is that of seeing the layers or design graphics in a reverse order from that described in printing. As shown, the overlapping layers comprise different colors, different levels of translucency, different hues, different levels of lightness, different levels of darkness and patterns forming a unique structure. Changes in either both the printing order or colors will result in a different design as set forth in detail subsequently. In addition, changing the level of translucency may also affect the overall design with regard to hue, blending, texture and contrast.

The overall design created by the three layers comprises an annular structure with an inner diameter of about 6.5 mm and an outer diameter in the range from about 12.675 mm to about 12.8 mm. The annular structure is similar to the iris structure of the eye by design. The open or negative space in the center of the lens corresponds to the pupillary region or optical zone of the eye and is preferably clear so as not to interfere with vision. However, as set forth above, this region may be tinted as well as any negative space.

Figure 15A:
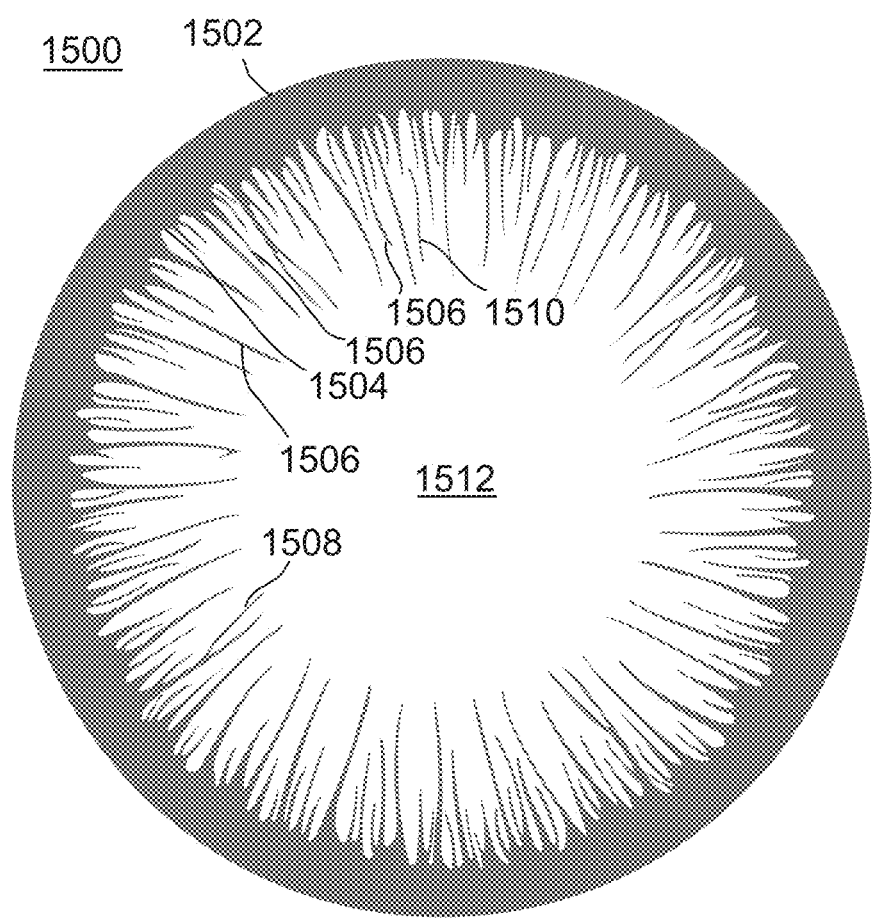
FIG. 15A is a plan view of a second exemplary limbal design graphic in accordance with the present invention.

Referring to FIG. 15A, there is illustrated a second exemplary embodiment of a limbal design graphic 1500 in accordance with the present invention. In this exemplary embodiment, the limbal design graphic 1500 comprises a translucent annular band 1502 that is approximately 0.89 mm in width. Connected to and extending from the innermost border 1504 of the translucent annular band 1502 towards the geometric center of the limbal design graphic 1500 are plurality long, medium and short hair-like structures 1506. Some of the hair-like structures have branches 1508 off of the main structure 1506. Additional hair-like structures 1510 which are not connected to the opaque band 1502 are interspersed between the other hair-like structures 1506. These hair-like structures are designed to look like naturally occurring structures within the iris, for example, pupillary muscle structures, folds or radial furrows, crypts, ciliary structures and the like. The translucent annular band 1502 is designed to overlie and enhance the wearer's limbal region while the protruding structures 1506, 1508 and 1510 are designed to enhance the wearer's iris and blend the annular band 1502 in with the iris. The protruding structures 1506, 1508 and 1510 are also translucent. The space between the hair-like structures creates shapes depending on overlapping and underlying elements, including pigmented shapes and features as well as exposed iris. The central portion 1512 of the design graphic 1500 may be clear as this portion of the design corresponds to the pupil. It is important to note; however, that tints may be utilized in this central portion 1512. In addition, the space between the elements of the design may be clear or tinted.

In this exemplary embodiment, the entire limbal design graphic 1500 is a translucent black formed from black iron oxide pigments. It is important to note that while the limbal design graphic 1500 is translucent in this exemplary embodiment, other designs may comprise opaque elements or a combination of opaque and translucent elements. The limbal design graphic 1500 is printed utilizing the techniques described in detail subsequently and it is printed first. In other words, it is the first graphic layer of the overall design that is to be incorporated into the lens. The order of printing affects the overall design as described in greater detail subsequently.

Figure 15B:
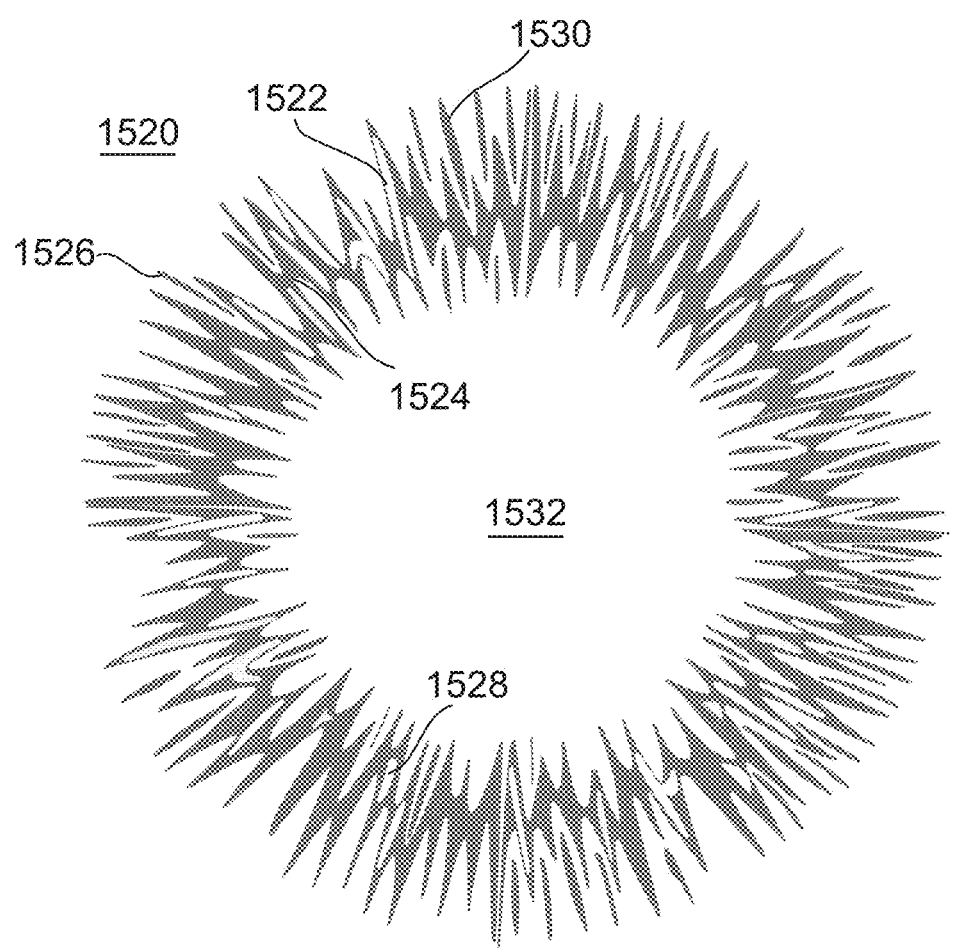
FIG. 15B is a plan view of a second exemplary inner effect design graphic in accordance with the present invention.

FIG. 15B illustrates a second exemplary embodiment of an inner effect design graphic 1520 in accordance with the present invention. The inner effect graphic 1520 comprises an annular band including a wave-like ring structure 1522 with geometric shapes having a plurality of rounded troughs 1524 and pointed peaks 1526 with various shaped elements of negative space 1528 (the negative space exists as closed features within printed elements and open shapes outside of printed elements) therein, i.e. no pattern, and a plurality of elongated, substantially elliptical structures 1530 of varying length and width interspersed in the troughs 1524. The substantially elliptical structures 1530 may or may not have tapered end points. The overall effect may resemble a radial pattern or mimic a natural iris. More specifically, the overall effect is designed to look like naturally occurring structures within the iris, for example, pupillary muscle structures, folds or radial furrows, crypts, ciliary structures and the like. The inner effect design graphic 1520 is designed to overlie and enhance the wearer's iris and at least partially overlaps with the translucent annular band 1502 of the limbal design graphic 1500. In addition, the inner effect design graphic 1520 overlies the protruding structures 1506, 1508, and 1510 of the limbal design graphic 1500 in such a way as to have overlapping translucent sections as well as filling in some or a portion of the negative space between the protruding structures 1506, 1508, and 1510. The sections of overlapping translucent pigment create additional hues within the pattern that may be darker or lighter depending on the colors utilized in the underlying individual structures as well as differing levels of translucency. The space between the elements of the pattern creates shapes, depending on overlapping and underlying elements, including pigmented shapes and features as well as exposed iris. The central portion 1532 of the design graphic 1520 may be clear as this portion of the design corresponds to the pupil. It is important to note; however, that tints may be utilized in this region. In addition, the negative space between the elements of the design may be clear or tinted.

In this exemplary embodiment, the entire inner effect design graphic 1520 is a translucent medium brown formed from a composition comprising red iron oxide, titanium dioxide, trans-oxide yellow, yellow iron oxide, brown iron oxide and black iron oxide pigments in proportions to create a color in the gold to brown family. The colors utilized are meant to highlight or otherwise enhance the underlying natural iris color. Different colors are utilized for different color eyes. The inner effect design graphic 1520 may comprise opaque and/or a combination of opaque and translucent elements in alternate exemplary embodiments. The inner effect design graphic 1520 is printed utilizing the techniques described in detail subsequently and is printed second after the limbal graphic 1500. In other words, the inner effect design graphic 1520 is printed after and on top of the limbal design graphic 1500. This printing order is from a manufacturing standpoint. From an observer's perspective, this graphic layer 1520 would appear behind the limbal design graphic 1500. The outer diameter of the inner effect design graphic 1520 is less than the outer diameter of the limbal design graphic 1500 while the inner diameters are substantially equal.

Figure 15C:
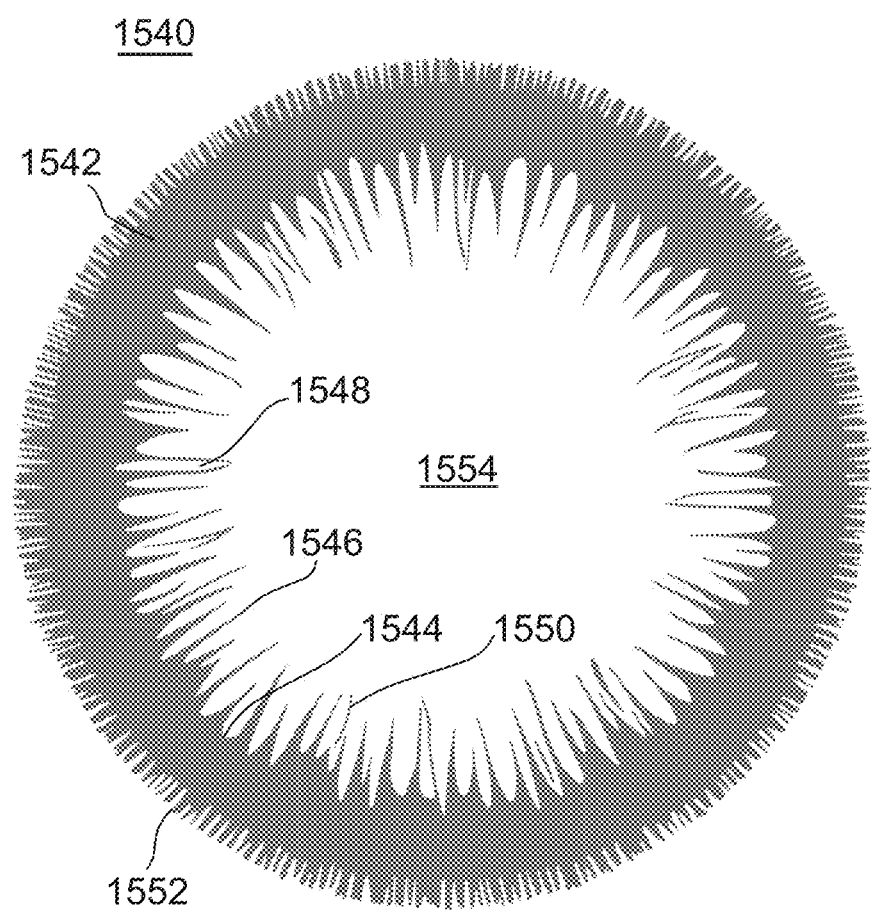
FIG. 15C is a plan view of a second exemplary outer effect design graphic in accordance with the present invention.

FIG. 15C illustrates a second exemplary embodiment of an outer effect design graphic 1540 in accordance with the present invention. In this exemplary embodiment, the outer effect design graphic 1540 comprises a translucent annular band 1542 that is approximately 1.44 mm in width. Connected to and extending from the innermost border 1544 of the translucent annular band 1542 is a plurality of long, medium, and short substantially triangular shaped structures 1546. Some of the substantially triangular shaped structures touch one another at the apex to form an enclosed space 1548. The outer layer design graphic 1540 also comprises a plurality of lines 1550 which are not connected to the opaque annular band 1542 and are interspersed between the substantially triangular shaped structures and oriented in the same direction; namely, towards the geometric center of the outer effect design graphic 1540. These structures are designed to look like naturally occurring structures within the iris, for example, pupillary muscle structures, folds or radial furrows, crypts, ciliary structures and the like. The outer perimeter of the translucent annular band 1542 comprises a comb-like structure 1552 which alters the appearance of the annular band 1542 to a less defined structure. The comb-like structure 1552 is intended to soften and blend the overlapping line created by overlapping translucent colors from the three layers; namely, the limbal design graphic 1500, the inner effect graphic 1520 and the outer effect design graphic 1540. The outer effect design graphic 1540 is designed to overlie and enhance the translucent annular band 1502 of the limbal design graphic 1500 as well as the entire inner effect design graphic 1520 and the protruding structures 1506, 1508, and 1510 of the limbal design graphic 1500. The outer effect design graphic 1540 fills in more negative space and the overlapping sections or positive space create areas of additional hues, areas of different levels of opacity and different designs separate and distinct from any single layer or graphic. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1554 may be clear as this portion of the lens corresponds to the pupil. It is important to note; however, that tints may be utilized in this section. In addition, the negative space between the elements may also be clear or tinted. The comb-like structure 1552 alters the appearance of the outer diameter of the annular band 1502 of the limbal design graphic by softening its appearance.

In this exemplary embodiment, the entire outer effect design graphic 1540 is a translucent gray formed from a composition comprising titanium dioxide and black iron oxide pigments. In this exemplary embodiment, where the outer effect design graphic 1540 and the limbal design graphic 1500 overlap, they create a darker, more defined/opaque area, while the portions of the designs that do not overlap leave a more translucent coloring providing translucent blending from opaque to clear. This technique allows for blending with the natural iris. The outer effect design graphic 1540 comprises a translucent design; however, other designs may incorporate opaque elements and/or a combination of opaque and translucent elements. The outer effect graphic 1540 is printed utilizing the techniques described in detail subsequently and is printed third in order after and on top of the inner effect graphic 1520. This printing order is from the manufacturing standpoint. From an observer's perspective, this layer would appear behind the inner effect design graphic 1520. The outer diameter of the outer effect graphic 1554 is less than the outer diameter of the limbal design graphic 1500 while the inner diameters are substantially equal.

Figure 15D:
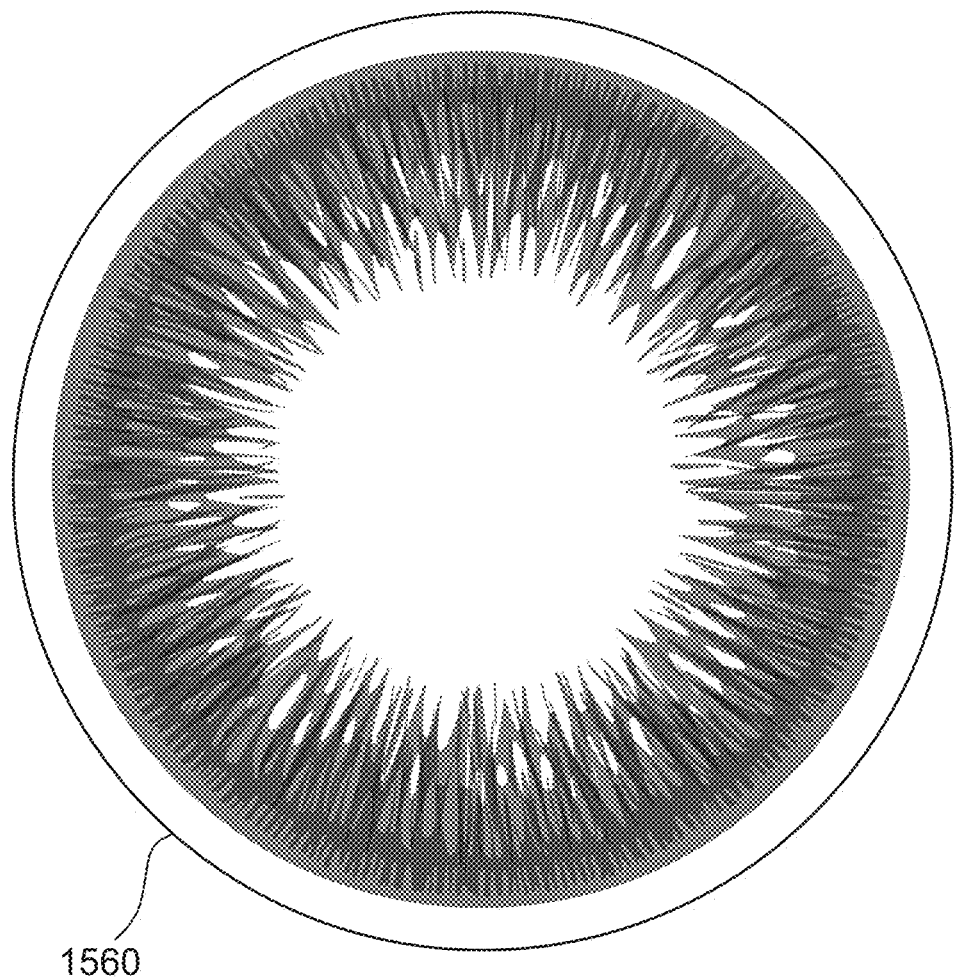
FIG. 15D is a plan view of a second exemplary cosmetic contact lens comprising the three design graphics of FIGS. 15A, B and C in accordance with the present invention.

FIG. 15D illustrates a second exemplary embodiment of a cosmetic contact lens 1560 comprising all three layers or design graphics 1500, 1520 and 1540 printed in the order described above. While the printing order is described from a manufacturing perspective, when an observer is viewing the contact lens on eye, the visual effect is that of seeing the layers or design graphics in a reverse order from that described in printing. As shown, the overlapping layers comprise different colors, different hues, different levels of lightness, different levels of darkness and patterns forming a unique structure. Changes in either both the printing order or colors will result in a different design. In addition, any of these changes may affect the level of translucency which may also affect the overall design.

Figure 16A:
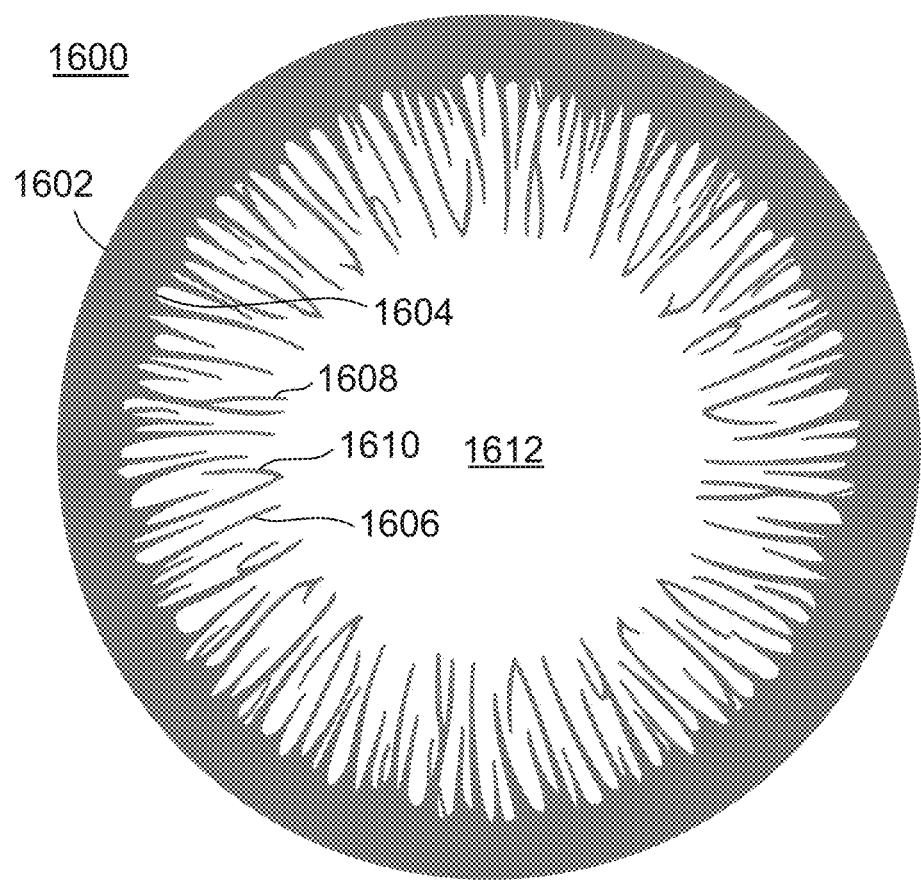
FIG. 16A is a plan view of a third exemplary limbal design graphic in accordance with the present invention.

The overall design created by the three layers comprises an annular structure with an inner diameter of about 6.0 mm and an outer diameter in the range from about 12.50 mm to about 12.775 mm. The annular structure is similar to the iris structure of the eye by design. The open or negative space in the center of the lens corresponds to the pupillary region or optical zone of the eye and is preferably clear so as not to interfere with vision. However, as set forth above, this region as well as any negative space may be tinted Referring to FIG. 16A, there is illustrated a third exemplary embodiment of a limbal design graphic 1600 in accordance with the present invention. In this exemplary embodiment, the limbal design graphic 1600 comprises a translucent annular band 1602 that is approximately 0.89 mm in width. Connected to and extending from the innermost border 1604 of the translucent annular band 1602 towards the geometric center of the limbal design graphic 1600 is a plurality of long, medium and short hair-like structures 1606. Some of the hair-like structures have branches 1608 off of the main structure 1606. Additional branch-like structures 1610 creating hook like structures are meant to mimic the edge of the pupillary muscle. As before, all of these structures are designed to look like naturally occurring structures within the iris, for example, pupillary muscle structures, folds or radial furrows, crypts, ciliary structures and the like. The translucent annular band 1602 is designed to overlie and enhance the wearer's limbal region while the protruding structures 1606, 1608 and 1610 are designed to enhance the wearer's iris and blend the translucent annular band 1602 in with the iris. The hair-like structures are also translucent. The space between the hair-like structures creates shapes depending on overlapping and underlying elements, including pigmented shapes and features as well as exposed iris. The central portion 1612 of the design graphic 1600 may be clear as this portion of the design corresponds to the pupil. It is important to note; however, that tints may be utilized in this central portion 1612. In addition, the space between the elements of the design may be clear or tinted.

In this exemplary embodiment, the entire limbal design graphic 1600 is a translucent dark brown formed from a composition comprising brown iron oxide, and black iron oxide pigments in proportions to create a color in the brown to black family. The limbal design graphic 1600 comprises translucent elements; however, in other exemplary embodiments it may comprise opaque elements and/or a combination of opaque and translucent elements. The limbal design graphic 1600 is printed utilizing the techniques described in detail subsequently and it is printed first. In other words, it is the first graphic design of the overall design that is to be incorporated into the lens. The order of printing affects the overall design as described in greater detail subsequently.

Figure 16B:
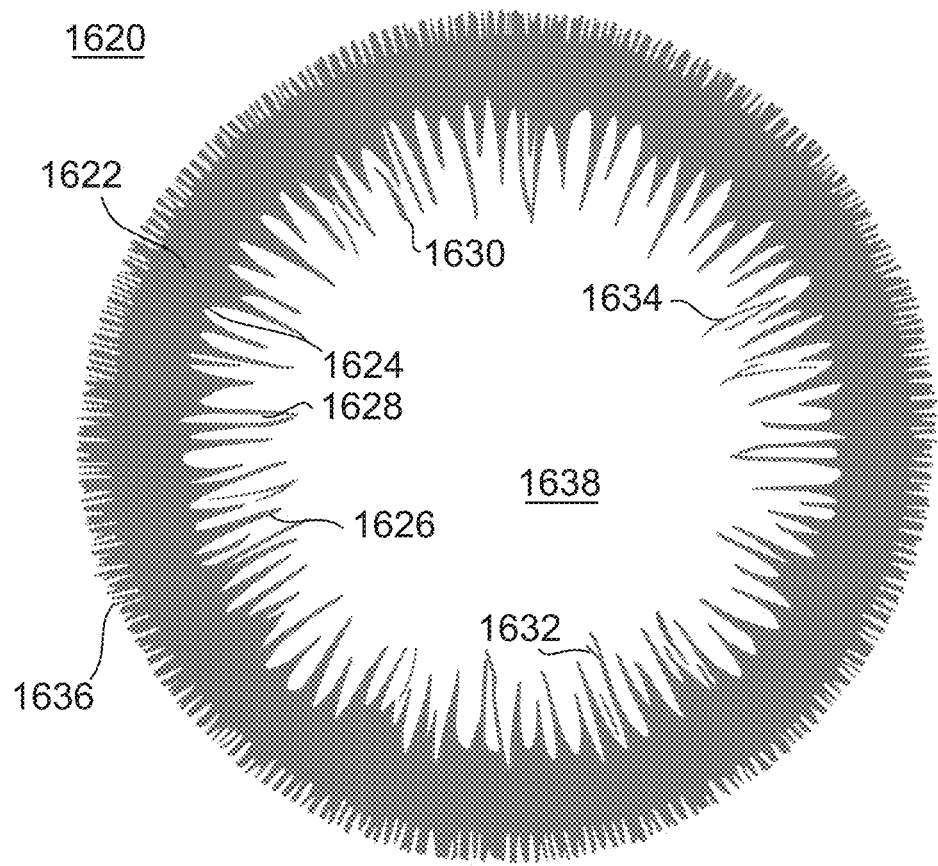
FIG. 16B is a plan view of a third exemplary outer effect design graphic in accordance with the present invention.

FIG. 16B illustrates a third exemplary embodiment of an outer effect design graphic 1620 in accordance with the present invention. It is important to note that the order of the printing of the inner and outer effect graphics are changed in this exemplary embodiment. In the above described exemplary embodiments, the inner effect design graphic is between the limbal design graphic and the outer effect design graphic. In this exemplary embodiment, the outer effect design graphic 1620 comprises a translucent annular band 1622 that is approximately 1.44 mm in width. Connected to and extending from the innermost border 1624 of the translucent annular band 1622 is a plurality of long, medium, and short substantially triangular shaped structures 1626. Some of the substantially triangular shaped structures touch one another at the apex to form an enclosed space 1628. The outer effect design graphic 1620 also comprises a plurality of lines 1630 which are not connected to the translucent annular band 1622 and are interspersed between the substantially triangular shaped structures and oriented in the same direction; namely, towards the geometric center of the outer effect design graphic 1620. Some of the substantially triangular shaped structures or protrusions 1626 have branches 1632 and some of the lines 1630 have branches 1634. All of these structures are designed to look like naturally occurring structures within the iris, for example, pupillary muscle structures, folds or radial furrows, crypts, ciliary structures and the like. The outer perimeter of the annular band 1622 comprises comb-like structure 1636 which alters the appearance of the annular band 1622 to a less defined structure. The comb-like structures 1636 is intended to soften and blend the overlapping line created by overlapping translucent colors from the two layers. All of the elements of the outer effect design graphic 1620 are translucent; however, in other embodiments, the elements may be opaque and/or a combination of translucent and opaque. The outer effect design graphic 1620 is designed to overlie and enhance the translucent annular band 1602 of the limbal design graphic 1600. In addition, the outer effect design graphic 1620 overlies the protruding structures 1606, 1608 and 1610 of the limbal design graphic 1600 in such a way as to have overlapping sections as well as filling in some or portions of the negative space between the protruding structures 1606, 1608 and 1610. The outer effect design graphic 1620 fills in more negative space and the overlapping sections or positive space create areas of additional hues, areas of different levels of opacity and different designs separate and distinct from any single layer. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1638 may be clear as this position of the lens corresponds to the pupil. It is important to note; however, that tints may be utilized in this region. In addition, tints may be utilized in the negative space as well. The comb-like structure 1636 alters the outer diameter of the annular band 1602 of the limbal design graphic 1600 by softening its appearance.

In this exemplary embodiment, the entire outer effect design graphic 1620 is a translucent brown formed from a composition comprising red-iron oxide, titanium dioxide, trans-oxide yellow, phthalocyanine green, yellow iron oxide, brown iron oxide and black iron oxide pigments. In this exemplary embodiment, where the outer effect design graphic 1620 and the limbal design graphic 1600 overlap, they create a darker, more defined/opaque area, while portions of the designs that do not overlap leave a more translucent coloring providing translucent blending from opaque to clear. This technique allows for blending with the natural iris. The outer effect design graphic 1620 comprises a translucent design in this exemplary embodiment; however, in other exemplary embodiments, the design may comprise opaque elements and/or a combination of translucent and opaque elements. The outer effect design graphic 1620 is printed utilizing the techniques described in detail subsequently and is printed second after and on top of the limbal effect graphic layer 1600. This printing order is from the manufacturing standpoint. From an observer's perspective, this layer or graphic would appear behind the limbal design graphic 1600. The outer diameter of the outer effect graphic 1620 is less than the outer diameter of the limbal design graphic 1600 while the inner diameters are substantially equal.

Figure 16C:
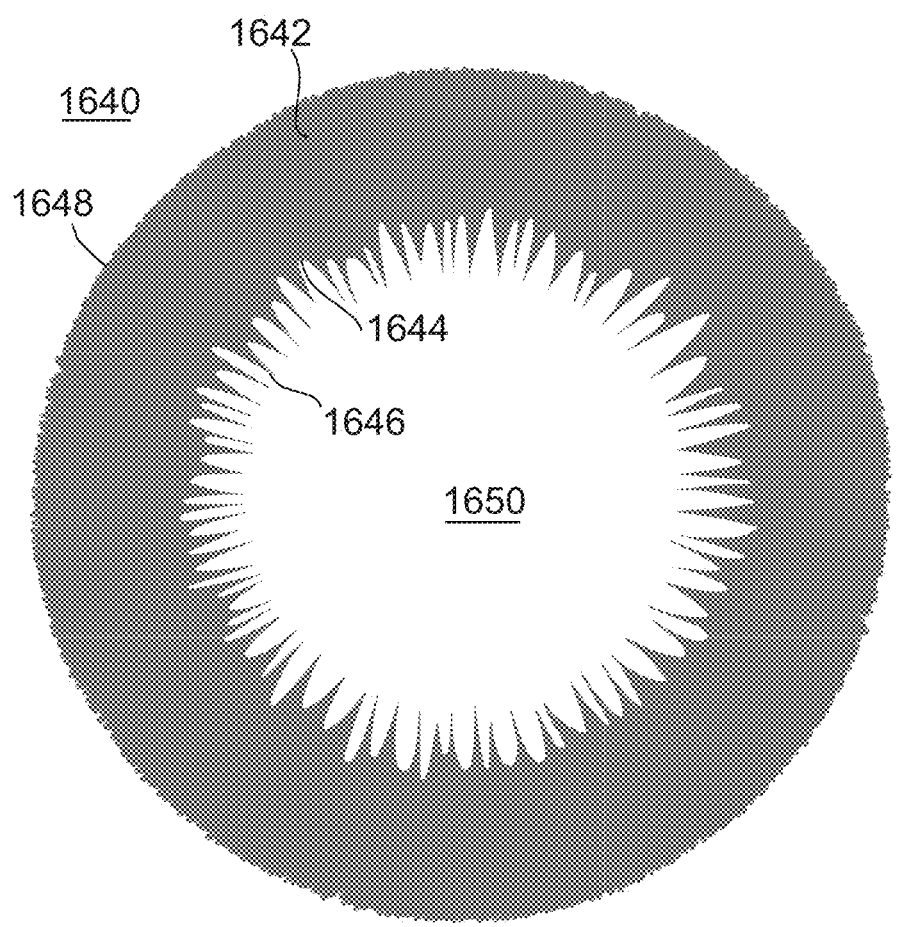
FIG. 16C is a plan view of a third exemplary inner effect design graphic in accordance with the present invention.

FIG. 16C illustrates a third exemplary embodiment of an inner effect design graphic 1640 in accordance with the present invention. In this exemplary embodiment, the inner effect design graphic 1640 comprises a translucent annular band 1642 that is approximately 2.08 mm in width. As may be readily seen from the illustration, the annular band 1642 is much wider than the other annular bands in this embodiment. Connected to and extending from the innermost border 1644 of the annular band 1642 is a plurality of substantially triangular shaped structures or protrusions 1646 extending inwards towards the geometric center of the inner effect design graphic 1640. These protrusions are designed to look like naturally occurring structures within the iris, for example, pupillary muscle structures, folds or radial furrows, crypts, ciliary structures and the like. The outer perimeter of the annular band 1642 comprises an inconsistent surface 1648 to soften/blend a hard line overlapping area which alters the appearance of the annular band 1642 to a less defined structure. It is less pronounced than the comb-like structure 1636 of the outer effect design graphic 1620. The inner effect design graphic 1640 is designed to overlie and enhance the translucent annular bands 1602 and 1622 of the limbal design graphic 1600 and the outer effect design graphic 1620 respectively. Once again, the substantially triangular shaped structures 1646 overlap and fill in the space between the protrusions 1606, 1608 and 1610 of the limbal design graphic 1600 and the elements 1626, 1628 and 1630 of the outer layer design graphic 1620. The sections of overlapping translucent pigment create additional hues within the pattern that may be darker or lighter depending on the colors utilized in the individual underlying structures as well as differing levels of translucency. The space between the elements of the pattern creates shapes, depending on overlapping and underlying elements, including pigmented shapes and features as well as exposed iris. The central portion 1650 of the inner effect graphic 1640 may be clear as this portion of the design corresponds to the pupil. It is important to note; however, that tints may be utilized in the central portion 1650 as well as in the negative space.

In this exemplary embodiment, the entire inner effect design graphic 1640 is a translucent yellow formed from a composition comprising trans-oxide yellow, yellow iron oxide, brown iron oxide, and trans-oxide red pigments in proportions to create a color in the yellow family. As set forth above, yellow is part of the orange family which also includes golds. These colors are meant to highlight the underlying natural iris color for individuals with brown or dark eyes. Different colors would be utilized for lighter eye color. The inner effect design graphic 1640 is printed utilizing the techniques described in detail subsequently and is printed third in order after the outer effect graphic 1620. In other words, the inner effect graphic 1640 is printed after and on top of the outer design graphic 1620. This printing order is from the manufacturing standpoint. From an observer's perspective, this layer would appear behind the other layers. The inner effect design graphic 1640 comprises translucent elements but in alternative exemplary embodiments, it may comprise opaque elements and/or a combination of opaque and translucent elements. The outer diameter of the inner effect design graphic 1640 is less than the outer diameter of the limbal design graphic 1600 while the inner diameters are substantially equal.

Figure 16D:
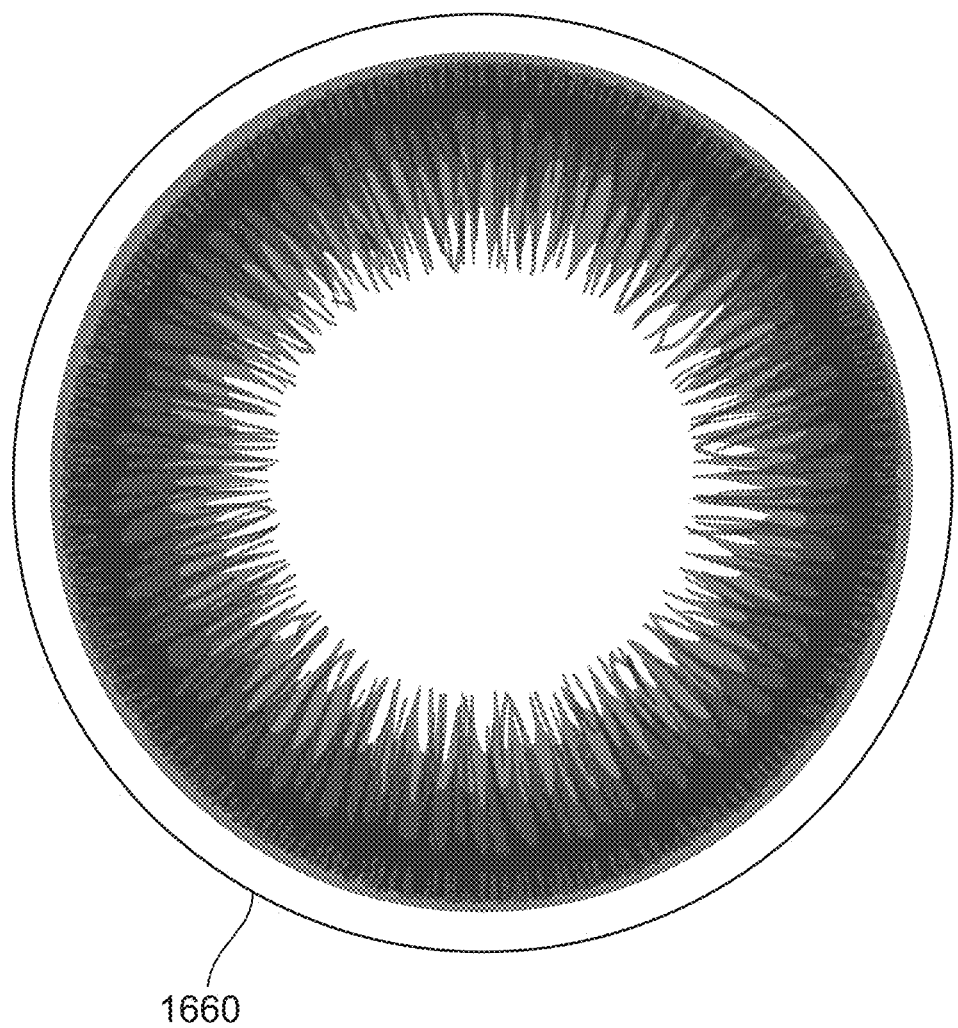
FIG. 16D is a plan view of a third exemplary cosmetic contact lens comprising the three design graphics of FIGS. 16A, B and C in accordance with the present invention.

FIG. 16D illustrates a third exemplary embodiment of a cosmetic contact lens 1660 comprising all three layers or design graphics 1600, 1620 and 1640 printed in the order described above. It is important to note that the printing order is different than in the other two exemplary embodiments described above as the inner and outer effect layers are switched. In addition, all three design graphics have annular bands creating a unique limbal ring design pattern. While the printing order is described from a manufacturing perspective, when an observer is viewing the contact lens on eye, the visual effect is that of seeing the layers or design graphics in a reverse order from that used in printing. As shown, the overlapping layers comprise different colors, different hues, different levels of lightness, different levels of darkness and patterns forming a unique structure. Changes in either both the printing order or colors will result in a different design. In addition, changes in translucency may also be achieved.

The overall design created by the three layers comprises an annular structure with an inner diameter of about 6.7 mm and an outer diameter in the range from about 12.650 mm to about 12.725 mm. This annular structure is similar to the iris structure of the eye by design. The open or negative space in the center of the lens corresponds to the pupillary region or optical zone of the eye and is preferably clear so as not to interfere with vision. However, as set forth above, this region may be tinted as may be the negative space between elements.

Figure 17A:
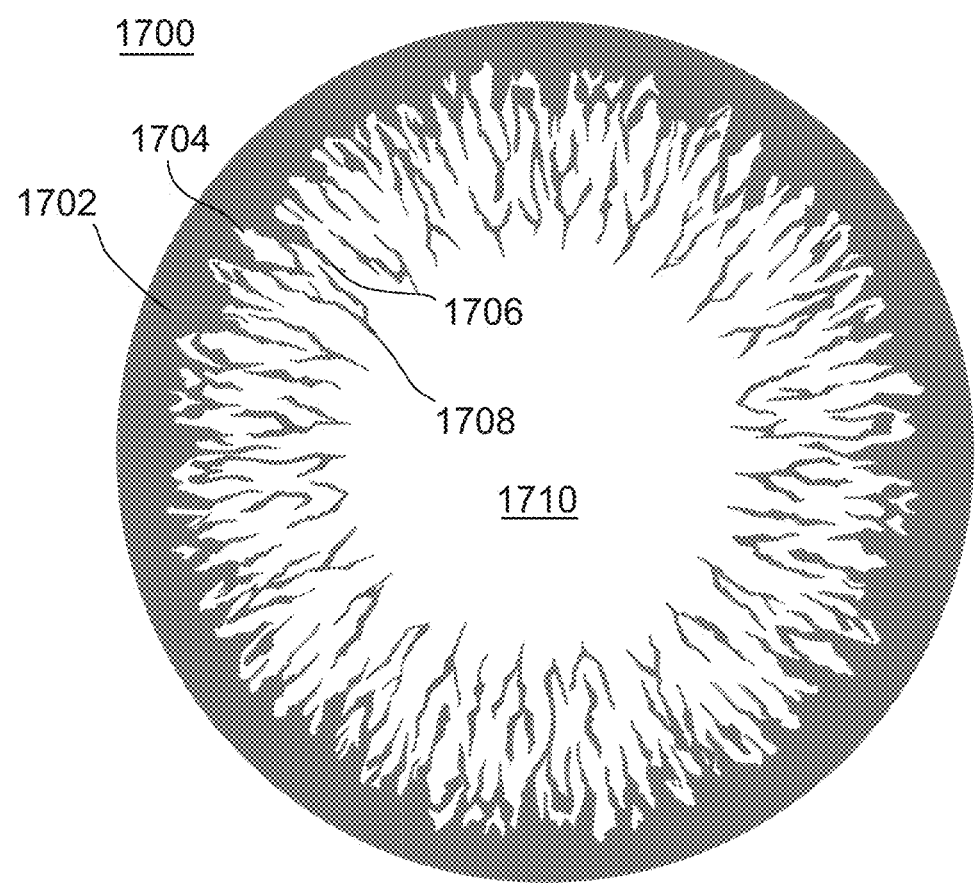
FIG. 17A is a plan view of a fourth exemplary limbal design graphic in accordance with the present invention.

Referring to FIG. 17A, there is illustrated a fourth exemplary embodiment of a limbal design graphic 1700 in accordance with the present invention. In this exemplary embodiment, the limbal design graphic 1700 comprises a translucent annular band 1702 that is approximately 0.85 mm in width. Connected to and extending from the innermost border 1704 of the translucent annular band 1702 towards the geometric center of the limbal design graphic 1700 are a plurality of geometric structures 1706 that resemble crypts in a natural iris. Additional geometric structures 1708 also extend towards the geometric center of the limbal design graphic 1700, but are not attached to the translucent annular band 1702. Crypts are a physical feature found on the natural iris that are a series of openings located on either side of the collarette. Crypts on the base of the iris are additional openings that may be observed close to the outermost part of the ciliary portion of the iris. As stated above, all of the elements in the design graphics are designed to look like naturally occurring structures within the iris, for example, pupillary muscle structures, folds or radial furrows, crypts, ciliary structures and the like. The translucent annular band 1702 is designed to overlie and enhance the wearer's limbal region while the protruding structures 1706 and 1708 are designed to enhance the wearer's iris and blend the annular band 1702 in with the iris. The space between the geometric structures creates shapes depending on overlapping and underlying elements, including pigmented shapes and features as well as exposed iris. The central portion 1710 of the design graphic 1700 may be clear as this portion of the region corresponds to the pupil. It is important to note; however, that tints may be utilized in this central portion 1710. In addition, tints may be utilized in the space between the elements.

In this exemplary embodiment, the entire limbal design graphic 1700 is a translucent dark brown formed from a composition comprising brown iron oxide, and black iron oxide pigments in proportions to create a color in the brown to black family. Although the limbal design graphic is translucent, in other exemplary embodiments, it may comprise opaque elements and/or a combination of opaque and translucent elements. The limbal design graphic 1700 is printed utilizing the techniques described in detail subsequently and it is printed first. In other words, it is the first graphic design of the overall design that is to be incorporated into the lens. The order of printing affects the overall design as described in greater detail subsequently.

Figure 17B:
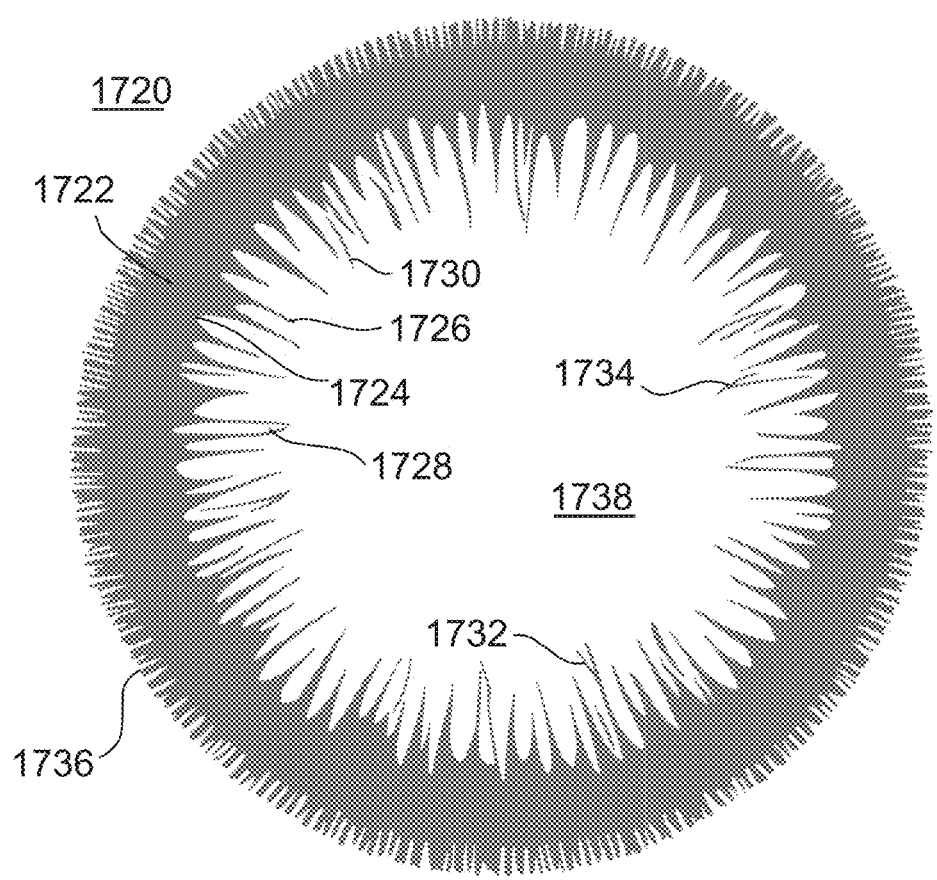
FIG. 17B is a plan view of a fourth exemplary outer effect design graphic in accordance with the present invention.

FIG. 17B illustrates a fourth exemplary embodiment of an outer effect design graphic 1720 in accordance with the present invention. It is important to note that the order of the printing of the inner and outer effect graphics are changed in this exemplary embodiment relative to the first two exemplary embodiments. In this exemplary embodiment, the outer effect design graphic 1720 comprises a translucent annular band 1722 that is approximately 0.89 mm in width. Connected to and extending from the innermost border 1724 of the translucent annular band 1722 are a plurality of long, medium, and short substantially triangular shaped structures 1726. Some of the substantially triangular shaped structures touch one another at the apex to form an enclosed space 1728. The outer effect design graphic 1720 also comprises a plurality of lines 1730 which are not connected to the translucent annular band 1722 and are interspersed between the substantially triangular shaped structures and oriented in the same direction; namely, towards the geometric center of the outer effect design graphic 1720. Some of the substantially triangular shaped structures or protrusions 1726 have branches 1732 and some of the lines 1730 have branches 1734. All of these structures are designed to look like naturally occurring structures within the iris, for example, pupillary muscle structures, folds or radial furrows, crypts, ciliary structures and the like. The outer perimeter of the annular band 1722 comprises comb-like structure 1736 which alters the appearance of the transparent annular band 1722 to a less defined structure. The comb-like structure 1736 is intended to soften and blend the overlapping line created by overlapping translucent colors from the other layers. The outer effect design graphic 1720 is designed to overlie and enhance the translucent annular band 1702 of the limbal design graphic 1700. In addition, the outer effect design graphic 1720 overlies the protruding structures 1706 and 1708 of the limbal design graphic 1700 in such a way as to have overlapping sections as well as filling in some or portions of the negative space between the protruding structures 1706 and 1708. The outer effect design graphic 1720 fills in more negative space and the overlapping sections or positive space create areas of additional hues, areas of different levels of opacity and different designs separate and distinct from any single layer. In addition, the negative space left between the overlapping areas creates shapes and patterns that assist in blending and cosmetic effect by working in conjunction with the natural iris. The negative space between the elements of the design creates shape, depending on overlapping and underlying elements; including pigmented shapes and features as well as exposed iris. The central portion 1738 may be clear as this portion of the lens corresponds to the pupil. It is important to note; however, that tints may be utilized. In addition, tints may be utilized in the negative space of the design. The comb-like structure 1736 alters the outer diameter of the annular band 1702 of the limbal design graphic 1700 by softening its appearance.

In this exemplary embodiment, the entire outer effect design graphic 1720 is a translucent brown formed from a composition comprising red-iron oxide, titanium dioxide, trans-oxide yellow, yellow iron oxide, brown iron oxide and black iron oxide pigments in proportion to create a color that is in the brown to black family. In this exemplary embodiment, where the outer effect design graphic 1720 and the limbal design graphic 1700 overlap, they create a darker, more defined/opaque area, while the portions of the designs that do not overlap have a more translucent coloring providing translucent blending from opaque to clear. This technique allows for blending with the natural iris. The outer effect design graphic 1720 comprises translucent elements, but may include opaque as well as a combination of translucent and opaque elements in other embodiments. This outer effect graphic 1720 is printed utilizing the techniques described in detail subsequently and is printed second in order after and on top of the limbal effect graphic layer 1700. This printing order is from the manufacturing standpoint. From an observer's perspective, this layer or graphic would be behind the limbal layer 1700. The outer diameter of the outer effect graphic 1720 is less than the outer diameter of the limbal design graphic 1700 while the inner diameters are substantially equal.

Figure 17C:
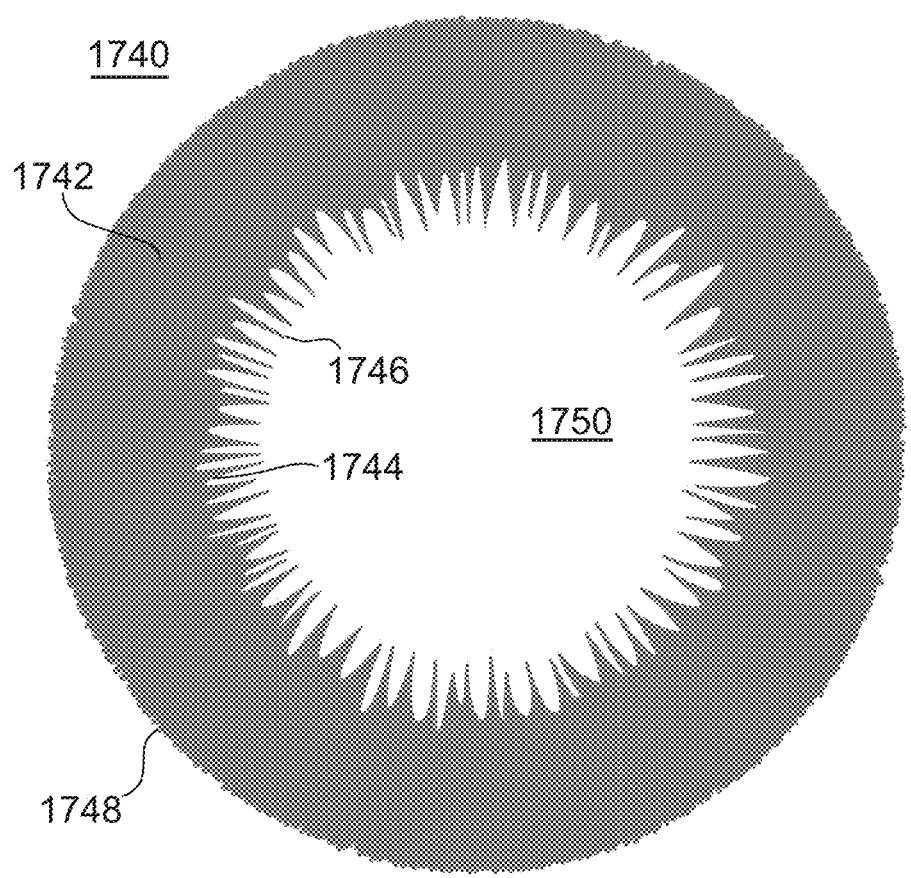
FIG. 17C is a plan view of a fourth exemplary inner effect design graphic in accordance with the present invention.

FIG. 17C illustrates a fourth exemplary embodiment of an inner effect design graphic 1740 in accordance with the present invention. In this exemplary embodiment, the inner effect design graphic 1740 comprises a translucent annular band 1742 that is approximately 2.03 mm in width. As may be readily seen from this illustration, the annular band 1742 is much wider than the other annular bands in this exemplary embodiment. Connected to and extending from the innermost border 1744 of the translucent annular band 1742 is a plurality of substantially triangular shaped structures or protrusions 1746 extending inwards towards the geometric center of the inner effect design graphic 1740. These protrusions are designed to look like naturally occurring structures within the iris, for example, pupillary muscle structures, folds or radial furrows, crypts, ciliary structures and the like. The outer perimeter of the annular band 1742 comprises an inconsistent surface 1748 to soften/blend a hard line overlapping area which alters the appearance of the translucent annular band 1742 to a less defined structure. It is less pronounced than the comb-like structure 1736 of the outer effect design graphic 1720. The inner effect design graphic 1740 is designed to overlie and enhance the translucent annular bands 1702 and 1722 of the limbal design graphic 1700 and the outer effect design graphic 1720 respectively. Once again, the substantially triangular shaped structures 1746 overlap and fill in the space between the protrusions 1706 and 1708 of the limbal design graphic 1700 and the elements 1726, 1728 and 1730 of the outer layer design graphic 1720. The sections of overlapping translucent pigment create additional hues within the pattern that may be darker or lighter depending on the colors utilized in the individual underlying structures as well as differing levels of translucency. The space between the elements of the pattern creates shapes, depending on overlapping and underlying elements, including pigmented shapes and features as well as exposed iris. The central portion 1750 of the inner effect graphic 1740 may be clear as this portion of the design corresponds to the pupil. It is important to note; however, that tints may be utilized in this region or zone as well as in the negative space of the design.

In this exemplary embodiment, the entire inner effect design graphic 1740 is a translucent brown formed from a composition comprising red iron oxide, phthalocyanine blue, titanium dioxide, trans-oxide yellow, yellow iron oxide, brown iron oxide, and black iron oxide pigments in proportions to create a color in the brown to black family. This inner effect design graphic 1740 is printed utilizing the techniques described in detail subsequently and is printed third in order after the outer effect graphic 1720. In other words, the inner effect design graphic 1740 is printed after and on top of the outer design graphic 1720. The printing order is from the manufacturing standpoint. From an observer's perspective, this layer or graphic would appear behind the other layers or graphics. The inner effect design graphic 1740 comprises translucent elements, but may also comprise opaque elements and/or a combination of opaque and translucent elements. The outer diameter of the inner effect design graphic 1740 is less than the outer diameter of the limbal design graphic 1700 while the inner diameters are substantially equal.

Figure 17D:
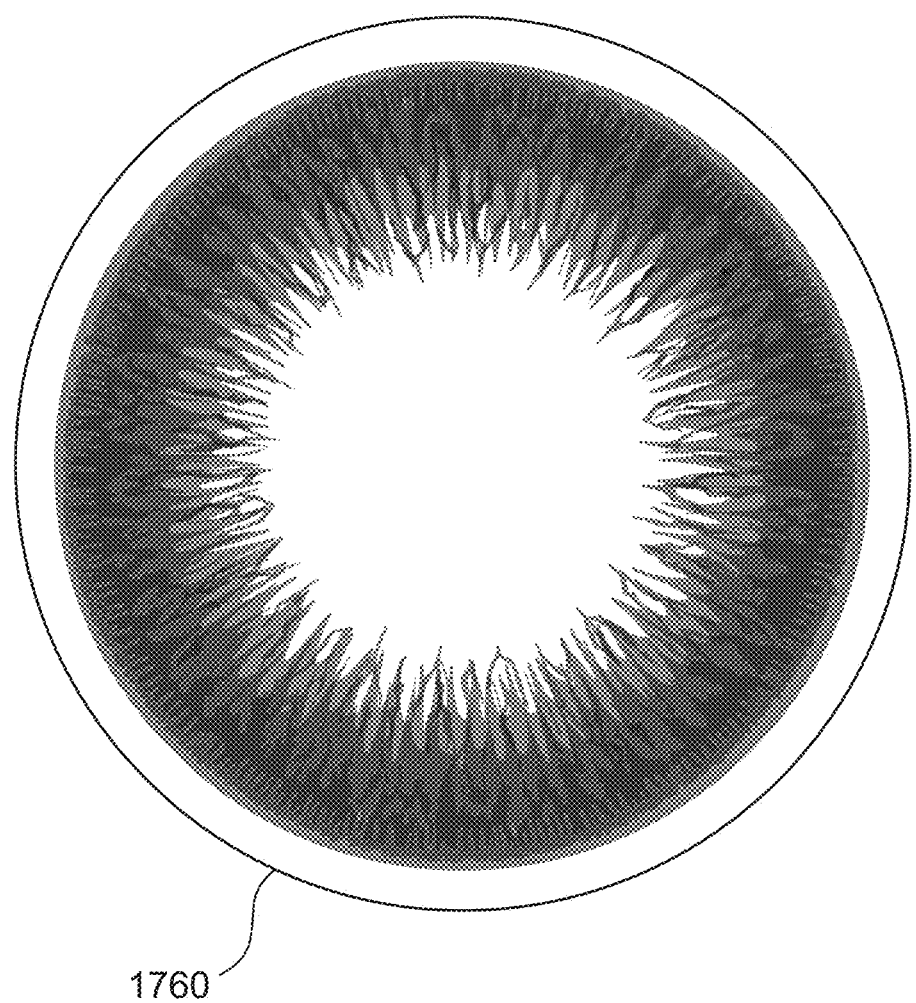
FIG. 17D is a plan view of a fourth exemplary cosmetic contact lens comprising the three design graphics of FIGS. 17A, B and C in accordance with the present invention.

FIG. 17D illustrates a fourth exemplary embodiment of a cosmetic contact lens 1760 comprising all three layers or design graphics 1700, 1720 and 1740 printed in the order described above. It is important to note that the printing order is different than in the other two exemplary embodiments described above as the inner and outer effect layers are switched as in the previous exemplary embodiments described above. In addition, all three design graphics have annular bands creating a unique limbal ring design pattern. While the printing order is described from a manufacturing perspective, when an observer is viewing the contact lens on eye, the visual effect is that of seeing the design graphics in a reverse order from that described above. As shown, the overlapping layers comprise different colors, different hues, different levels of lightness, and different levels darkness and patterns forming a unique structure. Changes in either both the printing order or colors will result in a different design. Changes in translucency may also be achieved.

The overall design created by the three layers comprises an annular structure with an inner diameter in the range from about 6.4 to about 6.6 mm and an outer diameter in the range from about 12.70 mm to about 12.775 mm. This annular structure is similar to the iris structure of the eye by design. The open or negative space in the center of the lens corresponds to the pupillary region or optical zone of the eye and is preferably clear so as not to interfere with vision. However, as set forth above, this region may be tinted as may be the negative space between the elements of the design.

Figure 18A:
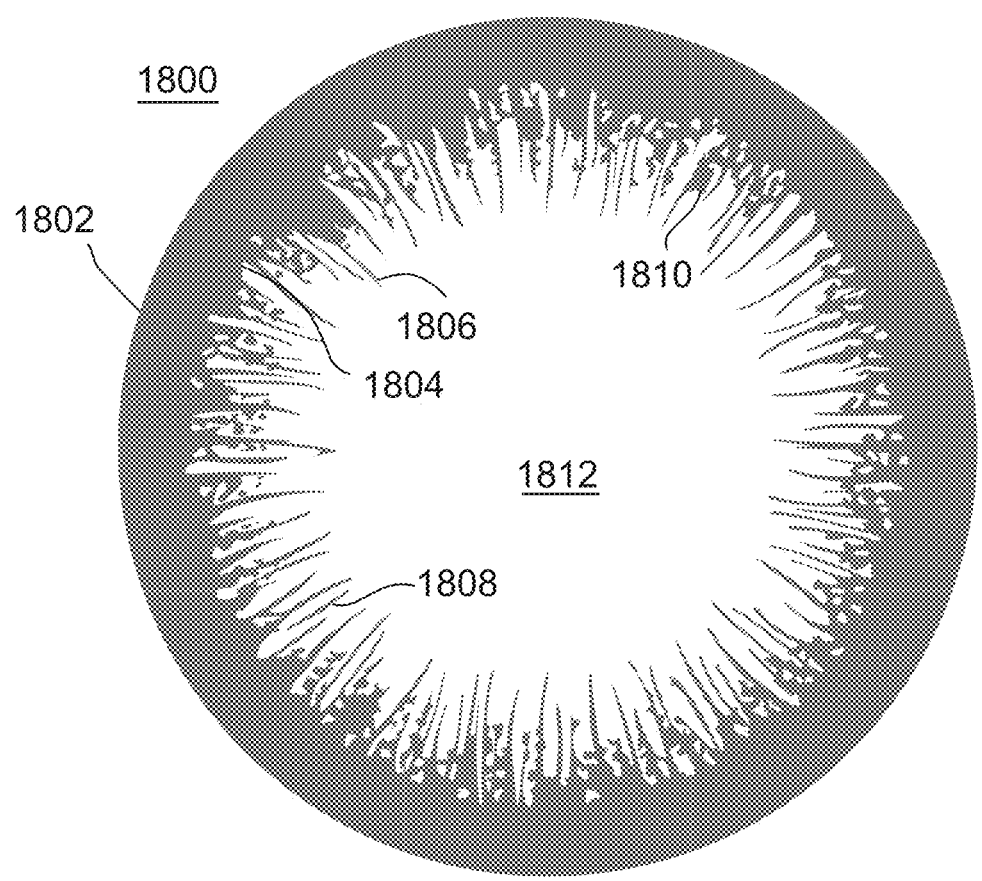
FIG. 18A is a plan view of a fifth exemplary limbal design graphic in accordance with the present invention.

Referring to FIG. 18A, there is illustrated a fifth exemplary embodiment of a limbal design graphic 1800 in accordance with the present invention. In this exemplary embodiment, the limbal design graphic 1800 comprises a translucent annular band 1802 that is approximately 1.15 mm in width. Connected to and extending from the innermost border 1804 of the translucent annular band 1802 towards the geometric center of the limbal design graphic 1800 are plurality long, medium and short hair-like structures 1806. Additional hair-like structures 1808 which are not connected to the translucent annular band 1802 are interspersed between the other hair-like structures 1806. Additional structures 1810 are free form geometric shapes that may resemble circles, squares, triangles and any combination thereof. These shapes may touch one another or be independent of one another, and overlie and occupy the space between the hair-like structures 1806 and 1808. All of these structures are designed to look like naturally occurring structures within the iris, for example, pupillary muscle structures, folds or radial furrows, crypts, ciliary structures and the like. The translucent annular band 1802 is designed to overlie and enhance the wearer's limbal region while the protruding structures 1806, 1808 and 1810 are designed to enhance the wearer's iris and blend the translucent annular band 1802 in with the wearer's iris. The space between the hair-like structures create shapes depending on overlapping and underlying elements, including pigmented shapes and features as well as exposed iris. The central portion 1812 of the limbal design graphic 1800 may be clear as this portion of the design corresponds to the pupil. It is important to note; however, that tints may be utilized in this central portion. In addition, tints may be utilized in the negative space between design elements.

In this exemplary embodiment, the entire limbal design graphic 1800 is a transparent black formed from black iron oxide pigments. In other embodiments, the limbal design graphic may comprise opaque elements and/or a combination of opaque and translucent elements. The limbal design graphic 1800 is printed utilizing the techniques described in detail subsequently and it is printed first. In other words, it is the first graphic layer of the overall design that is to be incorporated into the lens. The order of printing affects the overall design as described in greater detail subsequently.

Figure 18B:
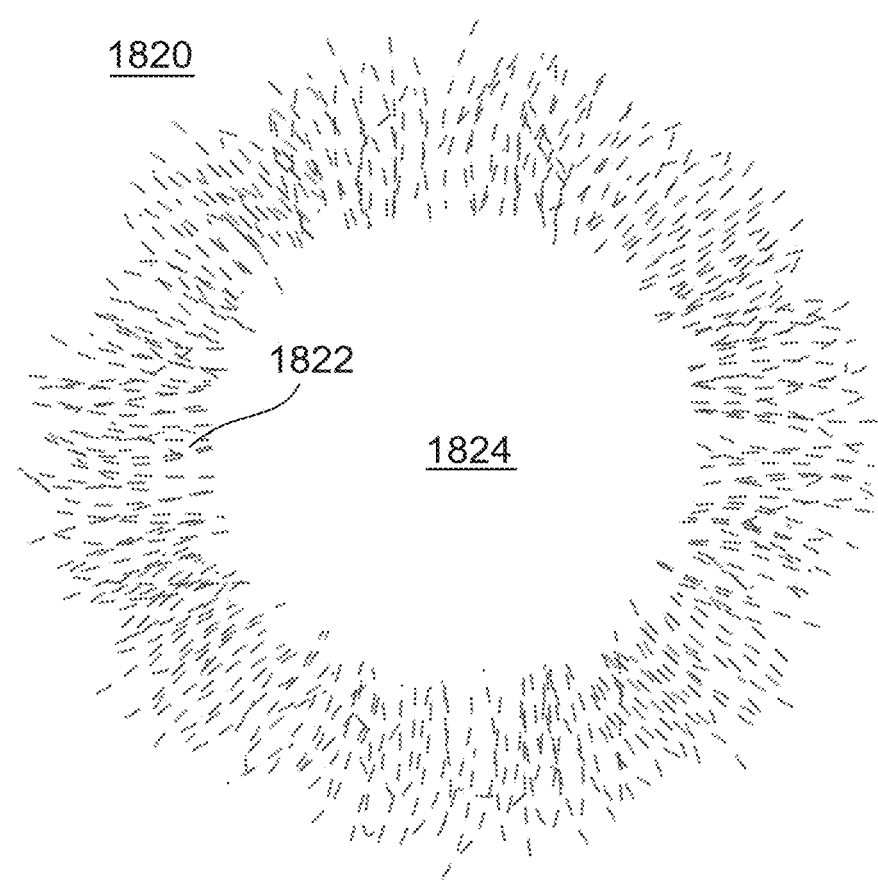
FIG. 18B is a plan view of a fifth exemplary inner effect design graphic in accordance with the present invention.

FIG. 18B illustrates a fifth exemplary embodiment of an inner effect design graphic 1820 in accordance with the present invention. The inner effect graphic 1820 comprises an annular band of non-interconnected, long, medium and short dotted/dashed lines 1822 generally oriented towards the geometric center of the inner effect graphic 1820. The overall effect is designed to look like naturally occurring structures within the iris, for example, pupillary muscle structures, folds or radial furrows, crypts, ciliary structures and the like. In this exemplary embodiment, the inner effect design graphic 1820 serves to provide a subtle enhancement that retains translucency and/or color in a given area while hinting at the directional lines that may be found in the radial furrows or ciliary zone of the natural iris. This subtle enhancement also functions to impart small pin-points of highlight. The inner effect design graphic 1820 is designed to overlie and enhance the wearer's iris and at least partially overlaps with the translucent annular band 1802 of the limbal design graphic 1800. In addition, the inner effect design graphic 1820 overlies the protruding structures 1806, 1808, and 1810 of the limbal design graphic 1800 in such a way as to have overlapping opaque sections as well as filling in some or a portion of the negative space between the protruding structures 1806, 1808, and 1810. The sections that overlap will be of a different color than the individual underlying structures as well as a different level of translucency. In addition, the overlapping areas may be darker or lighter depending on the colors utilized in the underlying individual structures. The space between the elements of the pattern creates shapes, depending on overlapping and underlying elements, including pigmented shapes and features as well as exposed iris. The central portion 1824 of the design graphic 1820 may be clear as this portion of the design corresponds to the pupil. It is important to note; however, that tints may be utilized in this region as well as in the negative space between design elements.

In this exemplary embodiment, the entire inner effect design graphic 1820 is a transparent orange formed from a composition comprising red iron oxide, trans-oxide yellow, yellow iron oxide, brown iron oxide, and trans-oxide red pigments in proportions to create a color in the orange family. The orange family includes yellows and golds. These colors or colors in this family are meant to highlight the underlying natural iris color for individuals with brown or dark eyes. Different colors would be utilized for individuals with light eyes. The inner effect graphic 1820 may comprise opaque elements and/or a combination of opaque and translucent elements in alternative embodiments. This inner effect graphic 1820 is printed utilizing the techniques described in detail subsequently and is printed second in order after the limbal graphic 1800. In other words, the inner effect graphic 1820 is printed after and on top of the limbal design graphic 1800. This printing order is from a manufacturing standpoint. From an observer's perspective, this layer would appear behind the graphic 1800. The outer diameter of the inner effect design graphic 1820 is less than the outer diameter of the limbal design graphic 1800 while the inner diameters are substantially equal.

Figure 18C:
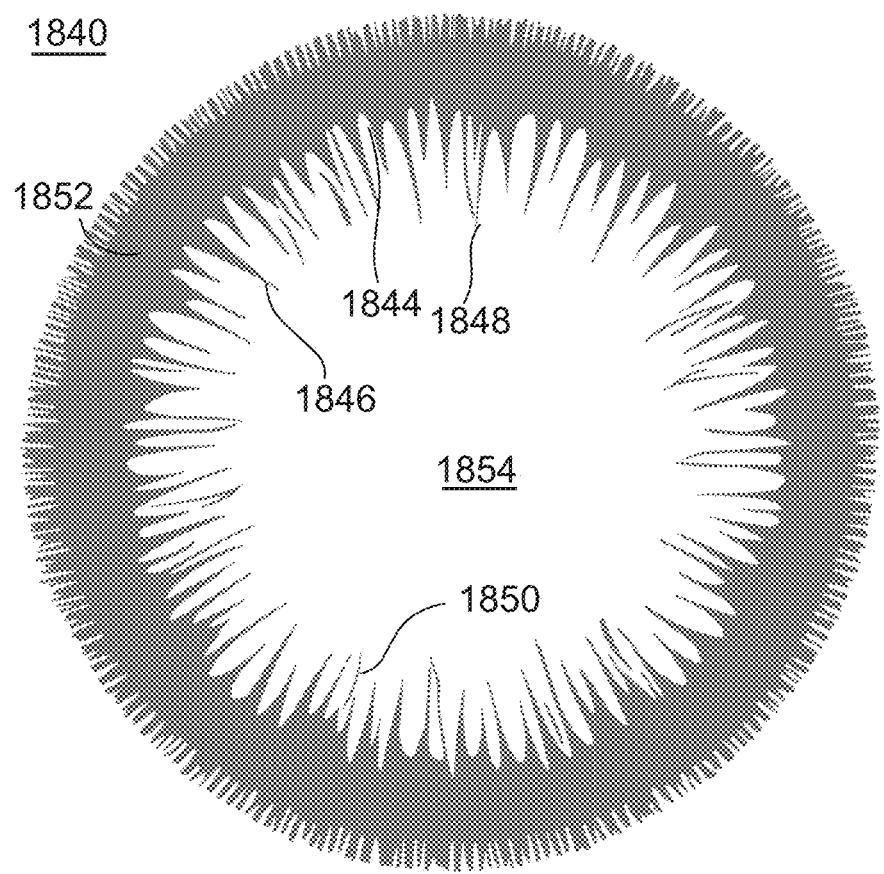
FIG. 18C is a plan view of a fifth exemplary outer effect design graphic in accordance with the present invention.

FIG. 18C illustrates a fifth exemplary embodiment of an outer effect design graphic 1840 in accordance with the present invention. In this exemplary embodiment, the outer effect design graphic 1840 comprises a translucent annular band 1842 that is approximately 1.44 mm in width. Connected to and extending from the innermost border 1844 of the translucent annular band 1842 is a plurality of long, medium, and short substantially triangular shaped structures 1846. Some of the substantially triangular shaped structures touch one another to form an enclosed space 1848. The outer effect design graphic 1840 also comprises a plurality of lines 1850 which are not connected to the translucent annular band 1842 and are interspersed between the substantially triangular shaped structures and oriented in the same direction; namely, towards the geometric center of the outer effect design graphic 1840. These structures are designed to look like naturally occurring structures within the iris, for example, pupillary muscle structures, folds or radial furrows, crypts, ciliary structures and the like. The outer perimeter of the annular band 1842 comprises comb-like structure 1852 which alters the appearance of the translucent annular band 1842 to a less defined structure. The comb-like structure 1852 is intended to soften and blend the overlapping line created by overlapping translucent colors from the three layers. The outer effect design graphic 1840 is designed to overlie and enhance the translucent annular band 1802 of the limbal design graphic 1800 as well as the entire inner effect design graphic 1820 and the protruding structures 1806, 1808, and 1810 of the limbal design graphic 1800. The outer layer design graphic 1840 fills in more negative space and the overlapping sections or positive space creates additional hues, areas of different levels of opacity and different designs separate and distinct from any single layer. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1854 may be clear as this portion of the lens corresponds to the pupil. It is important to note; however, that tints may be utilized. The comb-like structure 1852 alters the outer diameter of the translucent annular band 1802 of the limbal design graphic by creating a shape that disrupts the hard line of the limbal design graphic 1800.

In this exemplary embodiment, the entire outer effect design graphic 1840 is a translucent brown formed from a composition comprising red iron oxide, titanium-dioxide, trans-oxide yellow, yellow-iron oxide, brown iron oxide and black iron oxide pigments to create a family or colors ranging from brown to black. In this exemplary embodiment where the outer effect design graphic 1840 and the limbal design graphic 1800 overlap, they create a darker, more defined/opaque area, while the portions of the designs that do not overlap leave a more translucent coloring providing translucent blending from opaque to clear. This technique allows for blending with the natural iris. This outer effect graphic 1840 is printed utilizing the techniques described in detail subsequently and is printed third in order after and on top of the inner effect graphic layer 1820. This printing order is from the manufacturing standpoint. From an observer's perspective this layer would appear behind the inner design graphic 1820. The outer diameter of the outer effect graphic 1840 is less than the outer diameter of the limbal design graphic 1800 while the inner diameters are substantially equal.

Figure 18D:
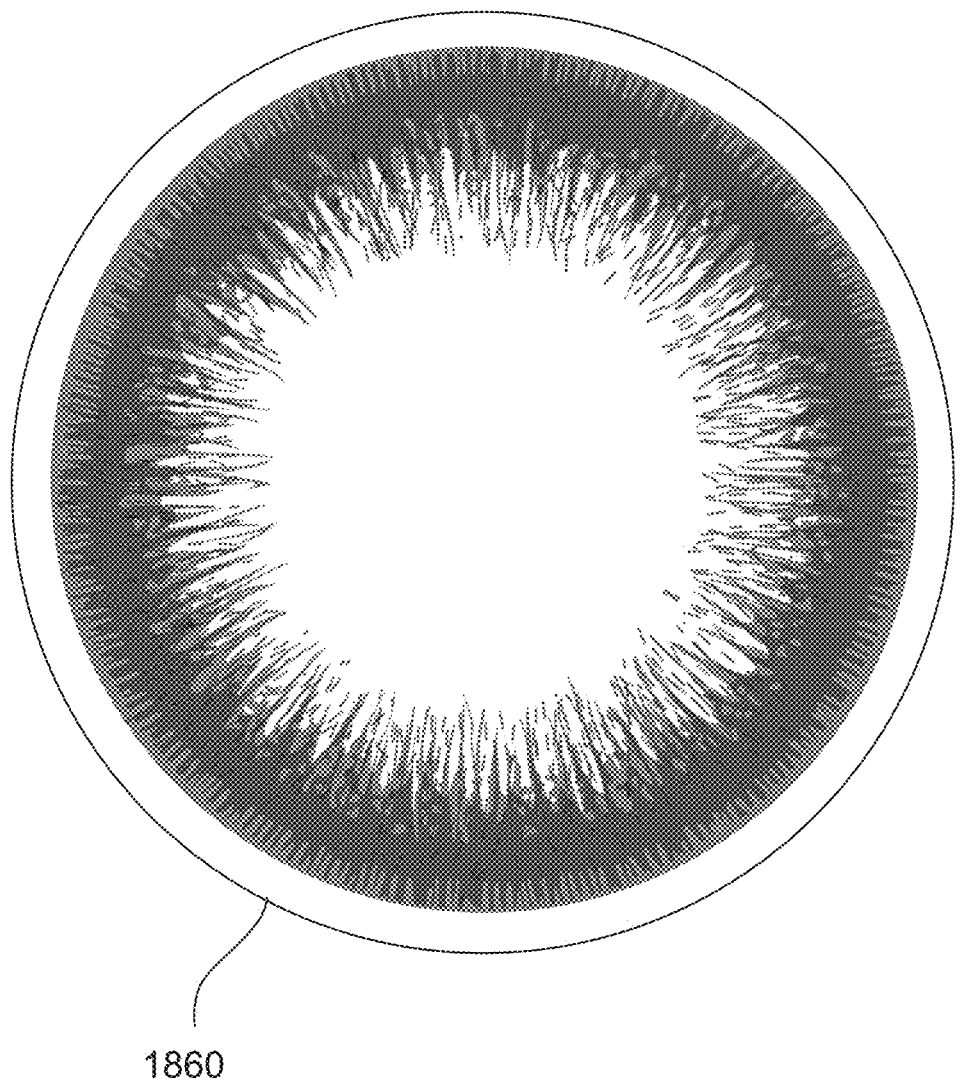
FIG. 18D is a plan view of a fifth exemplary cosmetic contact lens comprising the three design graphics of FIGS. 14A, B and C in accordance with the present invention.

FIG. 18D illustrates a fifth exemplary embodiment of a cosmetic contact lens 1860 comprising all three layers or design graphics 1800, 1820 and 1840 printed in the order described above. Once again the order of the printing has returned back to the limbal, inner and outer effect graphics as is the case with the first two exemplary embodiments. While the printing order is described from a manufacturing perspective, when an observer is viewing the contact lens on eye, the visual effect is that of seeing the layers or design graphics in reverse order from that described with respect to printing. As shown, the overlapping layers comprise different colors, hues, lightness, darkness and patterns forming a unique structure. Changes in either both the printing order or colors will result in a different design as set forth in detail subsequently. Changes in translucency may also be achieved.

The overall design created by the three layers comprises an annular structure with an inner diameter in the range from about 6.7 to about 7.1 mm and an outer diameter in the range from about 12.675 mm to about 12.750 mm. This annular design is similar to the iris structure of the eye by design. The open or negative space in the center of the lens corresponds to the pupillary region or optical zone of the eye and is preferably clear so as not to interfere with vision. However, tints may be utilized in this region as well as in the negative space between design elements.

The above described exemplary embodiments relate to contact lenses that comprise a multi-layer design which may be utilized to enhance and/or highlight the appearance of the eyes upon which the contact lenses are positioned while maintaining a natural look. These exemplary designs each comprise three layers; namely, a unique limbal design graphic, a unique inner effect graphic and a unique outer effect graphic. The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture may be utilized to create variation in the iris. As used in two dimensional art, texture is created by the use of light and dark. Light and dark elements may also be utilized to imply depth and form.

As set forth above, the present invention utilizes three distinct layers to provide more depth and variation in the overall pattern. The limbal design graphic is the portion of the overall pattern that surrounds the outer diameter of the iris and is closest to the sclera and is meant to highlight, enhance and/or define the limbal region of the eye; however, it also comprises elements that extend into the iris. The inner effect graphic layer is the portion of the overall pattern that is meant to enhance the iris; however, it may comprise a portion that also contributes to highlighting, enhancing and/or defining the limbal region of the eye. The outer effect graphic layer is the portion of the overall pattern that is meant to enhance the iris; however, it may comprise a portion that also contributes to highlighting, enhancing and/or defining the limbal region of the eye. The multiple layer approach of the present invention may be utilized to create varying levels of transparency and/or opacity utilizing overlapping and non-overlapping translucent layers.

While the above described exemplary embodiments illustrate the various design features that may be utilized in a cosmetic contact lens, it is important to note that various combinations and sub-combinations of the elements/features may be utilized to create new designs. A change in the order of print may impact the overall design. A change in any single color in at least one layer may impact the overall design. A change in the design in any single layer may impact the overall design and a change in any of the features of any design in any single layer may impact the overall design. A change in the size of any design and/or the degree of overlap between the layers may impact the overall design. A change in the amount of negative space/positive space in any single layer or in each of the layers may impact the overall design. A change in the translucency of any or all of the layers may impact the overall design. In addition, additional layers may also impact the overall design. The exemplary embodiments set forth above illustrate the different designs that may be achieved utilizing the various design elements described herein.

Although a number of terms are utilized throughout the specification, all designs described herein are meant to enhance the appearance of a wearers' eyes. Accordingly, as used herein the term enhance shall include accentuate, highlight, define, demark, improve, reinforce, amplify, magnify, intensify and/or any action which cosmetically alters the appearance of a wearers' eyes.

It is important to note that all of the color formulations set forth herein and related to the present invention are generally described with respect to the pigment content and are generally classified as a particular color. It is also important to note that any suitable colors may be utilized in implementing the present invention.

The designs/patterns/colors for the different regions of a cosmetic contact lens are developed based upon market research. These patterns are then etched into metal structures generally referred to as a cliché. More specifically, a metal plate, preferably made from steel and more preferably from stainless steel, is covered with a photo resist material that is capable of becoming water insoluble once cured. The patterns are selected or designed and then reduced to the desired size utilizing any of a number of suitable techniques such as photographic techniques, placed over the metal plate, and the photo resist material is cured. The metal plate or cliché is subsequently washed with an aqueous solution and the resulting image or pattern is etched into the metal plate to a suitable depth, for example, about twenty (20) microns. Once the clichés are fabricated, a multi-step process is utilized to manufacture the cosmetic contact lens as described below.

FIG. 19 illustrates a general overview of the pad printing process utilized in the manufacturing process. The first step, 1902, in the process is filing of the cliché cavities with the desired colorant. The cliché 1901 comprises a number of cliché cavities 1903 with the particular pattern etched therein. The second step, 1904, in the process involves the removal of excess ink or colorant from the surface of the clichés 1901. Excess ink is typically removed from the surface of the clichés 1901 through the use of a doctoring blade or doctoring blades on a cup 1905. In the third step, 1906, of the process, the colorant is dried on the clichés 1901. In the fourth step, 1908, of the process, the colorant in the cliché's 1901 is picked up by pads. In the fifth step, 1910, of the process, the colorant is dried or is allowed to dry on the pads. In the sixth step, 1912, of the process, the colorant is transferred from the pads to the front curve surface wherein additional processing is performed as described below. In the seventh step, 1914, of the process, the colorant is dried or is allowed to dry on the front curve surface of the front curve mold half. The process is then repeated for the remaining two effect layers.

FIG. 20 provides a more detailed process description. In the first step, 2002, an unprinted front curve mold for the contact lens is provided. In the second step, 2004, a clear base, i.e. no pigment or dyes is applied to the front curve. The clear base depends on the lens material to be utilized as set forth in greater detail below. In the third step, 2006, ink, including solvents, clear base and pigments is applied to the clear base printed front curve. Once again, this is repeated so that all three layers are applied to the clear base printed base curve. In the fourth step 2008, the printed front curve is then dosed with a reactive monomer mixture, for example, etafilcon-A. In the fifth step, 2010, of the process, the back curve mold for the contact lens is positioned on the front curve mold where it remains for two (2) minutes while the temperature is maintained at seventy (70) degrees C. In the sixth step, 2012, of the process, the reactive monomer mixture between the front and back curve is exposed to visible light for curing. This curing step utilizes visible light at five (5) mW for four (4) minutes at a temperature of seventy (70) degrees C. In the seventh step, 2014, of the process the contact lens from the mold is hydrated for one (1) hour in seventy (70) degrees C. solution of 800 ppm Tween 80 and de-ionized water and for an additional one (1) hour in forty-five (45) degree C. de-ionized water. In the eighth step, 2016, of the process, the contact lens is steam sterilized in its own packaged saline solution for eighteen (18) minutes at a temperature of one hundred twenty-four (124) degree C. It is important to note that the above-described process has been simplified for ease of explanation.

As set forth above, the lens forming material comprises etafilcon A. Etafilcon A is a well-known and patented material for manufacturing contact lenses. Etafilcon A is a copolymer of 2-hydroxyethal methacrylate and methacrylic acid cross-linked with 1,1,1-trimethyol propane trimethacrylate and ethylene glycol dimethacrylate. Etafilcon A is utilized in a number of contact lenses available from VISTAKON® a division of Johnson & Johnson Vision Care, Inc. It is important to note that while etafilcon A is utilized in the exemplary embodiments described herein, any suitable lens forming material may be utilized. For etafilcon A, the preferred binding polymers are a random block copolymer of HEMA, and MAA or a homopolymer of HEMA. The weight percentages, based on the total weight of the binding polymer, of each component in these embodiments is about 93 to about 100 weight percent HEMA and about 0 to about 2 weight percent MAA.

With the above described process or similar process, the pigments are enclosed within the clear base and the bulk material forming the lens. In other words, all pigmented layers are enclosed within the lens material and never contact the eye.

Figure 21:
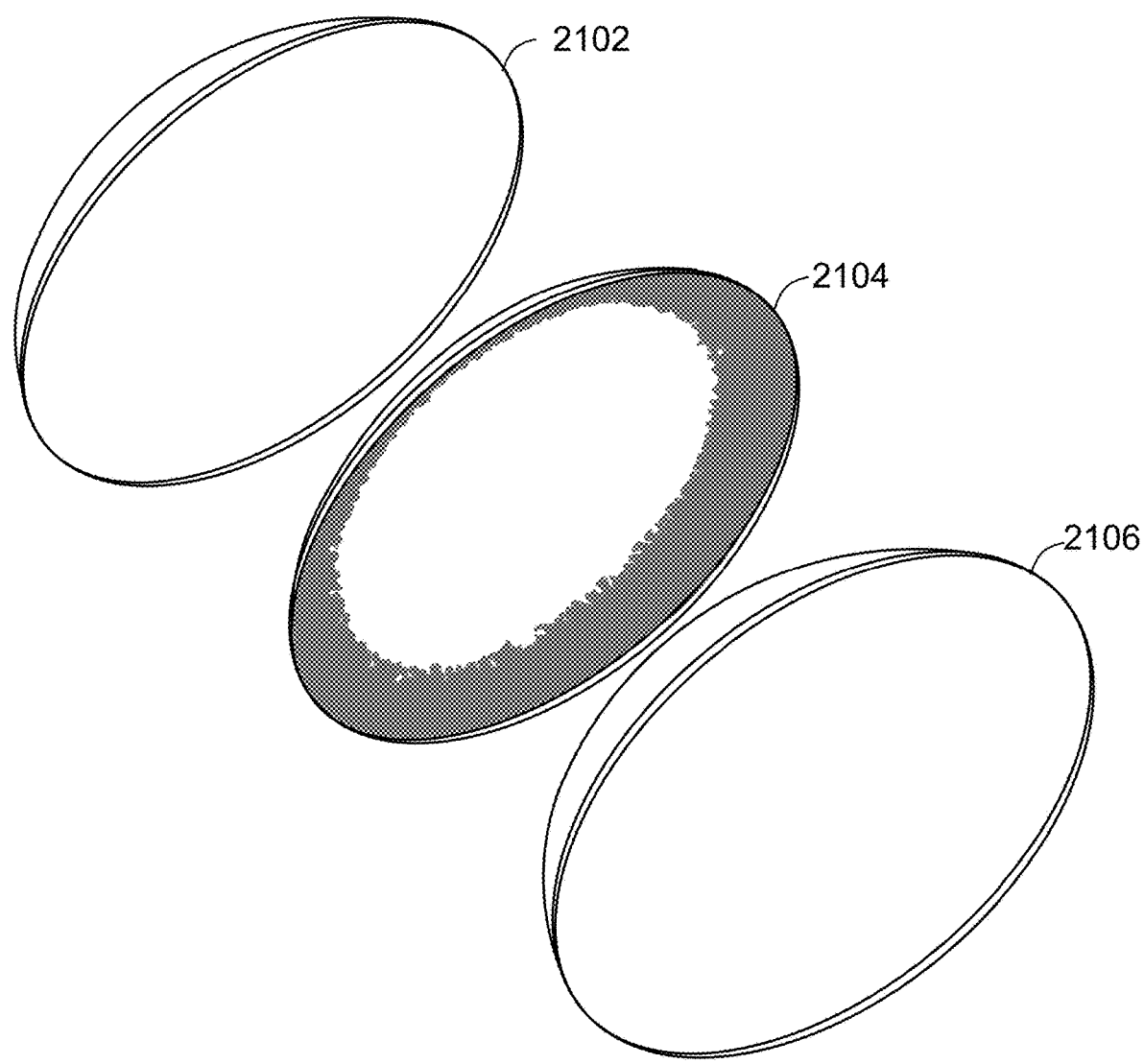
FIG. 21 is a diagrammatic representation of the layers comprising an exemplary contact lens.

FIG. 21 illustrates the basic structure of a cosmetic contact lens formed from the above described process. The one or more effect layers 2104 are sandwiched or encapsulated between the clear base 2102 and the bulk lens material 2106. Although only a single effect layer is illustrated, any number of effect layers or printed pigmented layers may be encapsulated between the other two layers. As illustrated, the contact lens comprises a full clear base layer to encapsulate the one or more pigmented printed layers within the lens material even though the one or more pigmented printed layers have a substantially annular structure. Even with spokes, no pigmented designs extend into the optical zone of the lens. In other words, with this design, the central optic zone or central optic area of the contact lens is covered with the clear base material. In order to maintain the precision optical surface and pathway and thus provide optimal vision, safety and comfort for the patient, the clear base material may be removed from the central optic areas by utilizing an annular pattern printing cliché to print the clear annular band on the front curve as opposed to the full coverage described in step 2004 above. The clear annular band may be sized to encapsulate or cover any design layer. More specifically, by properly dimensioning the cliché, the opening in the annular structure may be optimized to maintain optical quality while ensuring encapsulation of the pigmented print layers. As no design should enter the optical zone, there is no need to encapsulate anything in that region.

It is important to note that any number of terms may be utilized to describe the pigmented region that is encapsulated as set forth in this invention. For example, the pigmented layers may be referred to as effect layers, print layers, design layers and pigmented print layers.

Figure 22:
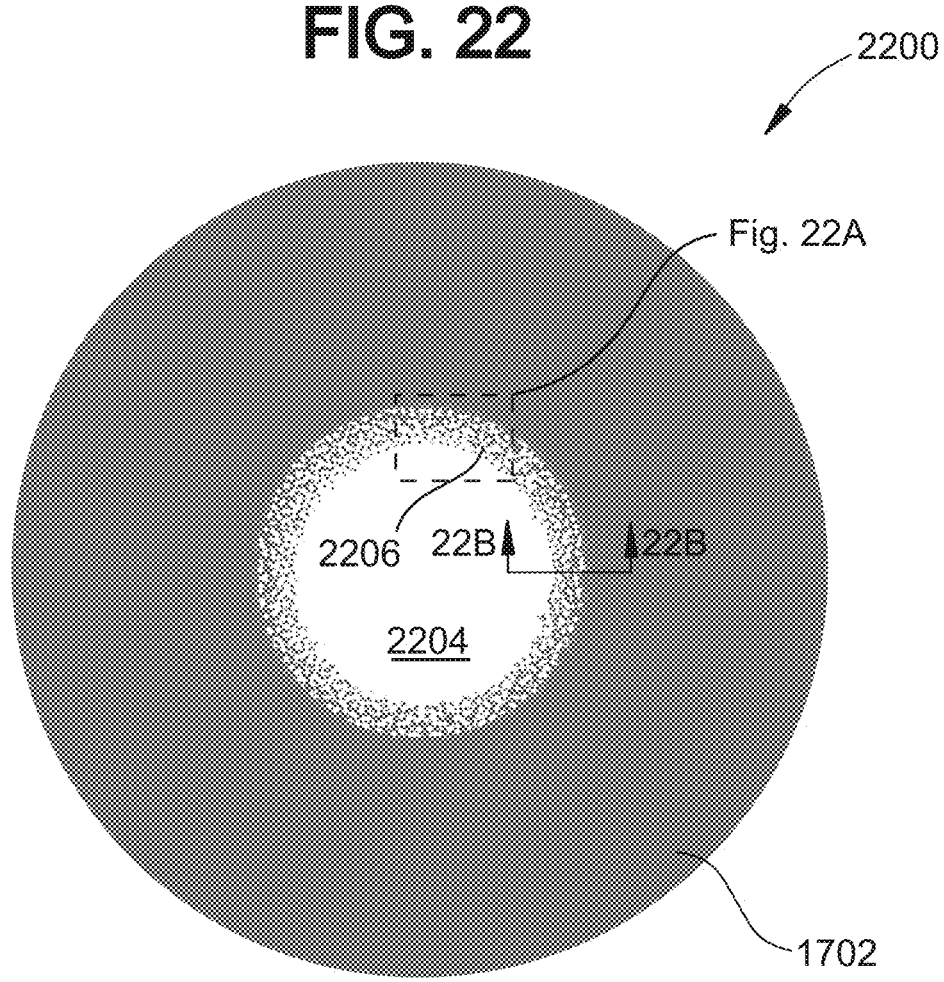
FIG. 22 is a diagrammatic representation of an exemplary clear base cliché in accordance with the present invention.
Figure 22A:
FIG. 22A is an exploded view of a section of the clear base cliché in accordance with the present invention.
Figure 22B:
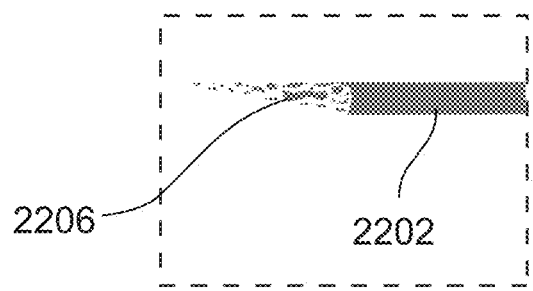
FIG. 22B is an exploded cross section of the clear base cliché in accordance with the present invention.

FIGS. 22, 22A and 22B illustrate an exemplary embodiment of a cliché 2200 that may be utilized in accordance with the present invention. In this exemplary embodiment, the cliché 2200 is utilized to deposit clear base material on the front curve mold in a substantially annular pattern. The process described above with respect to the ink deposition is utilized with base coat material first in this exemplary embodiment. In other words, the process described above with respect to FIGS. 19 and 20 is utilized first to deposit the clear base coat material on the front curve mold in a position that will allow for encapsulation of the pigments comprising any suitable design while allowing for the central optic area; namely, the area corresponding to the pupillary region of an eye, to be free of any clear base coat material. The modified clear base cliché 2200 eliminates the presence of clear base coat material in the optic zone while covering any pigmented designs or eliminates the presence of clear base coat material while covering all remaining portions of the front of the contact lens. In other words, the clear base may extend past the design to the edge of the lens. The cliché 2200 comprises a first annular section 2202, a transition section 2206 and an optic area opening 2204. The first annular section 2202 may extend from a position corresponding to the edge of the contact lens or any point inset from the lens edge that corresponds to a position proximate to the pigmented design to the transition section 2206. In accordance with exemplary embodiments of the invention, the first annular section 2202 has an inner diameter of about 3.9 mm and an outer diameter of about 17 mm. In a preferred embodiment, the first annular section 2202 has an inner diameter of about 6 mm and an outer diameter of about 13.5 mm. The first annular section 2202 is the portion of the cliché 2200 which will pick up the clear base material for transfer to the pad. The transition section 2206 is a much smaller annular band that extends from the inner diameter of the first annular section 2202 to an outer diameter of the optic area opening 2204. In accordance with exemplary embodiments of the invention, the transition section 2206 has an inner diameter of about 1.9 mm and an outer diameter of about 8 mm. In a preferred embodiment, the transition section 2206 has an inner diameter of about 4.4 mm and an outer diameter of about 6 mm. The transition section 2206 is configured to hold a diminishing amount of clear base coat material as it approaches the optic area opening 2204 and this may be accomplished in a number of different ways as set forth in detail herein. As illustrated, the transition section 2206 comprises a dithering pattern or matrix that picks up a certain amount of base coat material for deposition on the front curve mold. The transition section or zone 2206 is utilized to better blend or integrate the two materials together. More specifically, the transition section 2206 with the pattern/matrix and diminishing amount of base coat material to be transferred provides for a better blending/integration of the clear base coat material and the lens monomer, thereby reducing any induced stress that may occur in the absence of the transition section 2206. In an exemplary embodiment, the transition section 2206 has a thickness of about 30 microns proximate the first annular section 2202 and a thickness of about 0 microns proximate the optic area opening 2204. In a preferred embodiment, the transition section 2206 has a thickness of about 20 microns proximate the first annular section 2202 and a thickness of about 10 microns proximate the optic area opening 2204. However, after pad printing, the printed front curve is dosed with reactive monomer mixture and the back curve mold is positioned on the front curve mold to form the lens as set forth in detail above with no change in thickness of the lens.

It is important to note that any suitable process or technique may be utilized to encapsulate a pigmented design as long as no base coat material is deposited in the central optic zone, but rather only lens monomer. In addition, it is important to note that the dimensions of the clear base coat material to be transferred from the cliché 2200 are based on factors such as pad geometry and hardness, and ultimately on lens swell and measurement techniques.

The exemplary transition section 2206 described above comprises both a pattern/matrix, illustrated in detail in the exploded view of FIG. 22A, and a thickness gradient, illustrated in detail in the exploded sectional view of FIG. 22B. However, other exemplary transition sections may comprise only one or the other rather than a combination as set forth above. Specifically, in an alternative exemplary embodiment, the transition section may comprise only a pattern/matrix wherein a decrease in the density of the pattern functions to reduce the thickness of the material thereby leading to a reduction in potential induced stress. In another alternate exemplary embodiment, a solid layer of a diminishing amount of material may be utilized thereby leading to a reduction in potential induced stress. The pattern/matrix, whether utilized alone or in combination with the thickness gradient profile may comprise any suitable pattern. For example, the pattern may comprise any suitable geometric design, a dithering design, a dot matrix design or any random design. The design illustrated in FIGS. 22 and 22A are a basic design with the density of the features decreasing from the first annular section 2202 towards the optic area opening 2204.

Figure 23:
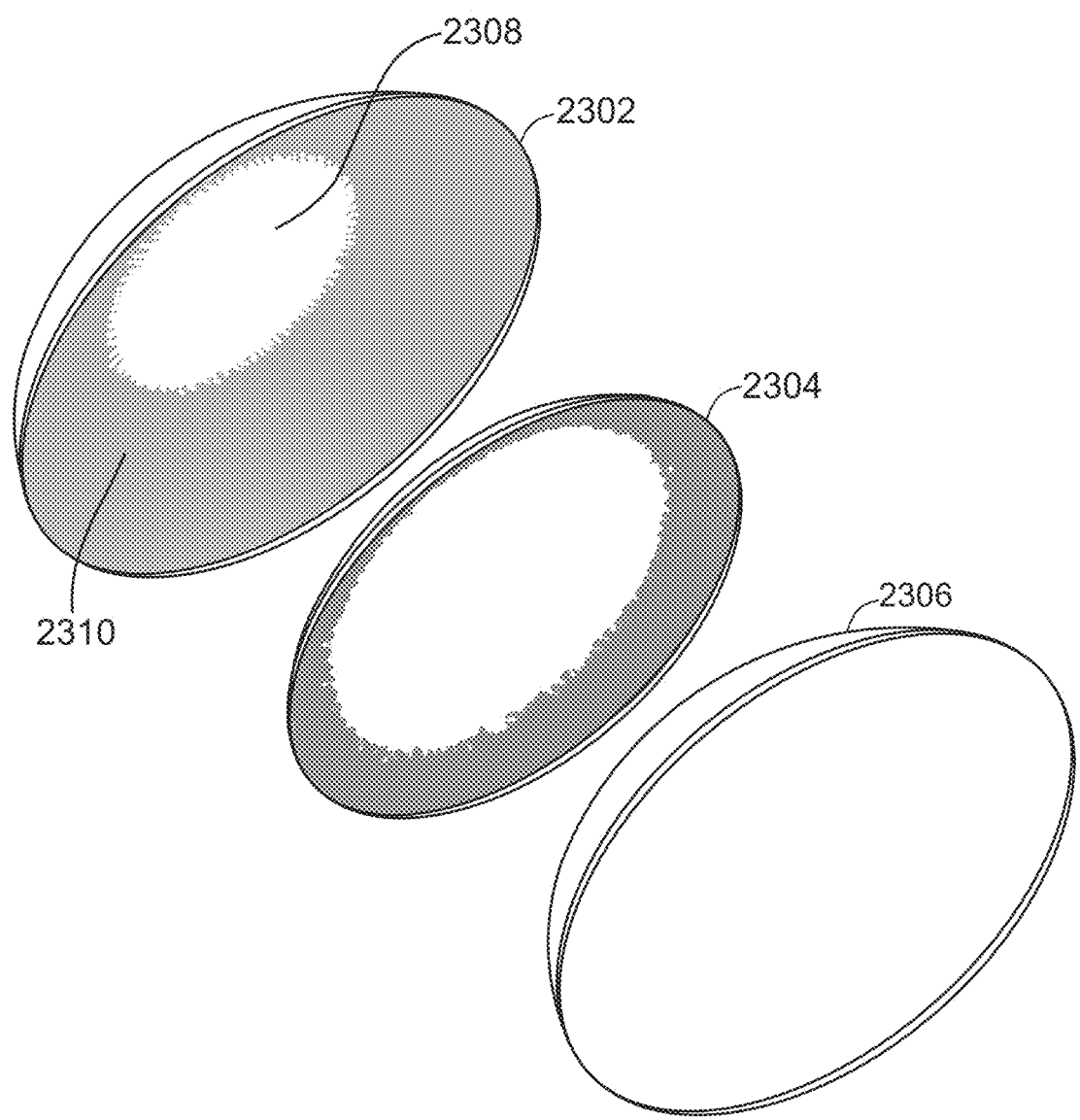
FIG. 23 is a diagrammatic representation of the layers comprising a cosmetic contact lens having an annular clear base layer in accordance with the present invention.

FIG. 23 illustrates the basic structure of a cosmetic contact lens formed from the above described process in accordance with the present invention. The one or more effect layers and/or pigmented print layers 2304 are sandwiched or encapsulated between the annular shaped clear base 2302 and the bulk lens material 2306. As before, although only a single effect layer is illustrated, any number of effect layers may be encapsulated between the other two layers. As illustrated, the contact lens comprises an annular shaped clear base material layer 2302 to encapsulate the one or more pigmented printed layers within the bulk lens material; namely, the reactive monomer mixture. In other words, with this design, the central optic zone or central optic area 2308 of the contact lens is not covered thereby maintaining a precision optical surface and pathway in addition to maintaining a high degree of comfort while ensuring full coverage/encapsulation of the pigmented layer 2304. The design of the cliché 2200 with the transition section 2206 creates a transition region 2310 in the annular shaped clear base layer 2302 which provides for better blending/integration between the materials as described in detail above. In accordance with exemplary embodiments of the invention, the opening 2308 has a diameter ranging from about 1.9 mm to about 8.8 mm and in a preferred embodiment has a diameter of about 5.75 mm.

In an alternate exemplary embodiment wherein a cosmetic or non-cosmetic contact lens is coated, whether on the front surface, the back surface or both surfaces for other reasons than encapsulating pigments, for example, a lubricious coating for comfort, it may be desirable to utilize the annular structure with a transition section disclosed herein to better blend/integrate the materials while maintaining high optical quality. More specifically, if a contact lens were formed from a first material and then a second material was added on one or both of the surfaces to increase the lubriciousness of the lens, the blending of the two materials may induce stress as described above. The solution would once again be an annular coating/structure with a transition section as set forth above to reduce any potential induced stress.

In accordance with another exemplary embodiment, pearlescent pigments may be incorporated into one or more regions or portions of a cosmetic contact lens to add a shiny, radiant and iridescent appearance thereto. For example, these pearlescent pigments may be added to at least a portion of the lens corresponding to the wearer's sclera. A pearl luster and interference effect results from alternating layers of transparent materials with different refractive indices. Pearlescent pigments may be combined with other pearlescent pigments and/or in combination with different types of pigments, for example, iron oxides, phthalocyanines and titanium dioxide, or dyes. Some of the resulting colors may be silver, gold and various shades of red, blue and green.

In general, the currently utilized preferred pigment for creating a brightly colored sclera region on a cosmetic contact lens is titanium dioxide. The cosmetic contact lenses in accordance with one exemplary embodiment of the present invention incorporate pearlescent pigments into regions corresponding to a wearer's sclera thereby creating a shiny, radiant and iridescent appearance. In other words, the combination or incorporation of pearlescent pigments, for example, mica based pearlescent pigments coated with titanium dioxide will result in a brighter white sclera region that has a wet reflective appearance and which also looks natural. The preferred pearlescent pigment is a silver type that is a mica based pigment coated with titanium dioxide. An exemplary mica based pigment is potassium aluminum silicate, which may be coated with titanium dioxide, $TiO_2$, or iron oxide, $Fe_2O_3$. EMD Chemicals Inc. offers a food and drug approved natural silicate combined with titanium dioxide under the trademark Candurin®. It is important to note; however, that any pearlescent pigment may be combined with other pearlescent pigments and/or in combination with different types of pigments or dyes and utilized in the sclera region.

The cosmetic contact lenses of the present invention incorporating pearlescent pigments may include a limbal ring, a pattern that overlies the wearer's iris, a pattern that overlies the pupil region, a clear pupil region, a brightly colored sclera region, a brightly colored sclera region with a geometric pattern and/or any combination thereof. The limbal ring is preferably opaque or translucent. The iris area may be translucent, opaque or transparent. The pupil region is transparent or contains no pattern. Both pigments and dyes may be utilized to color the pattern elements of the limbal, iris and pupil regions of the contact lens. Any organic pigment, inorganic pigment, effect pigment, dye or any combination thereof may be utilized to color the elements of the patterns.

Figure 24:
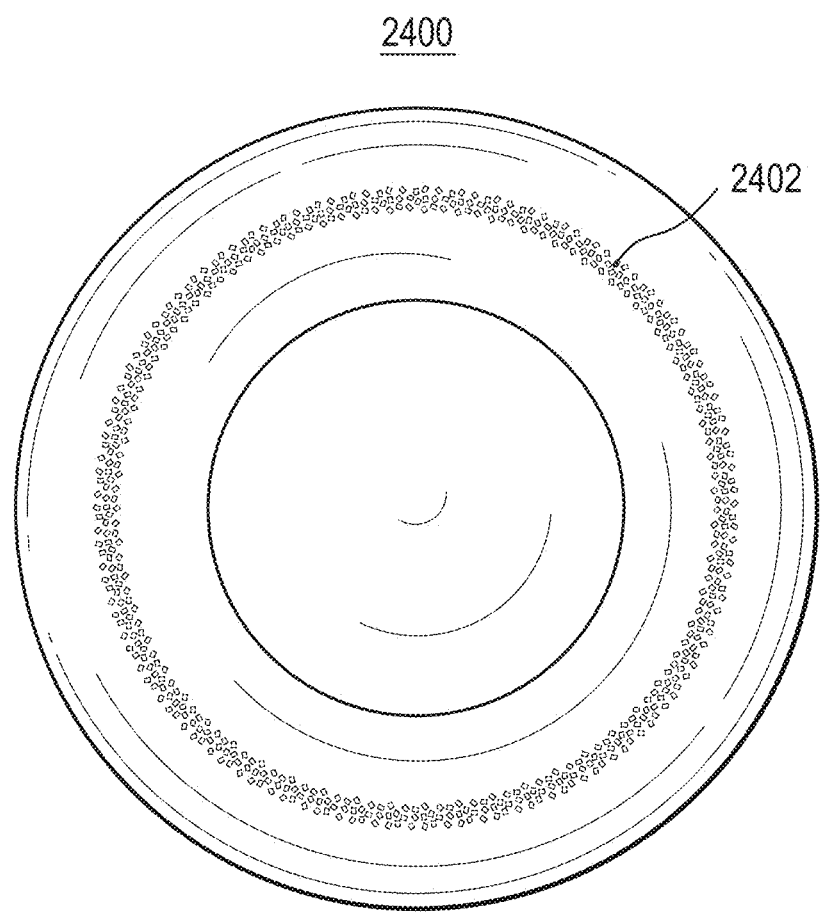
FIG. 24 is a diagrammatic representation of a cosmetic contact lens with a brightly colored sclera with pearlescent pigments in accordance with the present invention.

Referring now to FIG. 24, there is a diagrammatic illustration of a cosmetic contact lens 2400 with a brightly colored sclera region 2402 formed from mixture comprising pearlescent pigments in accordance with the present invention. The brightly colored sclera region 2402 with pearlescent pigments may be manufactured as follows. A clear base ink was prepared by adding 35.35 grams of 1-propanol to 588.11 grams of 1D Clear Base. A more detailed description of the clear base ink composition as well as its preparation is given below. The ink sample was then mixed for three (3) minutes at 1800 rpm on a Servodyne mixer. A twenty (20) percent Silver Fine ink was prepared by adding 5.98 grams of 1-propanol to 20.05 grams Silver Fine pigments (EMD Chemicals, Candurian® Pearl Effect Colors) and 80.01 grams of 1D Clear Base. The mixture was then hand mixed. Steel clichés with etched patterns were filled with the ink mixtures and printed onto the surface of a mold as described above. The ink was transferred from the clichés to the surface of a mold using a silicon pad. The clear base ink was printed first followed by the Silver Fine ink. A lens forming material; namely, etafilcon A reactive monomer mixture, was deposited onto the printed mold and a complementary mold half was then utilized to complete the mold assembly. The lens material was then cured, released from the mold and equilibrated in a buffered saline solution, all as described in more detail above. The pearlescent pigments are encapsulated within the lens material.

A binding polymer for the clear base ink was made using 96 grams of 1-dodecanethiol (DODT), 56.54 grams lauryl methacrylate (LMA), 7.40 grams methacrylic acid (MAA), 1367 grams of hydroxyethylmethacrylate (HEMA), 68.5 grams glycerol, 378 grams 1-ethoxy-2-propanol (EP), 1511 grams isopropyl lactate (IPL) and 8.89 grams 2,2'-azobis(2-methylbutyronitrile) (AMBN). First adding the DODT, monomers and solvents, except for about 50-100 cc of the IPL, were mixed in a five (5) liter blue cap bottle and stirred for ten (10) minutes. The mixture was then poured into a five (5) liter stainless steel reactor with stirrer and nitrogen. The mixture was stirred and heated for approximately twenty-five (25) minutes until the temperature was sixty-eight (68) degrees Celsius. After the temperature was stabilized at sixty-eight (68) degrees Celsius, the AMBN was dissolved in the remaining IPL and added while opening the nitrogen bleed. The polymerization was allowed to proceed for 16-24 hours after which the temperature was increased to eighty (80) degrees Celsius and the reaction was completed. The mixture was then allowed to equilibrate to room temperature. The viscosity of the mixture was adjusted as desired by mixing four (4) parts of IPL with one (1) part of EP.

As set forth above, the lens forming material comprises etafilcon A. Etafilcon A is a well-known and patented material for manufacturing contact lenses. Etafilcon A is a copolymer of 2-hydroxyethal methacrylate and methacrylic acid cross-linked with 1,1,1-trimethyol propane trimethacrylate and ethylene glycol dimethacrylate. Etafilcon A is utilized in a number of contact lenses available from Johnson & Johnson Vision Care, Inc. It is important to note that while etafilcon A is utilized in the exemplary embodiments described herein, any suitable lens forming material may be utilized.

In accordance with another exemplary embodiment, the present invention is directed to a cosmetic contact lens which comprises one or more effect layers, overlying one or more regions of the eye on which they are positioned, pearlescent pigments incorporated into portions of the contact lens overlying various regions of the eye, for example, the sclera as detailed above, the iris or both the sclera and iris, and a clear coat encapsulating the one or more effect layers and pearlescent pigments. Preferably, the clear coat has an annular shape as described above so that the central vision portion of the lens is of the highest optical quality. In accordance with another exemplary embodiment, pearlescent pigments may be incorporated in the section overlying the sclera, the iris and the limbal ring, in the sclera and the limbal ring, in the limbal ring and the iris, in the sclera alone, in the iris alone or in the limbal ring alone. In addition, there may be exemplary embodiments where the limbal ring has the following characteristics and may also comprise pearlescent pigments while in other exemplary embodiments no limbal ring may be utilized.

It is important to note that any of the sections of the contact lens may comprise ink compositions/dyes/pigments to create effect layers as described herein as well as coated mica based pearlescent pigments as described herein, alone or in combination with each other. For example, pigment formed effect layers may be combined with mica based pearlescent pigments, pigment plus mica based pearlescent pigment effect layers may be combined with mica based pearlescent pigments, pigment plus mica based pearlescent pigment effect layers may be combined with pigment plus mica based pearlescent pigment effect layers, and mica based pearlescent pigment based effect layers may be combined with mica based pearlescent pigment based effect layers and utilized in any of the sections comprising the contact lens. In addition, mica alone may be utilized to form an effect layer, mica may be utilized as an opacifier or as a primary additive in forming a color composition, for example, mica may be utilized to make a more vibrant yellow.

Figure 25:
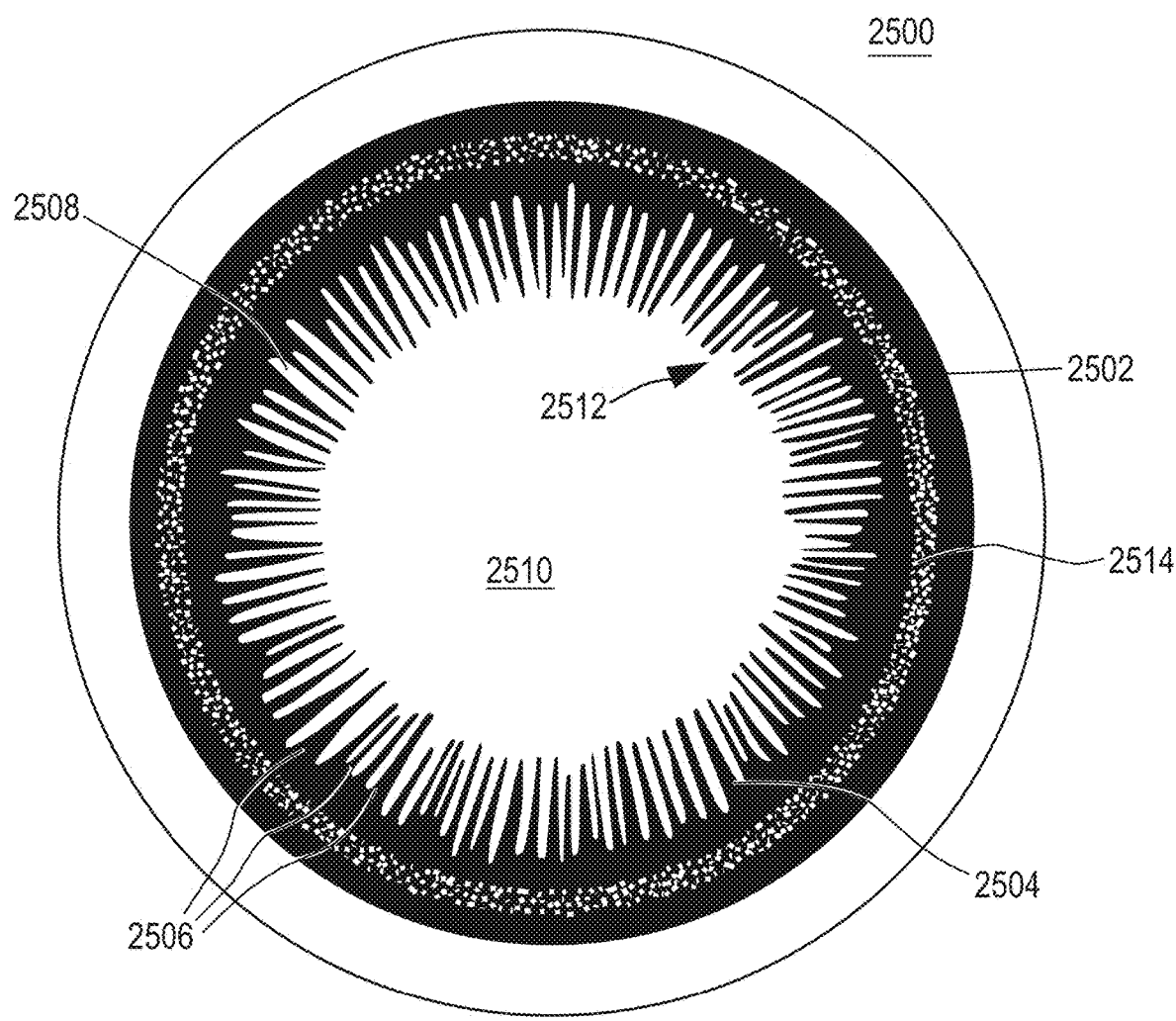
FIG. 25 is a plan view of an exemplary limbal ring/spoke pattern cosmetic contact lens with mica based pearlescent pigments in the limbal portion in accordance with the present invention.

More specifically, mica based pearlescent pigments may be utilized as an opacifier in forming the limbal ring or it may be utilized as the primary element in forming the limbal ring itself. In one exemplary embodiment as illustrated in FIG. 25, mica based pearlescent pigments may be added to a limbal ring effect to add vibrancy and sparkle to the limbal ring. In FIG. 25, there is illustrated a first exemplary embodiment of the limbal ring-tapered spoke pattern on a contact lens 2500. In this exemplary embodiment, the limbal ring 2502 is a black opaque band that is approximately 1 mm in width. Beginning at the innermost border 2504 of the limbal ring 2502 and extending inwardly towards the geometric center of the contact lens 2500 are a plurality of randomly arranged tapered spokes 2506, the innermost border 2512 of which forms a circle with a diameter of 7 mm as measured from the geometric center of the contact lens 2500. Although all of the spokes 2506 are generally similarly configured, preferably no one of the spokes 2506 is exactly the same as another of the spokes 2506. The spokes 2506 are interspersed, or bordered, by spaces 2508 in which spaces there are no elements. Spaces 2508 are also generally all similarly configured, but preferably no one of the spaces 2508 is of the exact same configuration as any of the other of the spaces 2508 or spokes 2506. Area 2510 is a region in which there are no pattern elements, which area as shown will partially compose the iris portion of the wearer's eye as well as the whole of the pupil portion of the wearer's eye, or portion of the lens that overlies the wearer's pupil while the lens is on-eye and centered. As shown, area 2510 is clear, but it may be translucently or opaquely colored as well. Innermost border 2504 as shown is of an even, regular shape, but may be an uneven, irregular border. Similarly, although tapered spoke border 2512 forms a substantially even border, it may form an uneven border. The mica based pearlescent pigments 2514 are encapsulated within the limbal ring region 2502 and may be in a random or non-random pattern. It is important to note that the mica based pearlescent pigments may have been incorporated into any of the designs shown herein.

Mica based pearlescent pigments may be utilized in forming the sections overlying the iris region. For example, mica based pearlescent pigments may be utilized to create an effect layer. Different coatings on the mica may be utilized. Mica based pearlescent pigments may be added to the existing effect layers. Mica based pearlescent pigments may be added as an opacifier in the existing effect layers. In addition, mica based pigments may be utilized to develop new colors.

Figure 26:
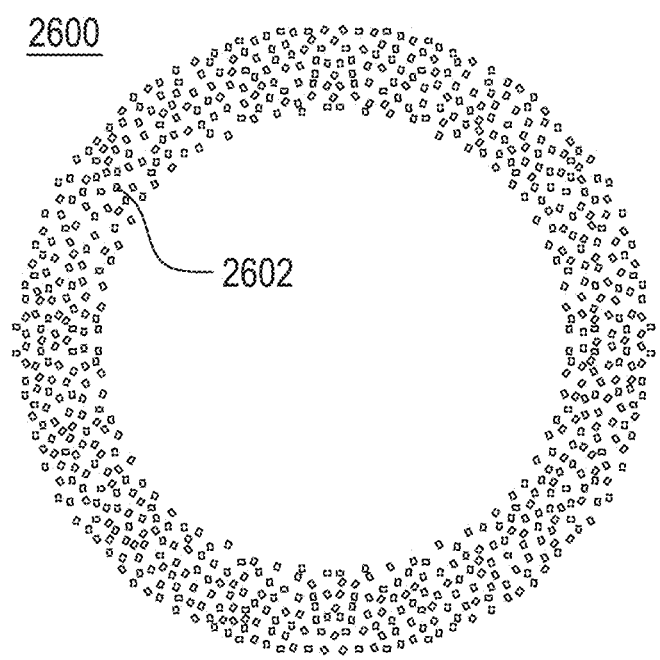
FIG. 26 is a plan view of an exemplary effect design graphic corresponding to an iris region of a wearer's eye with the effect design graphic comprising mica based pearlescent pigments in accordance with the present invention.

Referring now to FIG. 26, there is illustrated an exemplary effect design graphic 2600 for a cosmetic contact lens that overlies the iris region of a wearer's eye. As may be seen from FIG. 26, this design graphic does not comprise a limbal ring as a majority of the other designs do, thereby creating a totally different effect. In addition, unlike the other designs, this exemplary embodiment comprises only mica based pearlescent pigments 2602 making up the design. The mica based pearlescent pigments 2602 are located within the iris region and may be in a random or non-random pattern. In addition, as set forth herein, the mica based pearlescent pigments may be coated with various other materials to change their color or add additional effects. In other exemplary embodiments, an effect layer such as the one illustrated may comprise a combination of standard pigments as described above along with pearlescent pigments. It is important to note that while FIG. 26 is illustrated as a regular shape of pigments, it may assume any other shape in addition to annular.

Mica based pearlescent pigments may be utilized in forming the sections overlying the sclera region. For example, mica based pearlescent pigments may be utilized to create an effect layer in the sclera. Different coatings on the mica may be utilized. Mica based pearlescent pigments may be added to the existing effect layers in the scleral region, for example, brightening colors. Mica based pearlescent pigments may be added as an opacifier in the scleral region. In addition, mica based pigments may be utilized to develop new colors for use in the sclera regions. The extent and quantity of the mica based pearlescent pigments to be added to the one or more sections or regions of the contact lens may be adjusted depending on the impact desired ranging from subtle to noticeable.

Reversible Contact Lens Design

In accordance with yet another exemplary embodiment, a cosmetic contact lens may be made reversible, thereby providing multiple effects. In other words, a single contact lens may provide two different eye enhancing effects just by removing it from the eye, inverting it and then putting it back on the eye. In this manner a contact lens wearer may be afforded cosmetic effect options with a single lens rather than having to purchase two lenses for different effects. It is conceivable that an individual may want to change their appearance throughout the day. For example, one may prefer subtler effects at work and more dynamic effects for after work activities or non-work activities. With this type of reversible lens any type of effect may be utilized, from color changes through inversion to pearlescent pigments versus no pearlescent pigments through inversion.

The reversible cosmetic contact lens of the present invention is designed to provide interchangeable cosmetic appearances on the eye. This effect may comprise a change in one or more of color, pattern, and/or effect. The resulting interchangeable cosmetic appearance may be customized based upon print order, design/pattern, color, pattern alignment and opacity levels as described herein. Accordingly, a description of an invertible soft contact lens is given below. This lens provides the same corrective refractive power and comfort regardless of which way it is worn.

Figure 27A:
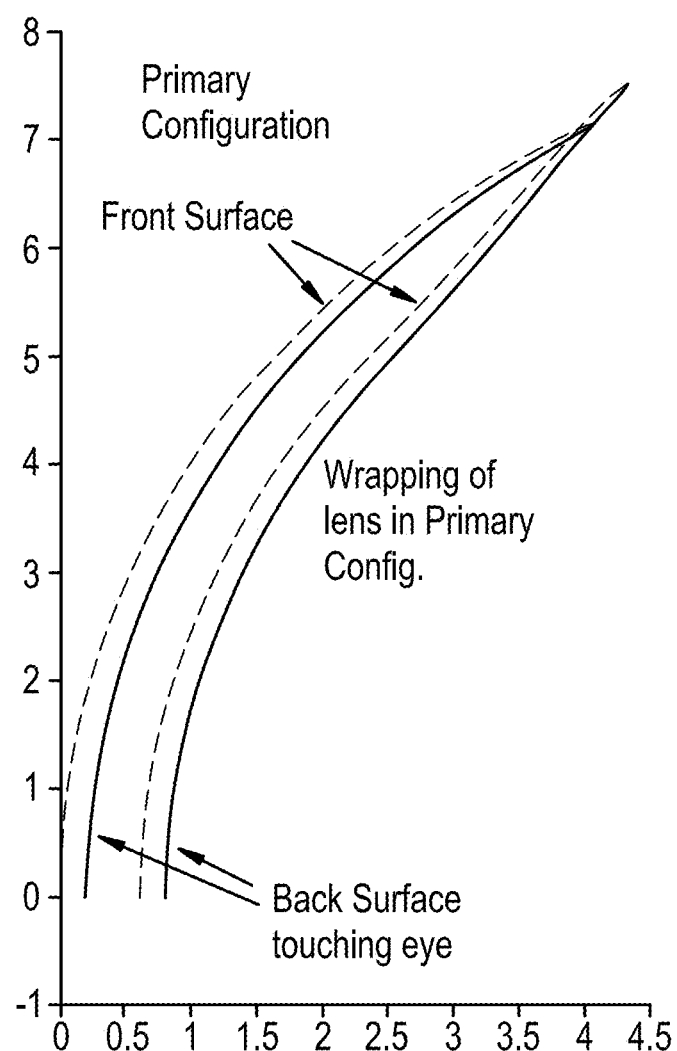
FIG. 27A is a schematic illustration of a soft contact lens in a primary orientation as well as its wrapped configuration.
Figure 27B:
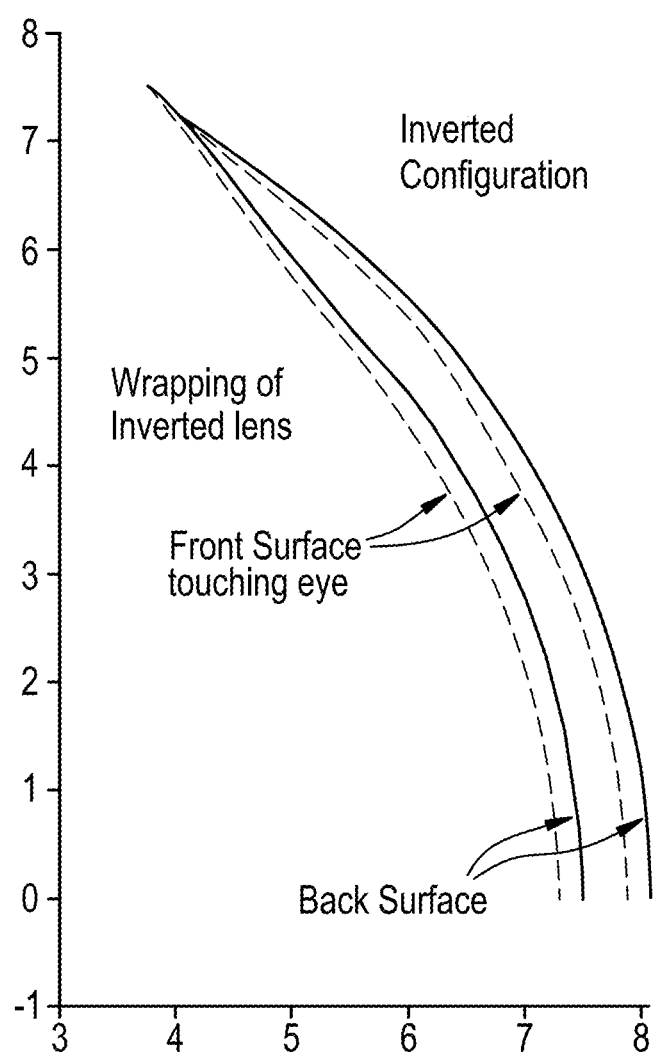
FIG. 27B is a schematic illustration of an inverted soft contact lens (e.g., inside-out) as well as its wrapped configuration.

A soft contact lens may be designed with a base curve (or curves) which is/are configured to fit the lens to the corneal/scleral profile of an eye of a wearer, a diameter which is generally larger than the corneal diameter and an anterior curve (or curves) which provides for the refracting function of the lens. Since a soft contact lens, by function, may be made from a flexible material, the soft contact lens may conform to the corneal/scleral profile and 'wrap' onto the eye, see FIG. 27A. This wrapping or deforming from the lens's inverted state can have a noticeable refractive influence on the eye as the curves of the contact lens change in order to accommodate the profiles of the cornea and sclera. As the lens is inverted, the front surface becomes the back surface which will be touching the eye surface when the inverted lens wraps on the eye, see FIG. 27B. Moreover, the effect of wrapping on the refractive power of the lens may also be dependent on whether the lens is applied on the eye in a primary orientation or an inverted/inside-out orientation.

Figure 28A:
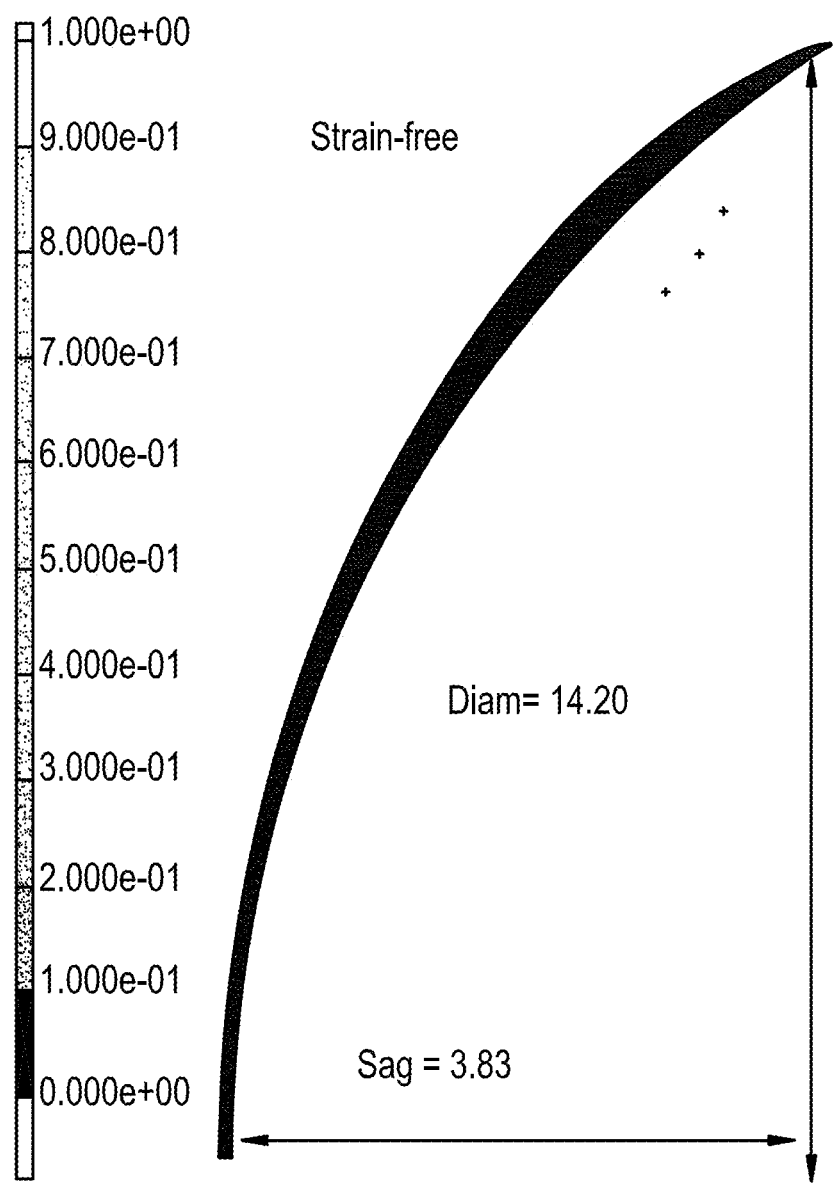
FIGS. 28A-28B illustrate strain modeling of a conventional soft contact lens in a primary orientation (FIG. 2A) and inverted or inside-out orientation (FIG. 2B).
Figure 28B:
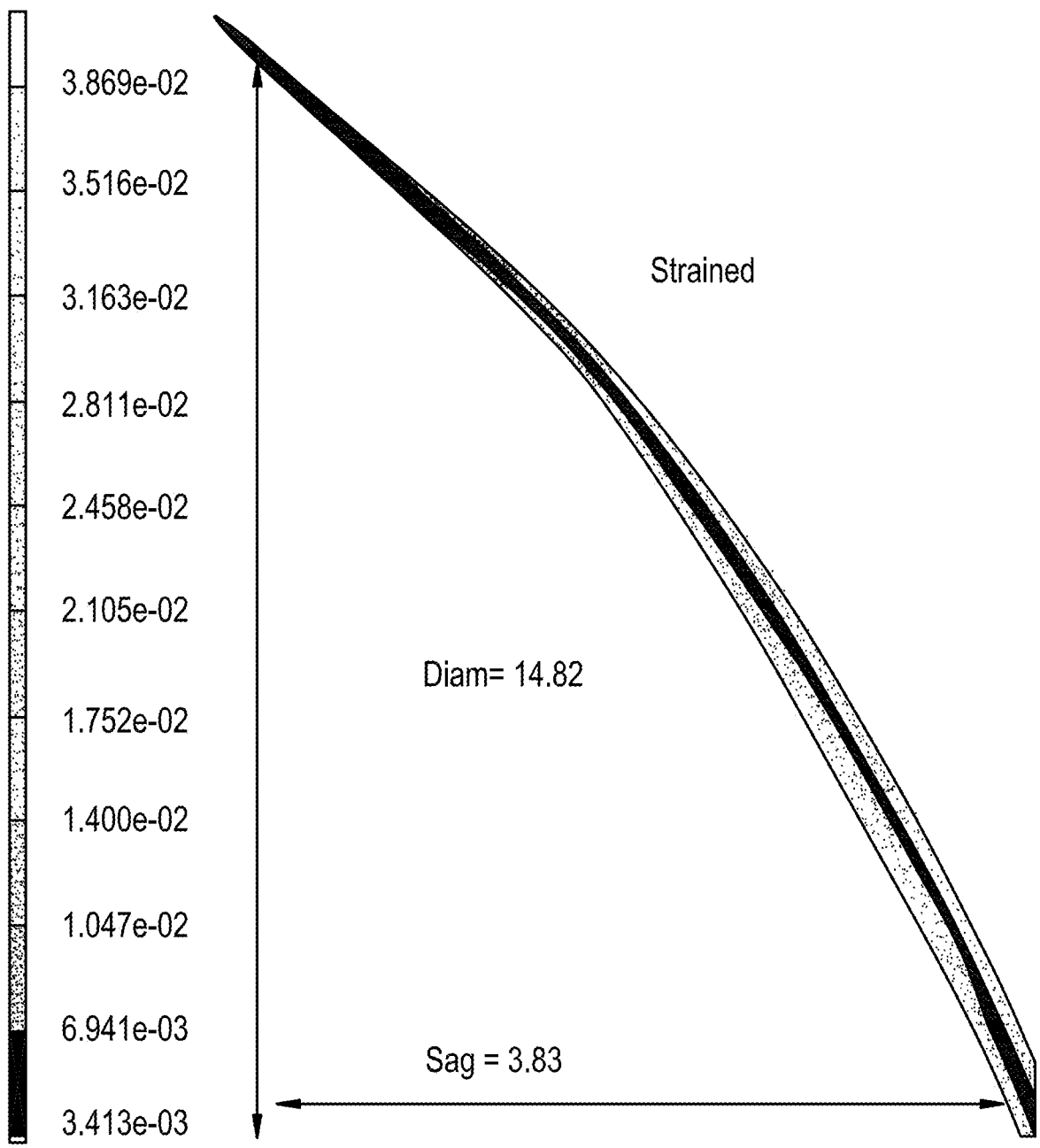
Figure 29A:
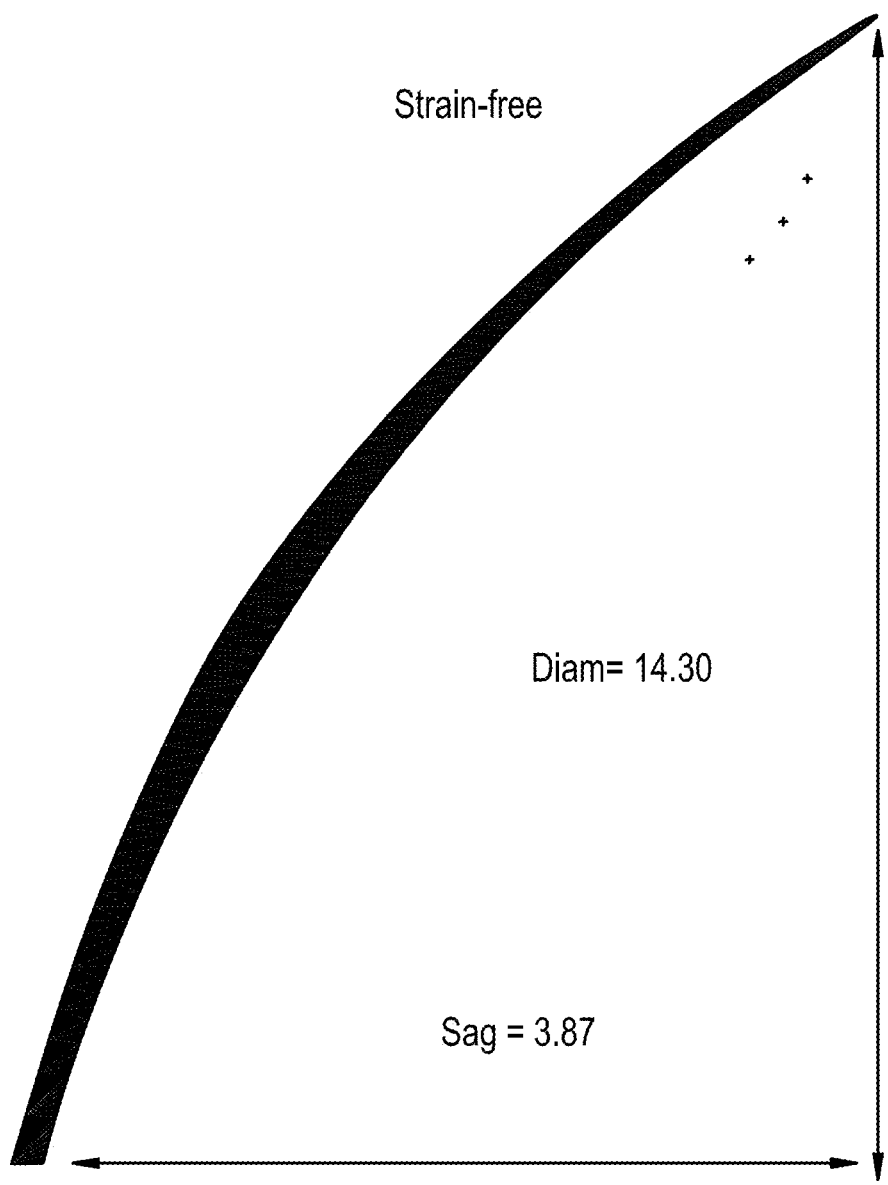

In accordance with the present invention, the behavior of a lens in various orientations may be modeled (e.g., using Finite Element Analysis (FEA), using MSC Marc software, etc.) to simulate lens inversion, lens wrapping on eye, and lens handling e.g., placement of the lens on eye using a finger or implement. For example, FIGS. 28A-28B illustrate strain modeling of a conventional soft contact lens in a primary orientation which is assumed to be strain-free (FIG. 28A) and inverted or inside-out orientation with residual strain after forcing the lens to buckle (FIG. 28B). When a lens with a standard design is inverted, the thickness in the periphery resists the deformation and there will be residual strain in the lens in the inverted configuration. That corresponds to lens edge flaring out, and hence, increased diameter (reduced sag) and ultimately, when put on an eye, different fitting characteristics on eye. In fact, according to current practices by soft contact lens users, the larger the disparity between primary and inverted configuration, the easier to recognize if the lens is inside-out by visual inspection. FIGS. 29A-29B illustrate strain modeling of a soft contact lens in accordance with the present invention (e.g., with reduced peripheral thickness), where the lens is in a primary orientation (FIG. 29A) and inverted or inside-out orientation (FIG. 29B). By managing (e.g., eliminating, minimizing, etc.) the peripheral thickness, major resistance to lens inversion is reduced, and hence, lens diameter and sag will be closer to the originally intended values in the primary configuration (before inversion), i.e., deviation in diameter or sag (dDiam or dSag) between primary and inside-out orientation is minimized.

A potential downside of reducing the peripheral thickness is increased difficulty in lens handling (e.g. flimsiness and folding). Several design alternatives in accordance with the present invention were generated and manufactured for assessment. In an aspect, a survey of fourteen (14) subjects was conducted based on two metrics/questions: 1) rate the ease of telling a lens is inside-out and 2) rate the ease of handling the lens for each lens of five (5) sample lenses. The five lenses include a control lens and four (4) test lenses of different variants of the proposed design, each having a prescribed diameter (D), base curve (BC), and center thickness (CT) in millimeters (mm):

Control: D14.2, BC8.5, CT0.085
Design 403: D14.3, BC8.1, CT0.1
Design 404: D14.3, BC8.1, CT0.2
Design 405: D14.3, BC8.3, CT0.1
Design 406: D14.3, BC8.5, CT0.1

FIG. 30 shows a listing of the ratings of the survey of fourteen (14) subjects, where the ratings are as follows:
1=very difficult
2=somewhat difficult
3=somewhat easy
4=very easy Table 1 illustrates averages scores from the survey for telling I/O and handling.

TABLE 1

| | Control D14.2, BC8.5, CT0.085 | Design 403 D14.3, BC8.1, CT0.1 | Design 404 D14.3, BC8.1, CT0.2 | Design 405 D14.3, BC8.3, CT0.1 | Design 406 D14.3, BC8.5, CT0.1 |
|---|---|---|---|---|---|
| Ave. Ease of Telling I/O Score | 3.50 | 2.14 | 1.21 | 2.07 | 2.29 |
| Ave. Ease of Handling Score | 3.07 | 2.79 | 2.07 | 2.71 | 2.79 |

Figure 31:
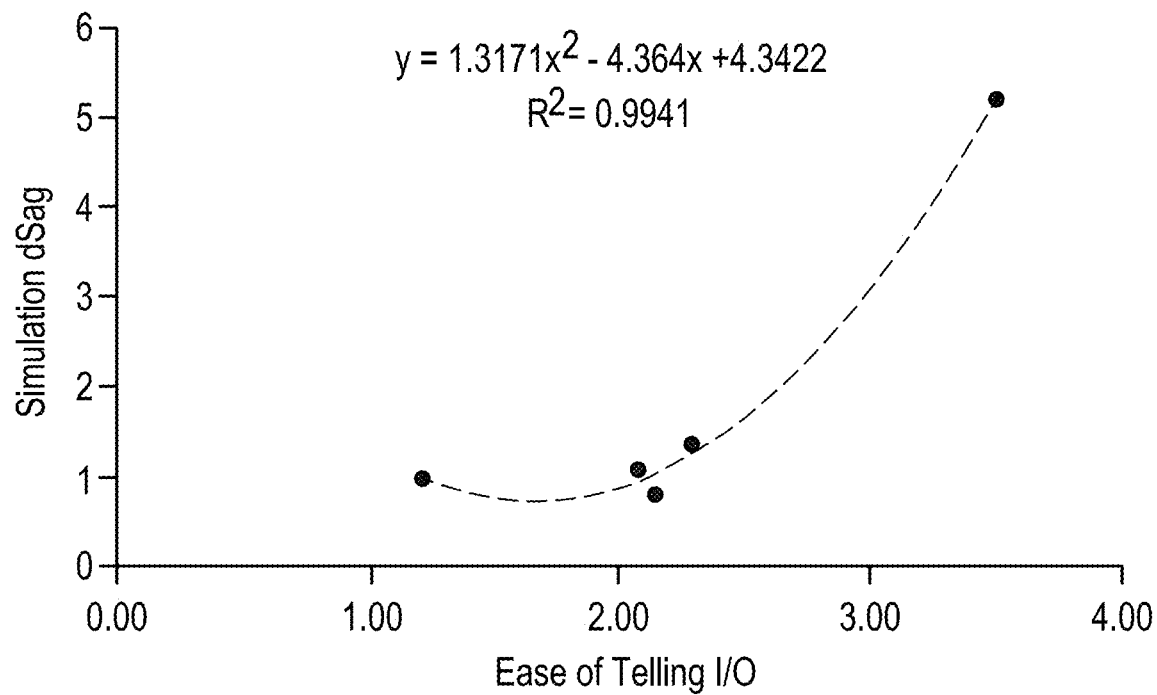
FIG. 31 shows a plot illustrating a relationship between a simulated dSag and the survey score for ease of telling a lens is inside-out.

According to Table 1 and subjective feedback, Design 405 appear to behave optimally from both aspects; easy to handle and at the same time more difficult to tell if it is inside-out. FIG. 31 illustrates a plot illustrating a relationship between a simulated dSag (deviation in sag after inversion) and the survey score for ease of telling whether a lens is inside-out. This plot shows that simulation dSag can be used as a predictor of telling I/O scores.

To further investigate the range of applicable design parameters, Design 405 was selected as an optimal design, and a range of variation for Diameter and Base Curve and Center Thickness were proposed for further evaluation, as shown in Table 2.

TABLE 2

| Diam | 13.8 | 14 | 14.3 | 14.5 | 14.8 |
|---|---|---|---|---|---|
| BC | 8 | 8.1 | 8.3 | 8.5 | 8.6 |
| CT | 60 | 80 | 100 | 150 | 200 |

Figure 32:
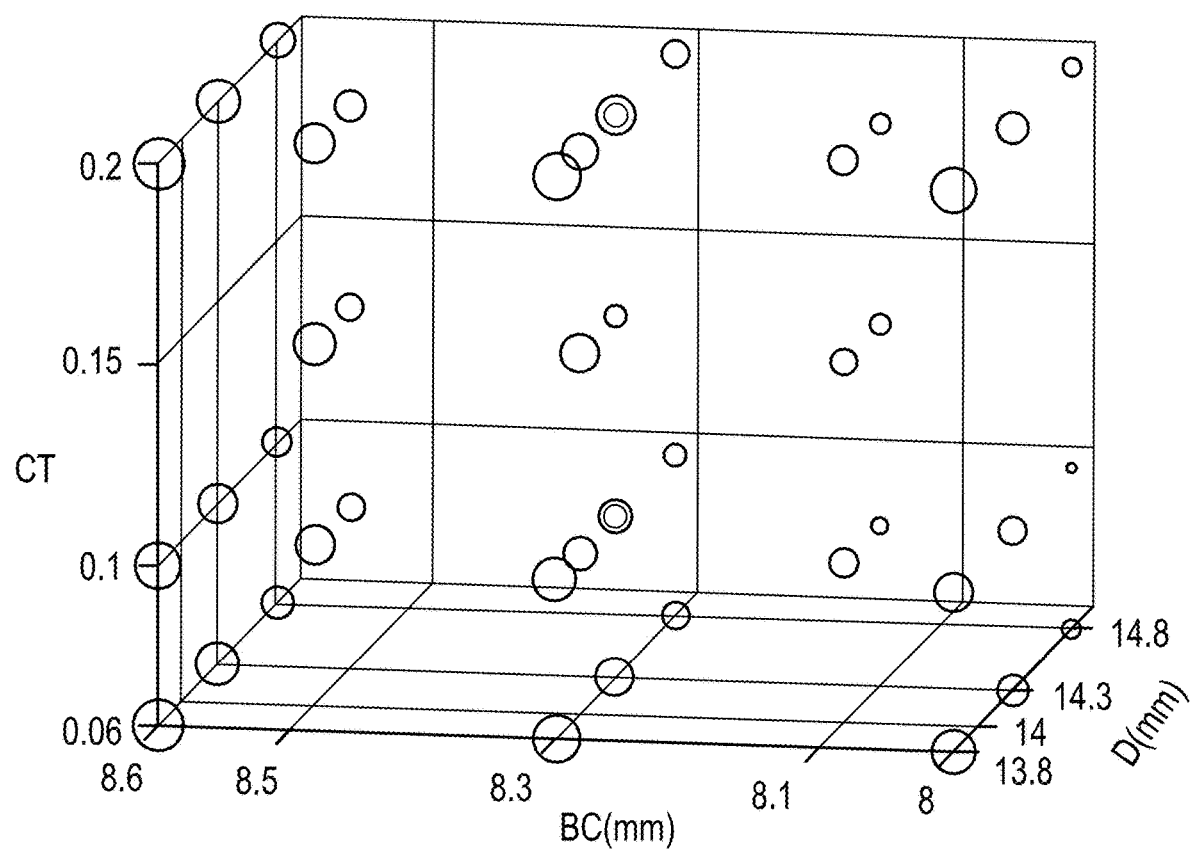
FIG. 32 illustrates a plot that shows the resulting design space of Diameter, Base Curve, and CT and their impact on the simulation metric dSag illustrated with the size of markers (e.g., diameter of the circle marker).

Within the above parameter ranges (represented by Table 2), twenty-seven (27) more design combinations are generated and evaluated for inversion simulation in addition to the original eighteen (18) designs, a total of 45 design variations. FIG. 32 illustrates a plot that shows the resulting design space for Diameter, Base Curve, and CT and their impact on the simulation metric dSag illustrated with the size of markers (e.g., diameter of the circle marker). The smaller the dSag, the more difficult to tell I/O, and the better the performance.

Based on the data in Table 1 and the relationship between simulation metric dSag and ease of Telling I/O (FIG. 31) the limits for Preferred dSag and Acceptable dSag may be estimated as:

Ease of Telling I/O <1.2% is Preferred <==> dSag <1% is Preferred

Ease of Telling I/O <2% is Acceptable <==> dSag <1.3% is Acceptable

Terms such as preferred and acceptable are used herein to differentiate exemplary levels of performance and are not intended to indicate preferred or best embodiments. Other performance ranges may be used. With these limits for simulation metric dSag, we can identify the Preferred (Table 3) and Acceptable (Table 4) designs out of forty-five (45) designs that are within the range given in Table 2:

TABLE 3

Preferred Designs:

| | 1 | 2 | 3 | 4 | 5 |
|---|---|---|---|---|---|
| Diam | 14.3 | 14.3 | 14.8 | 14.8 | 14.8 |
| BC | 8.1 | 8.1 | 8 | 8 | 8 |
| CT | 0.1 | 0.2 | 0.1 | 0.2 | 0.06 |
| dSag | 0.8053 | 0.9887 | 0.6533 | 0.902 | 0.8871 |

Material properties (e.g., Modulus of Elasticity as measured using ANSI Z80.20) could have an impact on mechanical behavior of the lens. To investigate the impact of material property the modulus is altered between 150 kpa to 660 kpa. Inversion and handling simulations were repeated to evaluate a metric for handling and telling inside-out inversion (I/O), and results are shown in Table 5:

TABLE 5

| Modulus (kPa) | I/O Metric = dSag | Handling Metric = Sag on Finger |
|---|---|---|
| 150 | 0.043 | 1.4 |
| 270 | 0.043 | 2.62 |
| 420 | 0.043 | 3.306 |
| 660 | 0.043 | 3.788 |

Data in Table 5 shows increasing modulus may improve handling of the reversible lens without impacting the reversed shape of the lens which is a desirable outcome.

Figure 33:
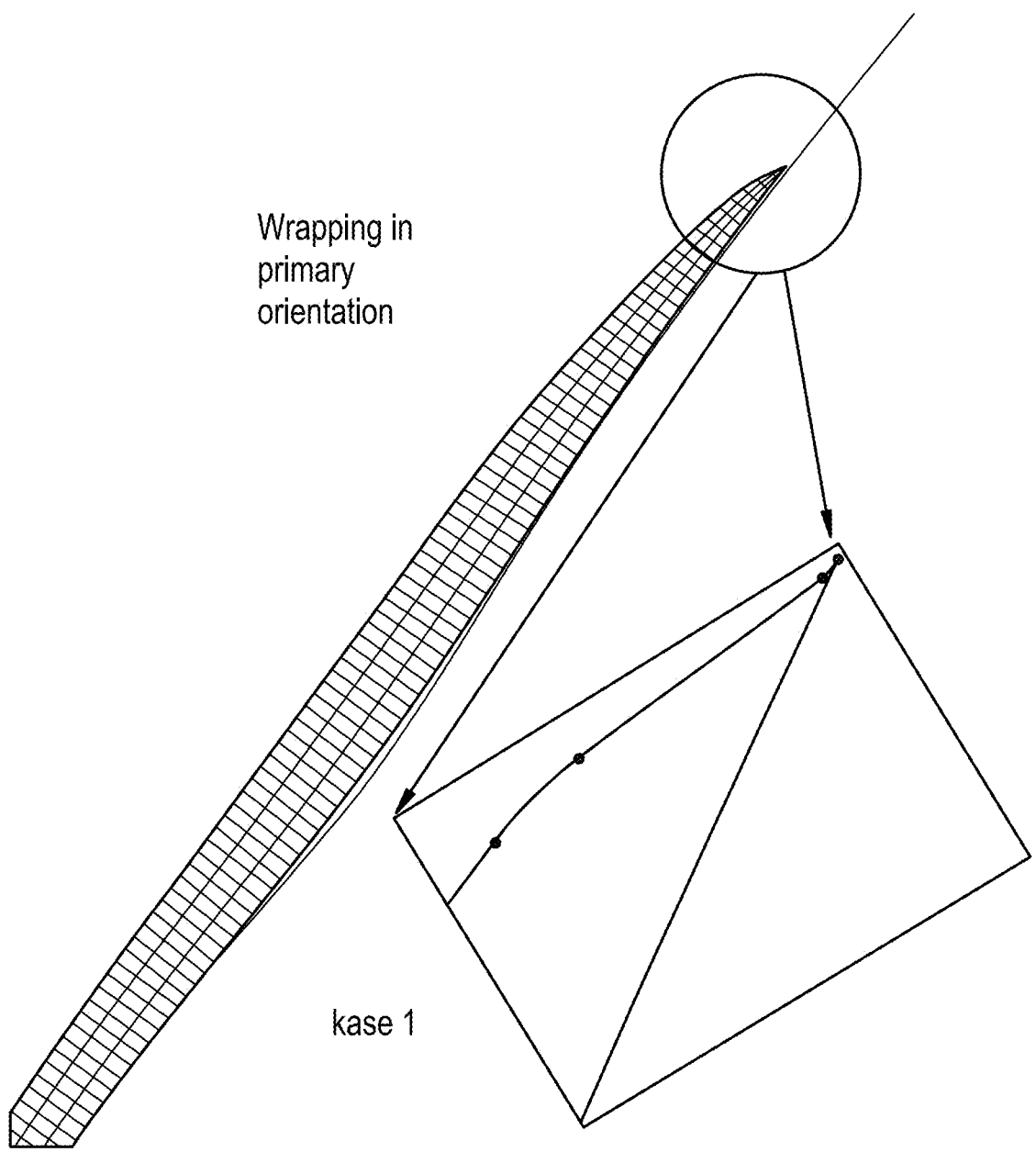
FIG. 33 shows a model of a peripheral edge of a conventional contact lens wrapping in a primary orientation.
Figure 34:
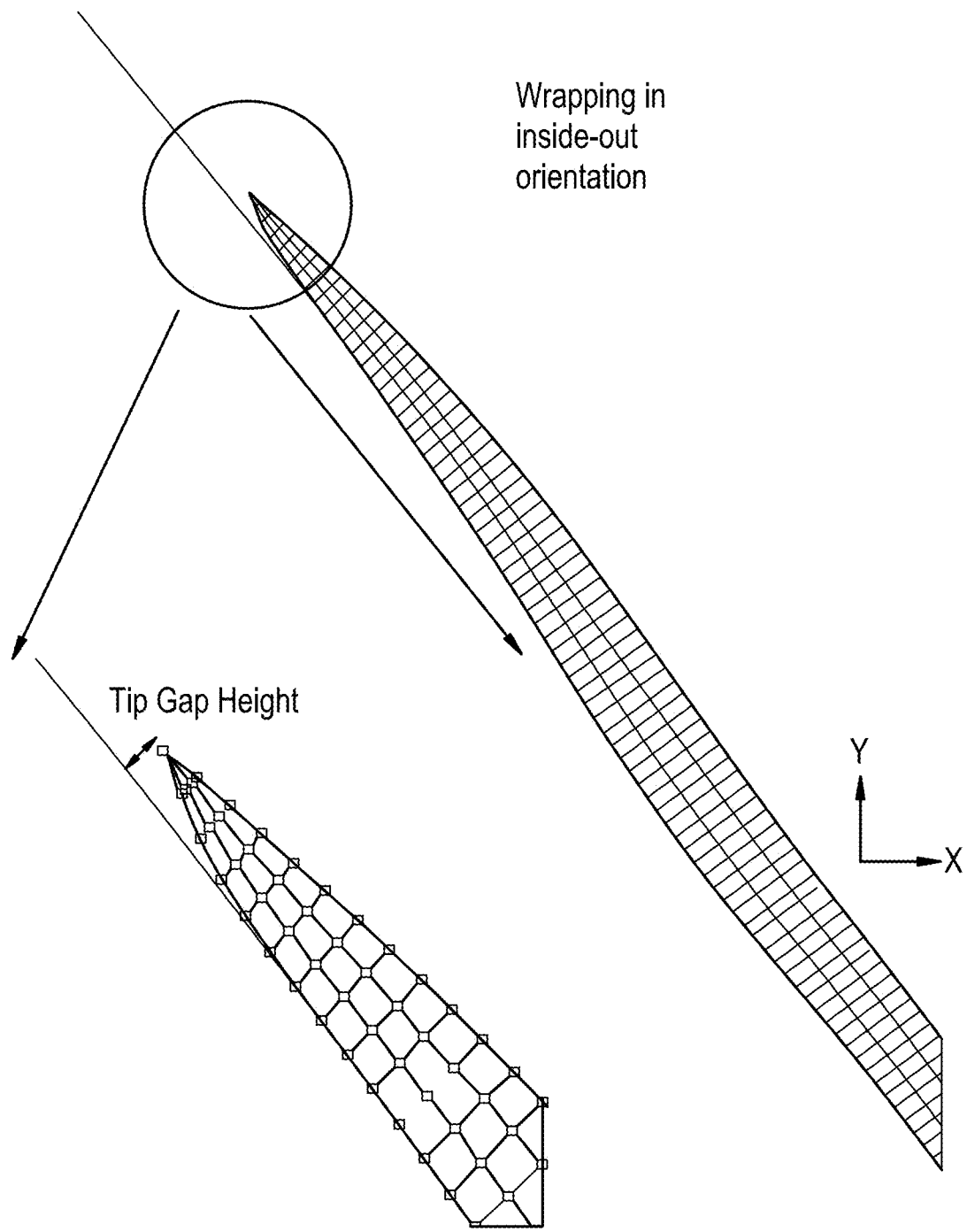
FIG. 34 shows a model of a peripheral edge of the conventional contact lens wrapping in an inverted or inside-out orientation.

In a contact lens the peripheral edge of the lens may affect overall comfort. For example, FIG. 33 shows a model of a peripheral edge of a conventional contact lens wrapping in a primary orientation. As shown, the edge wraps in such a way that is typically comfortable to a wearer as the lens edge is fully in touch with the eye. For comparison, FIG. 34 shows a model of a peripheral edge of the conventional contact lens wrapping in an inverted or inside-out orientation. As shown, the peripheral edge wraps in a different manner relative to the eye of the wearer and there is a gap between the edge apex and the eye surface which may be uncomfortable to the wearer as the eyelid repeatedly travels from the eye surface to the contact lens during blinking.

Figure 35:
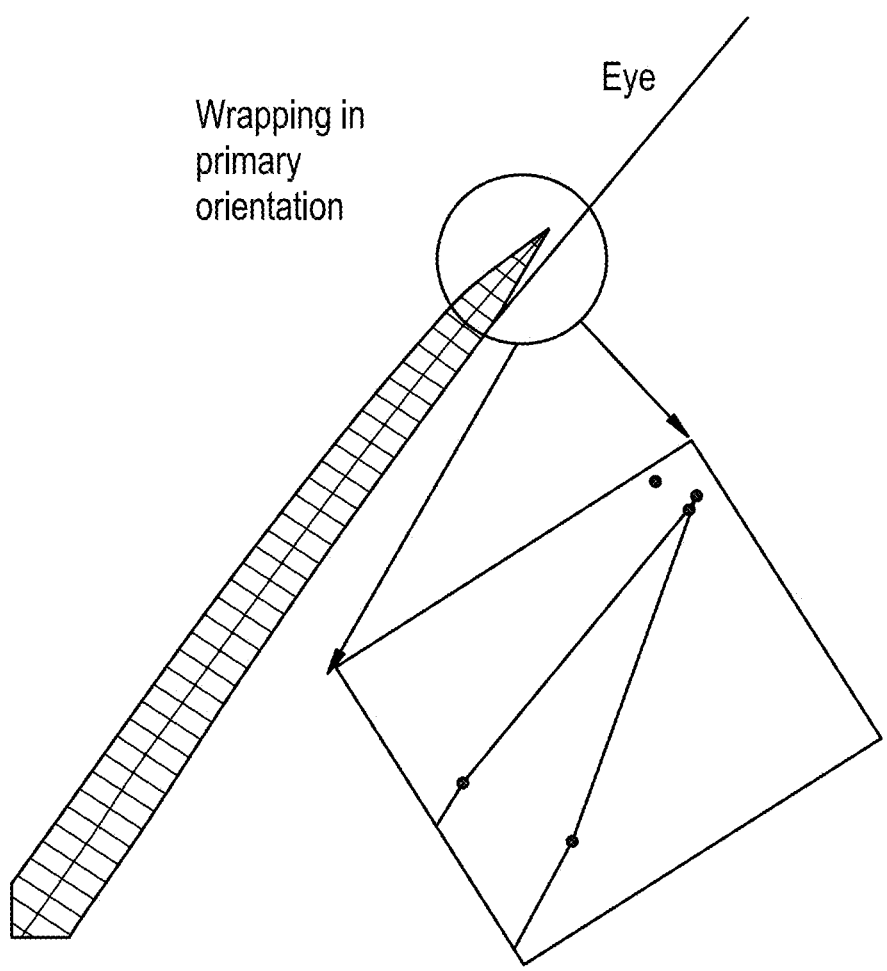
FIG. 35 shows a model of a peripheral edge of a contact lens in accordance with the present invention wrapping in a primary orientation.
Figure 36:
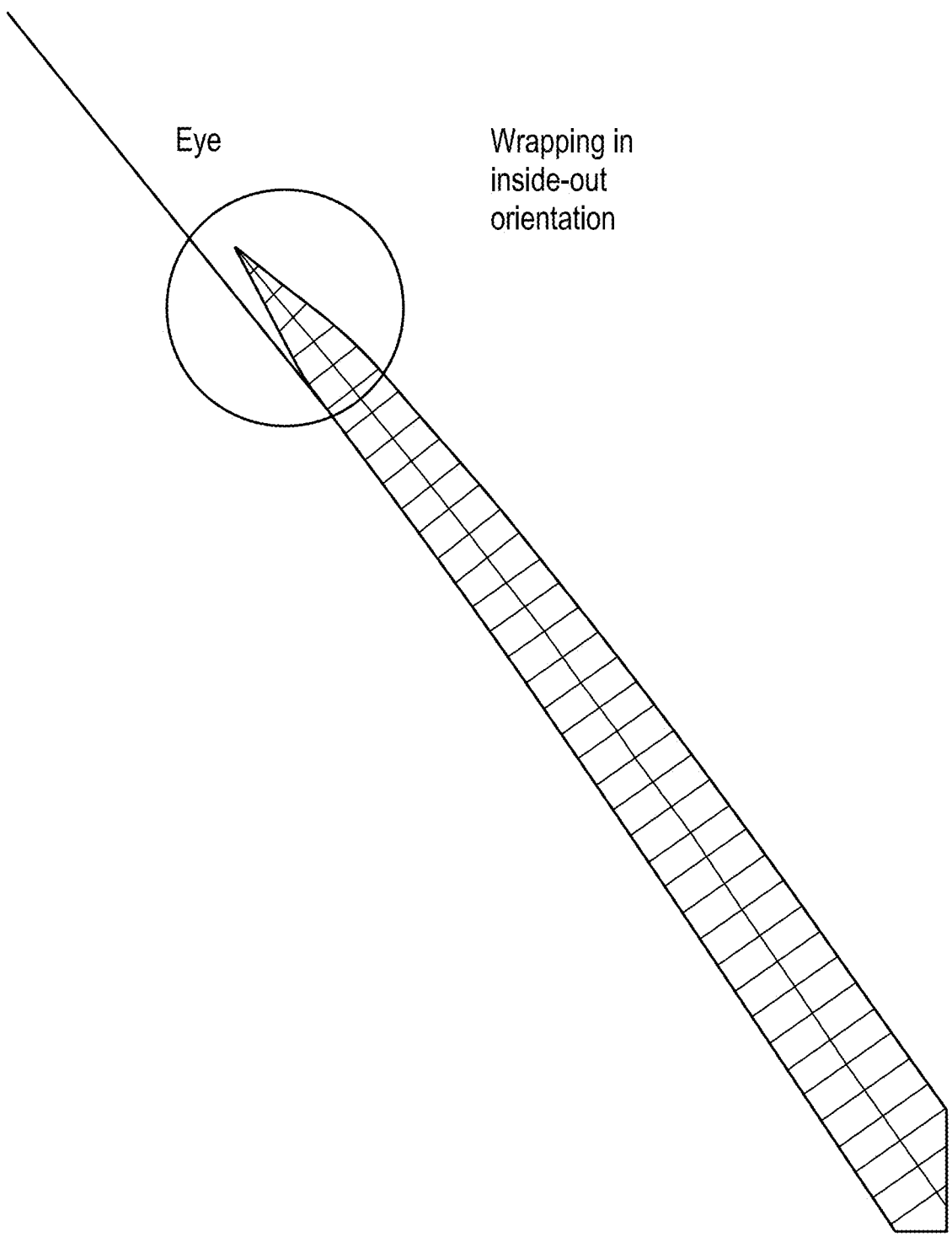
FIG. 36 shows a model of a peripheral edge of the contact lens in accordance with the present invention wrapping in an inverted or inside-out orientation.

However, in accordance with the present invention, with an edge profile that is symmetric or substantially similar with respect to both sides of the lens, the differences in comfort on eye between the two orientations may be minimized. Additionally or alternatively, the existing gap (i.e. apex height) between the edge apex and the eye surface may be reduced in either orientation. For example, FIG. 35 shows a model of a peripheral edge of a contact lens in accordance with the present disclosure wrapping in a primary orientation. For comparison, FIG. 36 shows a model of a peripheral edge of the contact lens in accordance with the present disclosure wrapping in an inverted or inside-out orientation.

As an ophthalmic medical device that provides vision correction, an invertible soft contact lens needs to provide equivalent power correction using either orientation. Given the incompressible nature of the soft contact lens material and the fact that lens wraps on the eye when put on eye with either side, one may speculate that the optical region of contact lens would deform to a similar curvature or shape on eye when put on either orientation. A preliminary opto-mechanical simulation is performed with a lens design in accordance with the present disclosure with both primary

TABLE 4

Figure 37A:
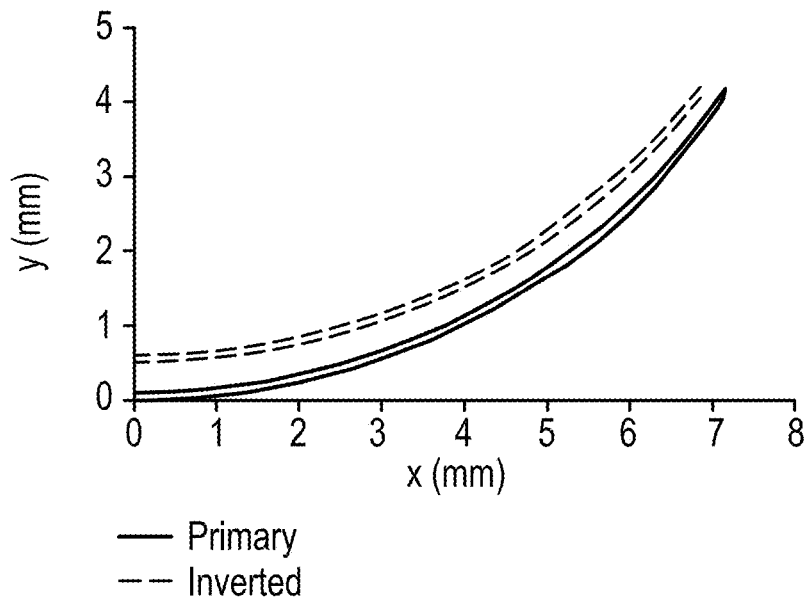
FIGS. 37A, 37B, 37C and 37D illustrate plots based on optical analysis of a 0.00D lens in both primary and inverted or inside-out orientations.
Figure 37B:
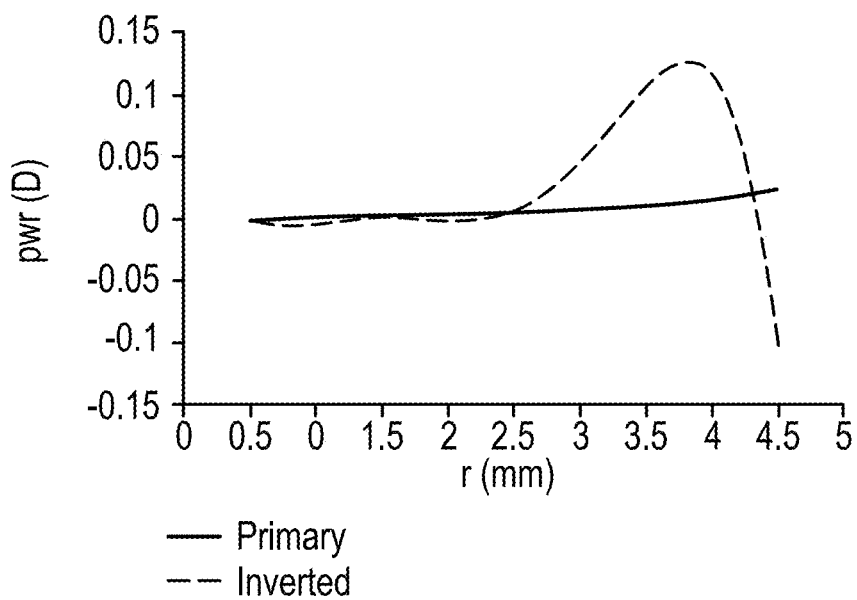
Figure 37C:
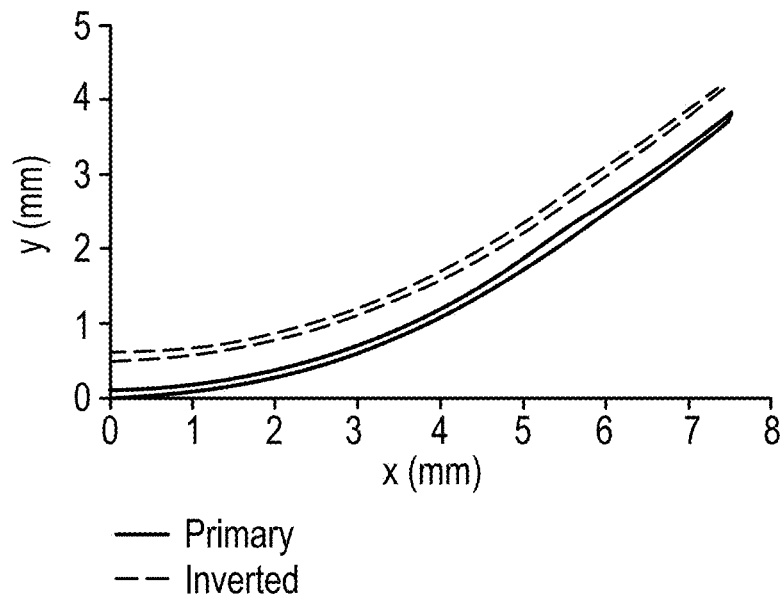
Figure 37D:
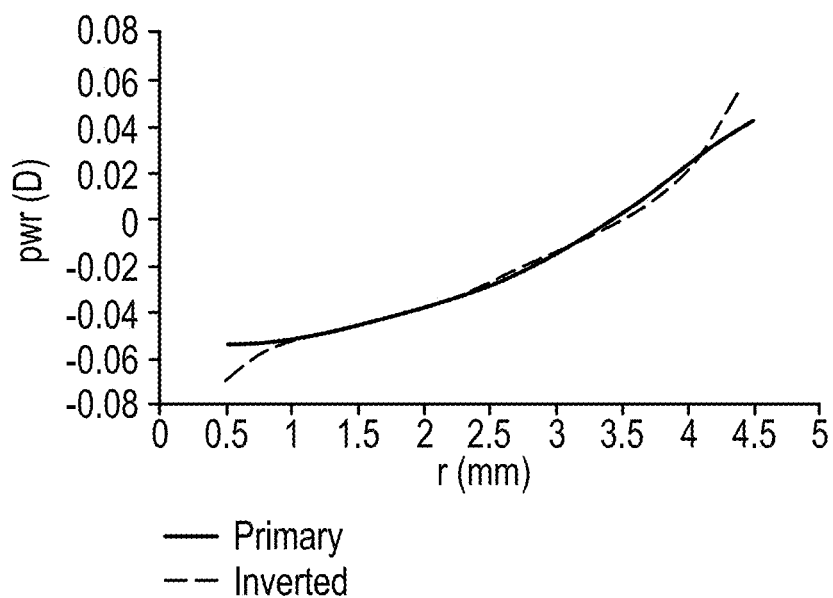

Acceptable Designs:

| | 1 | 2 | 3 | 4 | 5 | 6 | 7 | 8 | 9 | 10 | 11 | 12 |
|---|---|---|---|---|---|---|---|---|---|---|---|---|
| Diam | 14.3 | 14.3 | 14.3 | 14.3 | 14.3 | 14.3 | 14 | 14.8 | 14.8 | 14.8 | 14.8 | 14.8 |
| BC | 8.3 | 8.3 | 8.3 | 8.1 | 8.1 | 8.1 | 8.1 | 8 | 8.3 | 8 | 8 | 8.3 |
| CT | 0.1 | 0.15 | 0.2 | 0.1 | 0.15 | 0.2 | 0.15 | 0.1 | 0.1 | 0.2 | 0.06 | 0.06 |
| dSag | 1.0737 | 1.0683 | 1.2572 | 0.8053 | 1.0593 | 0.9887 | 1.2695 | 0.6533 | 1.0203 | 0.902 | 0.8871 | 1.2798 | and inverted orientations. Analysis is repeated for designs with different powers (−4.00D, 0.00D, +4.00D). Optical analysis is done assuming both unwrapped lens geometry and wrapped lens geometry (estimated through FEA). FIGS. 37A-37D illustrate plots based on optical analysis of a 0.00D lens in both primary and inverted or inside-out orientations. The plots shown in FIGS. 37A-37D compare the lens profiles and their calculated optical power profiles. They show there is minimal differences in lens power (within optical region where r<4 mm) between the primary and inside-out orientations (FIGS. 37A-37B). Particularly when the lenses wrap on eye, the differences between the power profiles vanishes (FIGS. 37C-37D), as the geometries become equivalent.

Figure 38A:
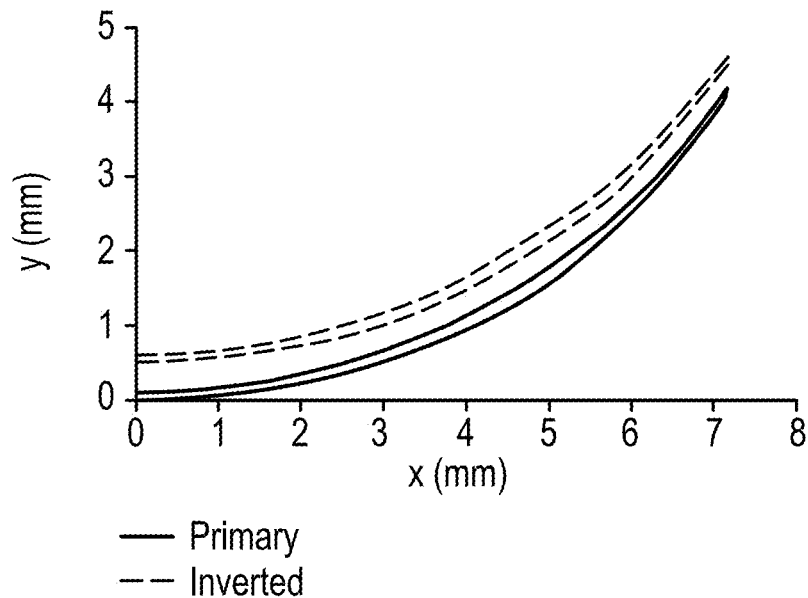
FIGS. 38A, 38B, 38C and 38D illustrate plots based on optical analysis of a −4.00D lens in both primary and inverted or inside-out orientations.
Figure 38B:
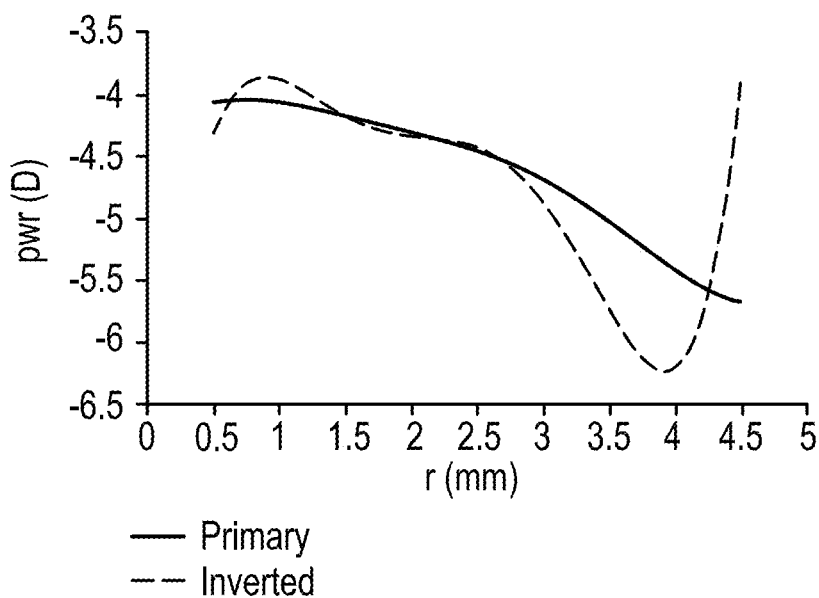
Figure 38C:
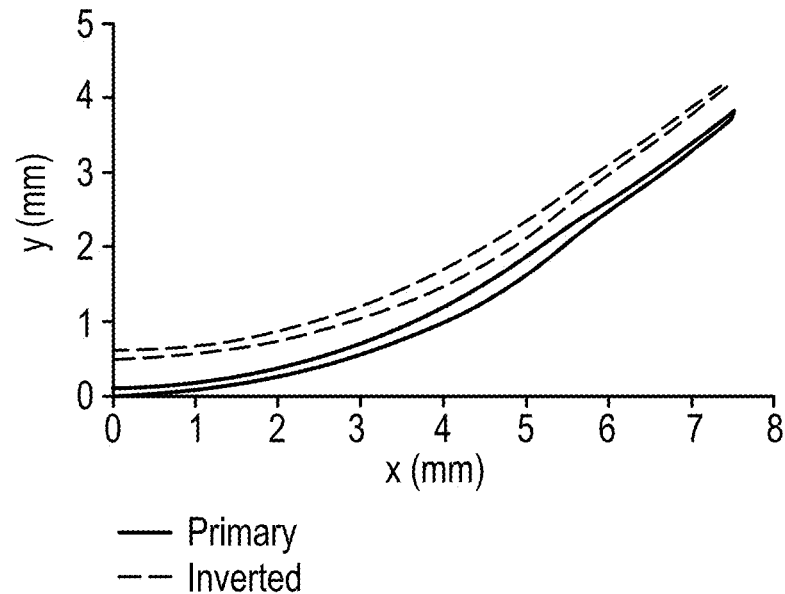
Figure 38D:
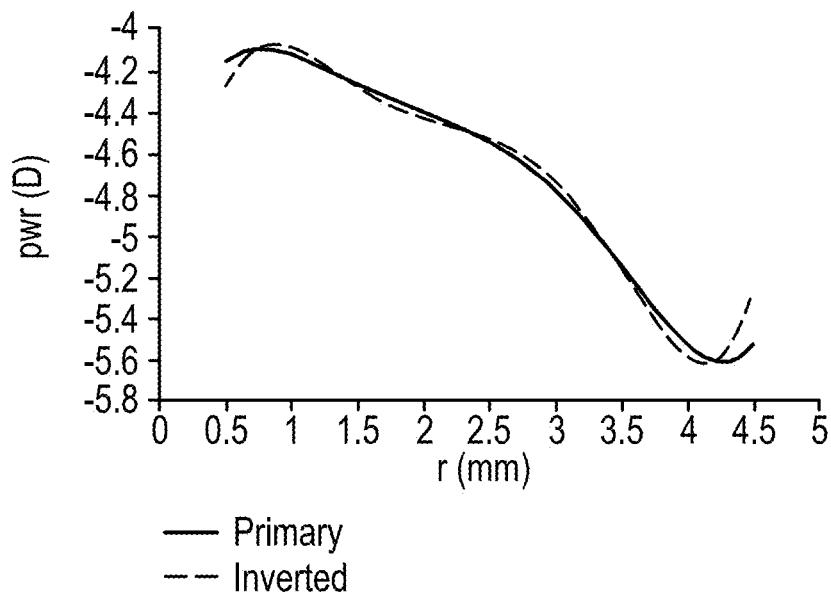

FIGS. 38A-38D illustrate plots based on optical analysis of a −4.00D lens in both primary and inverted or inside-out orientations. The plots compare the lens profiles and their calculated optical power profiles. They show there is minimal differences between the two sides (FIGS. 38A-38B). Particularly when the lenses wrap on eye, the differences between the power profiles vanishes (FIGS. 38C-38D), as the geometries become equivalent.

Figure 39A:
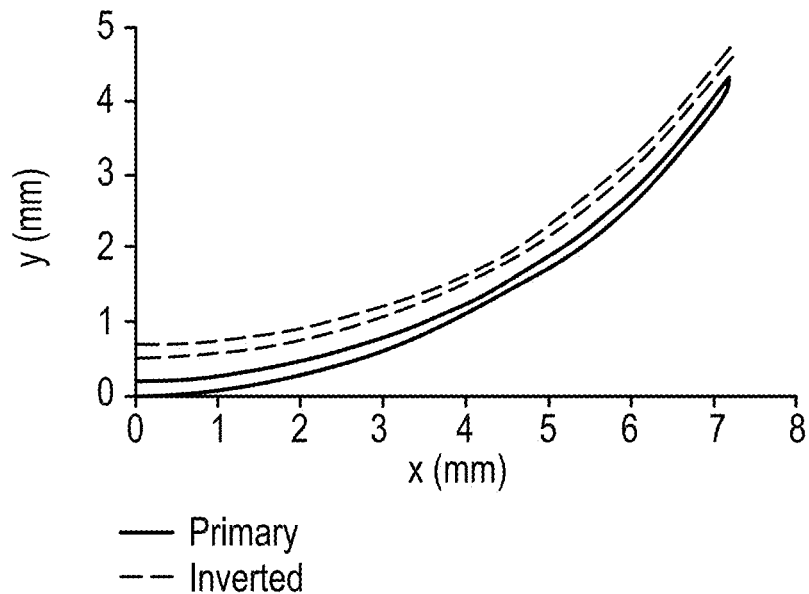
FIGS. 39A, 39B, 39C and 39D illustrate plots based on optical analysis of a +4.00D lens in both primary and inverted or inside-out orientations.
Figure 39B:
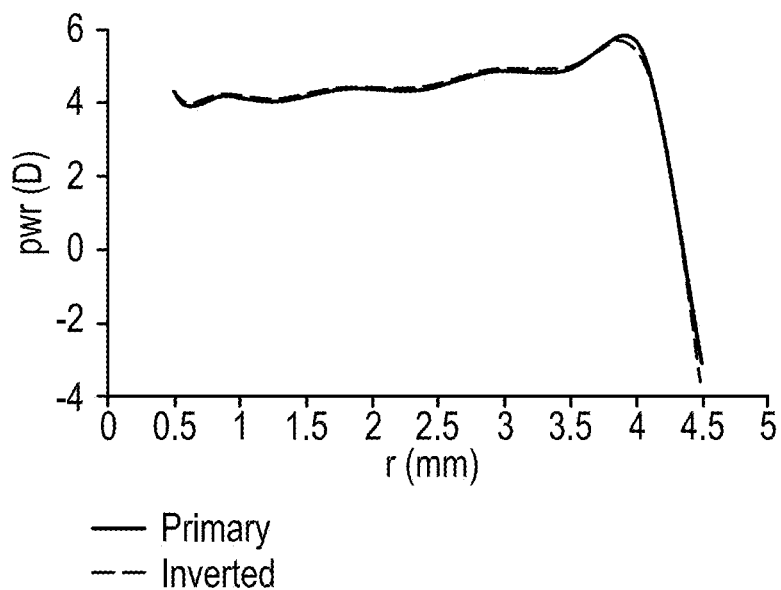
Figure 39C:
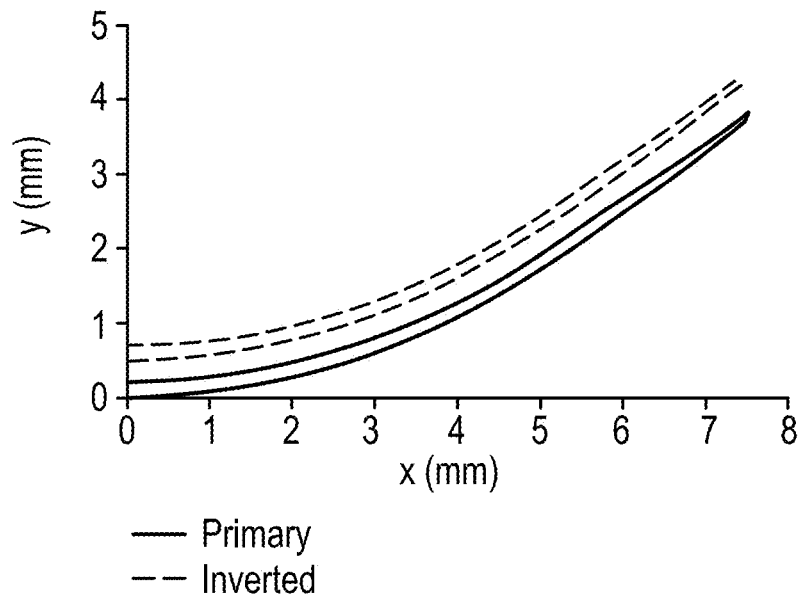
Figure 39D:
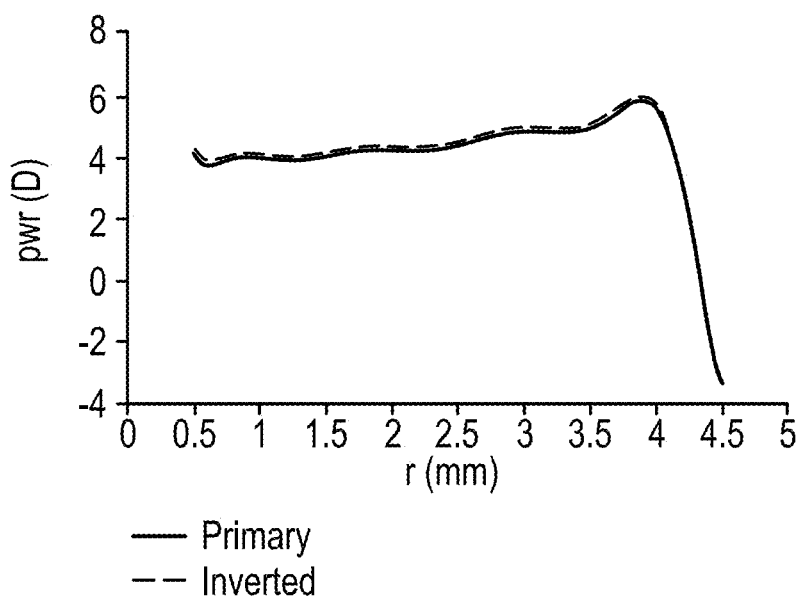

FIGS. 39A-39D illustrate plots based optical analysis of a +4.00D lens in both primary and inverted or inside-out orientations. The plots compare the lens profiles and their calculated optical power profiles. They show there is minimal differences between the two sides (FIGS. 39A-39B). Particularly when the lenses wrap on eye, the differences between the power profiles vanishes (FIGS. 39C-39D), as the geometries become equivalent.

These opto-mechanical simulations support the notion that the vision through the invertible lens design in accordance with the present disclosure maybe independent of the lens orientation.

As described herein, the peripheral region of the lens can be designed in such a way that the disparity in base curve and diameter between the primary and the inside-out orientations is minimized. The impact of peripheral thickness on this disparity, depends on lens diameter, base curve, and center thickness which have to be optimized along with the peripheral thickness for the best performance. When the lens base curve and diameter are comparable between the primary and the inside-out orientations, the on-eye fit and vision performance are expected to be comparable.

Examples of Reversible Cosmetic Contact Lenses

As shown in FIGS. 19 and 20, the reversible cosmetic contact lenses of the present invention are fabricated by pad printing using a clear annular clear base followed by several effect layers for color and graphical patterns including an optional barrier layer that may be continuous, intermittent or any combination thereof that restricts an effect to either the non-inverted or inverted orientation only. The efficiency of the barrier layer depends on its location and opacity and may fully or partially exclude an effect in one orientation or another. The pad printing process may further comprise additional annular clear base layers in-between effect layers to provide spacing or depth to the overall graphical design. The front and base curve molds used in the above pad printing process are designed such that one or more of the diameter, the base curve, the peripheral thickness, or the center thickness are configured such that a dSag is less than 1.3% when comparing a first orientation of the main body with at least a portion of the first surface abutting an eye of a wearer and a second orientation of the main body with at least a portion of the second surface abutting the eye of the wearer. Alternatively, the front and base curve molds used in the above pad printing process are designed such that one or more of the diameter, the base curve, or the thickness profile are configured such that an apex height measured from an edge apex to a nearest surface of the eye is less than or equal to 0.020 millimeters when the lens is in an inverted orientation with at least a portion of the second surface abutting the eye of the wearer.

As shown in FIG. 40, the reversible cosmetic contact lens of the present invention presents one graphical design in the non-inverted orientation (Side A) and another cosmetic design in the inverted orientation (Side B). Side A represents a darkly colored pattern with lighter colored inner highlights, while Side B represents a lightly colored pattern with a more distinct limbal ring. The exact colors and levels of opacity and pearlescence may vary between these cosmetic designs.

The colorants used in the inks for pad printing may be uncoated or coated pigments and may comprise metal oxide pigments such as iron oxide, chromium oxide, and titanium dioxide; organic dyes such as pthalocyanine blue, pthalocyanine green, and carbazole violet; and pearlescent and interference pigments such as cholesteric liquid crystals, muscovite mica, synthetic fluorphlogopite, and borosilicates. Effect layers may vary in their opacity or translucency depending ink concentrations and level of overlay. Barrier layers are optional but are usually opaque to prevent an underlying color from appearing on the opposite side. Typically, barrier layers are light in color to provide a clean background for another graphical design, for example, by pad printing a titanium dioxide layer.

Although the reversible cosmetic contact lens of the present invention is not limited by the number or sequence of the effect layers in the pad printing process, there are several preferred layering combinations as described below. The non-inverted and inverted cosmetic designs are the summation of all effect layers, barrier layers, and clear base layers within the reversible cosmetic contact lens.

First, a reversible cosmetic contact lens is fabricated, using a mold assembly configured such the dSag is less than 1.3% between the non-inverted and inverted lens orientation or alternatively such that the apex height as measured from an edge apex to a nearest surface of the eye is less than or equal to 0.020 millimeters in the inverted orientation, by the following pad printing sequence: (1) print a clear base layer on the inside surface of the front curve mold and then (2) print cosmetic designs highlighting the iris, using inner and outer effect design graphics, on top of one another such that at least one cosmetic design is opaque. In this way, the other cosmetic design may be translucent. The cosmetic designs may also include the same or different limbal design graphics. The selected designs are printed so as to overlap one another, at least in part, when viewed as worn. The designs can be cosmetically identical, nearly identical or substantially different in shape, color and combinations thereof. Examples of inner and outer effect design graphics are shown in FIGS. 14B, 14C, 15B, 15C, 16B, 16C, 17B, 17C, 18B and 18C. Examples of limbal design graphics are shown in FIGS. 14A, 15A, 16A, 17A, and 18A. Examples of cosmetic designs are shown in FIGS. 14D, 15D, 16D, 17D, and 18D.

Second, a reversible cosmetic contact lens is fabricated, using a mold assembly configured such the dSag is less than 1.3% between the non-inverted and inverted lens orientation or alternatively such that the apex height as measured from an edge apex to a nearest surface of the eye is less than or equal to 0.020 millimeters in the inverted orientation, by the following pad printing sequence: (1) print a clear base layer on the inside surface of a front curve mold and then (2) print two cosmetic designs highlighting the iris, using inner and outer effect design graphics, on top of one another with some level of overlap and with a barrier layer in-between. In this way, both cosmetic designs may be translucent. The translucency may vary between cosmetic designs. Alternatively, the barrier layer may be partially opaque and may form a common limbal design graphic. The two cosmetic designs may also include the same or different limbal design graphics. The selected cosmetic designs or the barrier layer design are printed so as to overlap one another, at least in part when viewed as worn. The cosmetic and barrier designs on the whole can be cosmetically identical, nearly identical or substantially different in shape, color and combinations thereof. Examples of inner and outer effect design graphics are shown in FIGS. 14B, 14C, 15B, 15C, 16B, 16C, 17B, 17C, 18B and 18C. Examples of limbal design graphics are shown in FIGS. 14A, 15A, 16A, 17A, and 18A. Examples of cosmetic designs are shown in FIGS. 14D, 15D, 16D, 17D, and 18D.

Third, a reversible cosmetic contact lens is fabricated, using a mold assembly configured such the dSag is less than 1.3% between the non-inverted and inverted lens orientation or alternatively such that the apex height as measured from an edge apex to a nearest surface of the eye is less than or equal to 0.020 millimeters in the inverted orientation, by the following pad printing sequence: (1) print a clear base layer on the inside surface of a front curve mold and then (2) print two cosmetic designs highlighting the iris, using inner and outer effect design graphics, such that the inner and outer effect design graphics create a blending layer in-between the two cosmetic designs highlighting the iris. The blending layer may be translucent or opaque. In this way, the blending layer is visible in both the non-inverted and inverted orientations. Alternatively, only one cosmetic design highlighting the iris includes a blending layer, and the two cosmetic designs are separated by a barrier layer. In addition, either one or both cosmetic designs may include a limbal design graphics. Examples of inner and outer effect design graphics are shown in FIGS. 14B, 14C, 15B, 15C, 16B, 16C, 17B, 17C, 18B and 18C. Examples of limbal design graphics are shown in FIGS. 14A, 15A, 16A, 17A, and 18A. Examples of cosmetic designs are shown in FIGS. 14D, 15D, 16D, 17D, and 18D.

Fourth, a reversible cosmetic contact lens is fabricated, using a mold assembly configured such the dSag is less than 1.3% between the non-inverted and inverted lens orientation or alternatively such that the apex height as measured from an edge apex to a nearest surface of the eye is less than or equal to 0.020 millimeters in the inverted orientation, by the following pad printing sequence: print any of the above preferred layering combinations with additional clear base layers between any or all effect layers, thereby adding a three dimensional or depth feature to the cosmetic designs.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

The following abbreviations will be used throughout the Examples and have the following meanings:

TL03 lights: Phillips TLK 40W/03 bulbs or TLK 20W/03 bulbs

LED: light emitting diodes

BC: base curve plastic mold

FC: front curve plastic mold

PS: polystyrene which is the homopolymer of styrene and is used as a plastic mold resin or component and may contain additives PP: polypropylene which is the homopolymer of propylene and is used as a plastic mold resin or component and may contain additives TT: Tuftec which is a hydrogenated styrene butadiene block copolymer (Asahi Kasei Chemicals) and is used as a plastic mold resin or component and may contain additives Z: Zeonor which is a polycycloolefin thermoplastic polymer (Nippon Zeon Co Ltd) and is used as a plastic mold resin or component and may contain additives RMM: reactive monomer mixture(s)

HEMA: 2-hydroxyethyl methacrylate (Bimax)

MAA: methacrylic acid (Acros)

EGDMA: ethylene glycol dimethacrylate (Esstech)

TMPTMA: trimethylolpropane trimethacrylate (Esstech)

Omnirad 1700: mixture of bis(2,6-dimethoxybenzoyl)-2,4,4-trimethyl pentylphosphineoxide and 2-hydroxy-2-methyl-1-phenyl-propan-1-one AIBN: azobisisobutyronitrile (initiator)

DODT: 1-dodecanethiol (chain transfer agent)

mPDMS: mono-n-butyl terminated monomethacryloxypropyl terminated polydimethylsiloxane ($M_n$=800-1500 daltons) (Gelest)

Norbloc: 2-(2'-hydroxy-5-methacrylyloxyethylphenyl)-2H-benzotriazole (Janssen)

Blue HEMA: 1-amino-4-[3-(4-(2-methacryloyloxy-ethoxy)-6-chlorotriazin-2-ylamino)-4-sulfophenylamino]anthraquinone-2-sulfonic acid, as described in U.S. Pat. No. 5,944,853

DIW: deionized water

Tween 80: polysorbate 80 or polyoxyethylene 20 sorbitan monooleate (Croda)

PPM: parts per million by weight

IPA: isopropyl alcohol

1E2P: 1-ethoxy-2-propanol

IPL: isopropyl lactate

Packing Solution: 0.84 weight percent sodium chloride, 0.91 weight percent boric acid, 0.24 weight percent sodium borate decahydrate, 0.01 weight percent disodium ethylenediaminetetraacetic acid, and 98 weight percent deionized water.

BAGE: Boric Acid Glycerol Ester (molar ratio of boric acid to glycerol was 1:2) 299.3 grams (mol) of glycerol and 99.8 grams (mol) of boric acid were dissolved in 1247.4 grams of a 5% (w/w) aqueous EDTA solution in a suitable reactor and then heated with stirring to 90-94° C. under mild vacuum (2-6 torr) for 4-5 hours and allowed to cool down to room temperature.

Pigments:

Titanium Dioxide: Cosmetic White C47-060 (Chempilots)

Iron Oxide Black: Sicovit Black 85 E172 (Chempilots)

Iron Oxide Brown: Sicovit Brown 75 E172 (Chempilots)

Iron Oxide Red: Sicovit Red 30 E172 (Chempilots)

Trans-Oxide Red: Trans Oxide Red AC1000 (Chempilots)

Iron Oxide Yellow: Sicovit Yellow 10 E172 (Chempilots)

Trans-Oxide Yellow: Trans Oxide Yellow AC0500 (Chempilots)

Phthalocyanine Blue: Phthalocyanine Blue 15 (Chempilots)
Phthalocyanine Green: Phthalocyanine Green (Chempilots)
Carbazole Violet: Carbazole Violet 23 (Chempilots)
Spectraval Blue (Merck KGaA, EMD Performance Materials)
Spectraval Green (Merck KGaA, EMD Performance Materials)
Spectraval Red (Merck KGaA, EMD Performance Materials)
Spectraval White (Merck KGaA, EMD Performance Materials)
Candurin® Gold Lustre (Merck KGaA, EMD Performance Materials

WORKING EXAMPLES

Clear Base Ink Preparation #1

A binding copolymer was made by free radical polymerization methods from HEMA and MAA using AIBN as the initiator and DODT as the chain transfer agent, having about 1.4 weight percent MAA repeating units. The copolymerization conditions can be varied to control the composition, molecular weight and molecular weight distribution of the binding copolymer. The composition was about 1.4 weight percent MAA repeating units, about 96.6 weight percent HEMA repeating units, about 2 weight percent DODT. The binding copolymer interacts and stabilizes the pigment/dye dispersion. The binding copolymer was dissolved in a solution of 4:1 (w/w) solution of IPL:1E2P in the concentration range from about 20 weight percent to about 40 weight percent. A typical binding copolymer concentration is 30 weight percent. The solution viscosity can be adjusted as desired by dilution with 4:1 (w/w) solution of IPL:1E2P or with 1-propanol. 1-Propanol is preferred.

Color Ink Preparations

Colored inks were prepared by mixing pigments and/or dyes into the clear base ink at certain concentrations to impart the desired colors, patterns, and/or effects in a cosmetic contact lens. The concentration of pigments and dyes can vary from about 1 weight percent to about 25 weight percent, depending on the opacity, translucency, or transparency of the printed layer. 1-Propanol can be added after the pigments and dyes have been added to adjacent viscosity or modify evaporation rates. In Table A, nine exemplary colored ink compositions are listed. The concentration of the specific pigment or dye is listed in weight percentages. The clear base ink contained about 30 weight percent of a binding copolymer composed of about 1.4 weight percent MAA repeating units, about 96.6 weight percent HEMA repeating units, about 2 weight percent DODT in a 4:1 (w/w) solution of IPL:1E2P. The Brookfield viscosities of these colored inks were reduced by adding 1-propanol to the initial pigment/dye dispersions so that the Brookfield viscosity was between about 5000 centipoise and about 8000 centipoise, preferably between about 5500 centipoise and 6500 centipoise.

TABLE A

Colored Ink Formulations
(pigment/dye concentrations in weight percentages)

| Colorant | Ink#1 Green | Ink#2 Grey | Ink#3 Blue | Ink#4 Pink | Ink#5 Yellow | Ink#6 Brown | Ink#7 Green | Ink#8 Gold | Ink#9 White |
|---|---|---|---|---|---|---|---|---|---|
| Red Iron Oxide | 0.0 | 0.0 | 0.0 | 2.3 | 0.4 | 0.0 | 0.0 | 0.0 | 0.0 |
| Phthalocyanine Blue | 0.1 | 0.0 | 0.2 | 0.0 | 0.0 | 0.0 | 0.0 | 0.0 | 0.0 |
| Titanium Dioxide | 0.0 | 3.3 | 3.8 | 3.8 | 0.0 | 0.0 | 0.0 | 0.0 | 0.0 |
| Trans-Oxide Yellow | 1.8 | 0.0 | 0.0 | 0.0 | 1.2 | 0.0 | 0.0 | 0.0 | 0.0 |
| Yellow Iron Oxide | 5.1 | 0.0 | 0.0 | 0.0 | 5.3 | 0.0 | 0.0 | 0.0 | 0.0 |
| Brown Iron Oxide | 0.0 | 0.0 | 0.0 | 1.0 | 0.6 | 3.1 | 0.0 | 0.0 | 0.0 |
| Black Iron Oxide | 0.0 | 1.3 | 0.0 | 0.0 | 0.0 | 7.3 | 0.0 | 0.0 | 0.0 |
| Trans-Oxide Red | 0.0 | 0.0 | 0.0 | 0.0 | 0.1 | 0.0 | 0.0 | 0.0 | 0.0 |
| Spectraval Green | 0.0 | 0.0 | 0.0 | 0.0 | 0.0 | 0.0 | 15.0 | 0.0 | 0.0 |
| Spectraval White | 0.0 | 0.0 | 0.0 | 0.0 | 0.0 | 0.0 | 0.0 | 0.0 | 10.0 |
| Gold Lustre | 0.0 | 0.0 | 0.0 | 0.0 | 0.0 | 0.0 | 0.0 | 10.0 | 0.0 |

Example 1

Figure 41A:
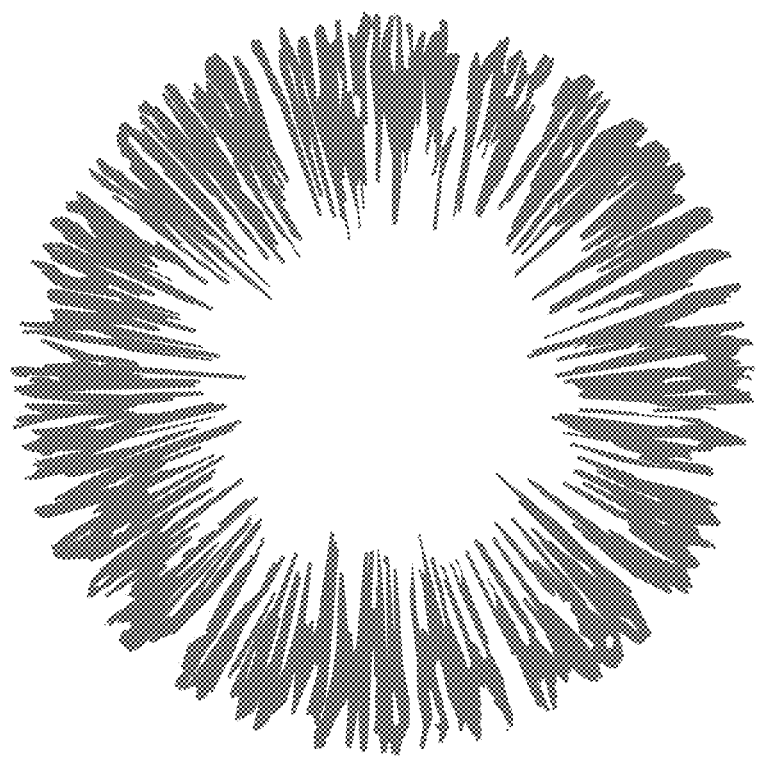
FIG. 41A is a diagrammatic representation of an effect layer cliché in accordance with the present invention.
Figure 41B:
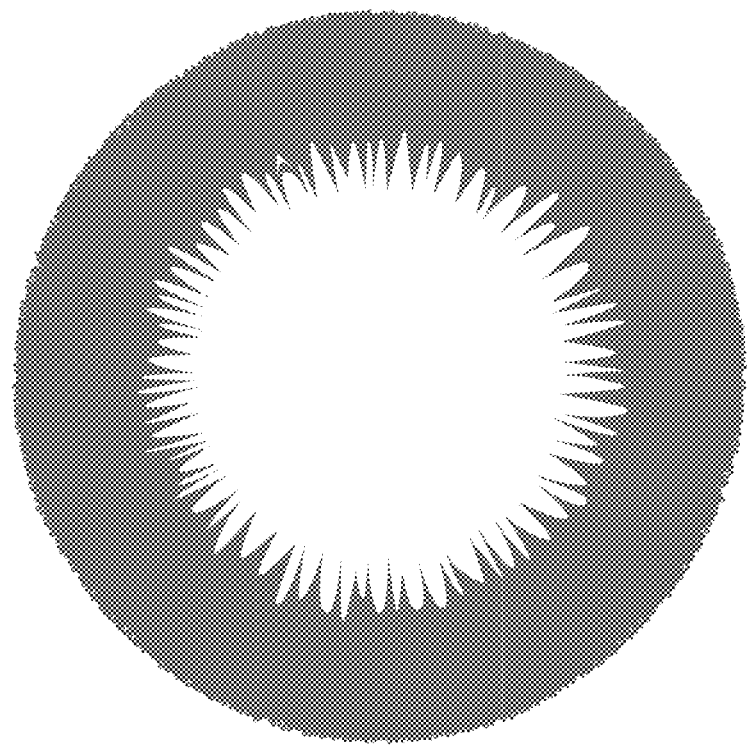
FIG. 41B is a diagrammatic representation of a barrier layer cliché having the pattern in accordance with the present invention.
Figure 41C:
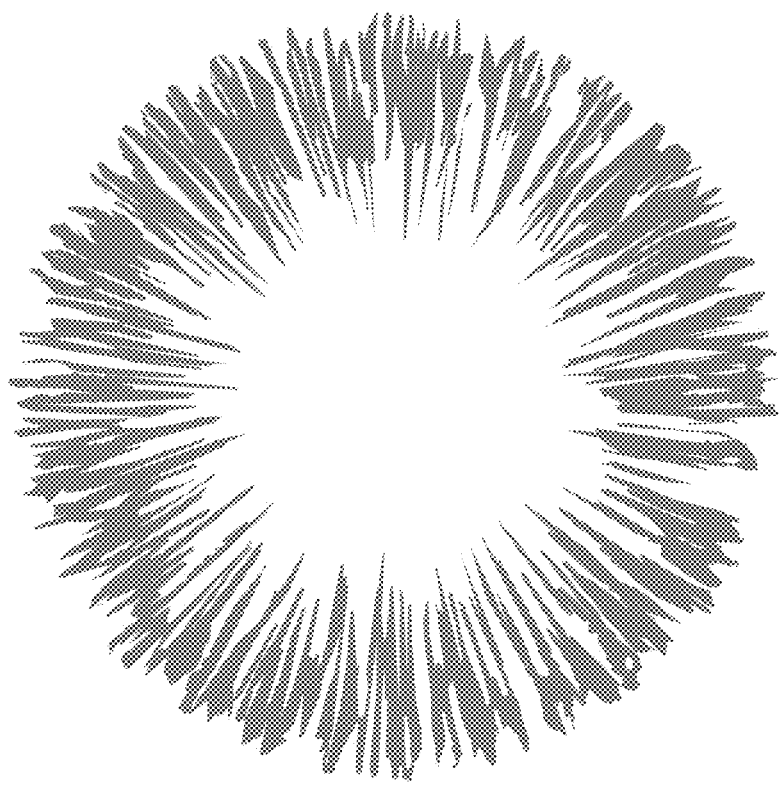
FIG. 41C is a diagrammatic representation of an effect cliché in accordance with the present invention.
Figure 41D:
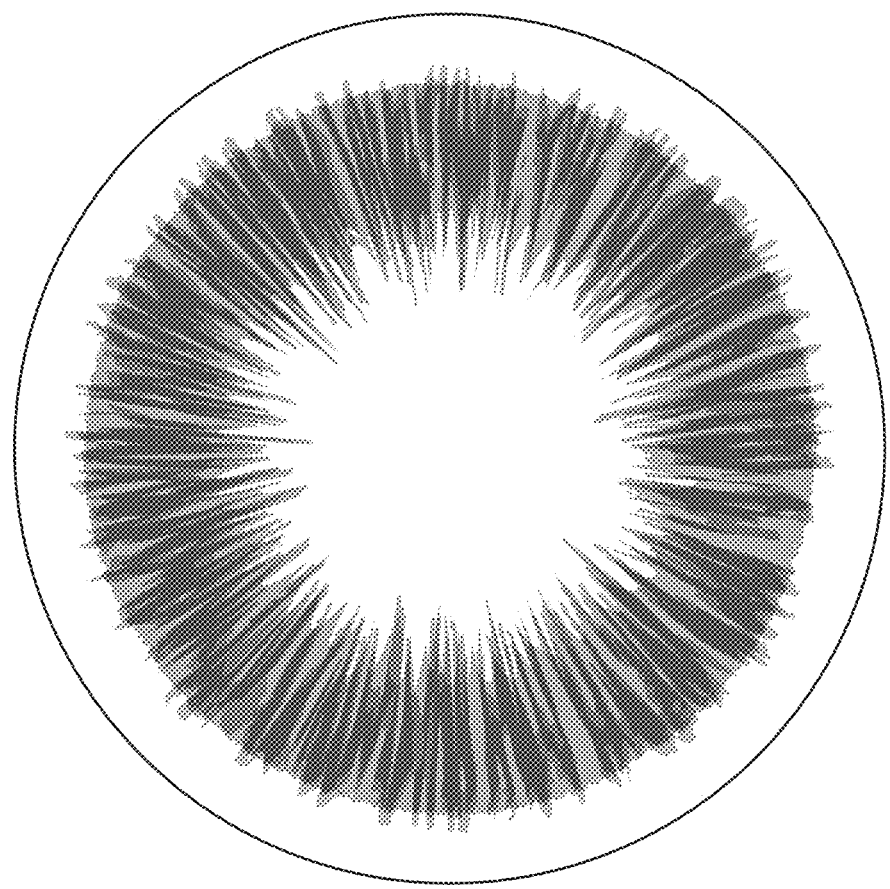
FIG. 41D is a diagrammatic representation of a printed pattern in accordance with the present invention.

Printed contact lenses were fabricated on an automated pilot manufacturing line capable of pad printing and contact lens fabrication wherein the oxygen gas level was maintained between 0.5 and 5%. Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat was pad printed onto the front curve mold. The front and base curve molds can be manufactured from any polymer; however, homopolymers, copolymers, and blends of PS, PP, TT, and Z are preferred. For example, the front curve mold was made from polystyrene, and the base curve mold from Zeonor. The front and base curve molds were degassed for about twelve hours prior to use. After the clear coat was sufficiently dry (dry enough to deposit the next layer without lifting or changing the clear coat), an effect layer cliché having the pattern shown in FIG. 41A was printed onto the clear coat using green ink #1. After the effect layer pattern was sufficiently dry (dry enough to deposit the next layer without lifting or changing the first print layer), a barrier layer cliché having the pattern shown in FIG. 41B was printed using grey ink #2. After the barrier layer was sufficiently dry (dry enough to deposit the next layer without lifting or changing the barrier print layer), an effect cliché having the pattern shown in FIG. 41C was printed using blue ink #3 thereby creating the pattern shown in FIG. 41D.

Once print layers have dried, about 100 microliters of RMM listed in Table B were dosed into the printed front curve mold at ambient temperature. The RMM was prepared by dissolving the reactive components in the relative amounts listed in Table B in BAGE to make a 52:48 (w/w) solution of reactive components to diluent. The base curve mold was then placed on top of the front curve mold. The pallets containing the mold assemblies were then moved into the curing tunnel at 60-70° C. The time between dosing the RMM and entering the curing chamber was controlled to allow the RMM to diffuse into the printed layers without smearing. The RMM was photopolymerized around the printed layers using 420 nanometer LEDs which were positioned above the pallets to achieve an intensity of about 5 mW/cm$^2$ for about 4 minutes.

The printed lenses were partially de-molded with most lenses adhering to the

FC and released from the BC and hydrated by submerging the lenses into DIW containing about 800 ppm Tween 80 at 70° C. for about one hour followed by equilibration in packing solution at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses were transferred into foil heat sealed blister packages and subsequently sterilized by autoclaving at 124° C. for about 18 minutes.

TABLE B

Reactive Monomer Mixture

| Component | Weight Percent |
|---|---|
| HEMA | 95 |
| MAA | 2 |
| EGDMA | 0.8 |
| TMPTMA | 0.08 |
| Norbloc | 1 |
| Blue-HEMA | 0.02 |
| Omnirad 1700 | 1.1 |
| Σ RMM Components | 100 |
| Diluent | BAGE |
| Diluent Concentration | 48 |

Example 2

Figure 42A:
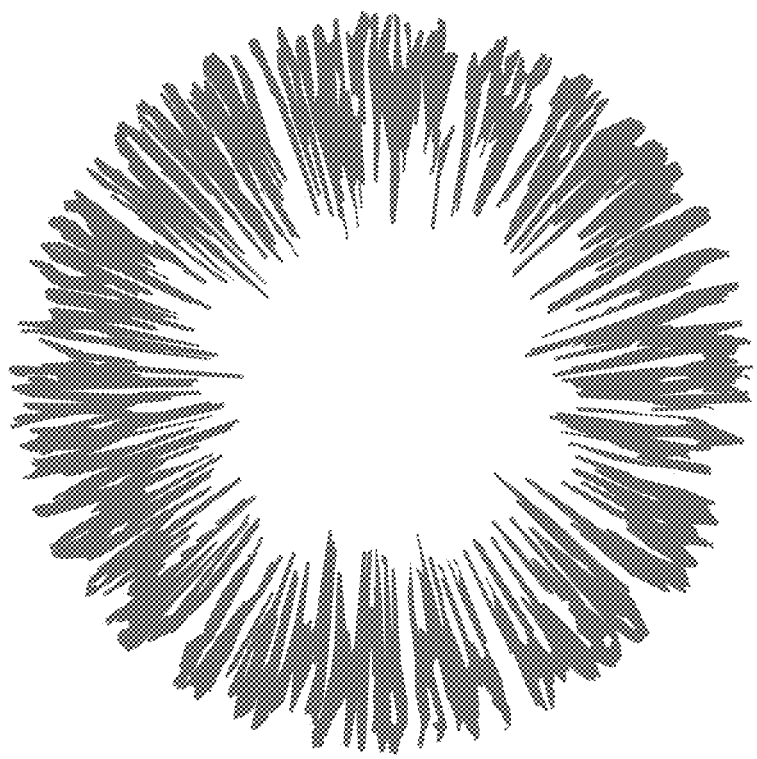
FIG. 42A is a diagrammatic representation of an effect layer cliché in accordance with the present invention.
Figure 42B:
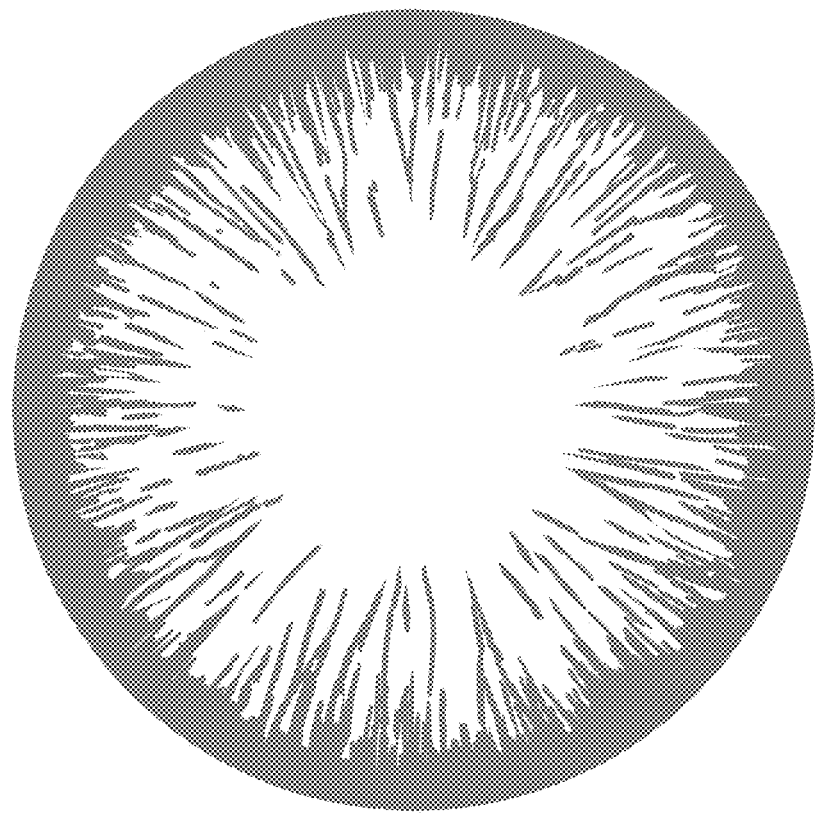
FIG. 42B is a diagrammatic representation of a barrier layer cliché having the pattern in accordance with the present invention.
Figure 42C:
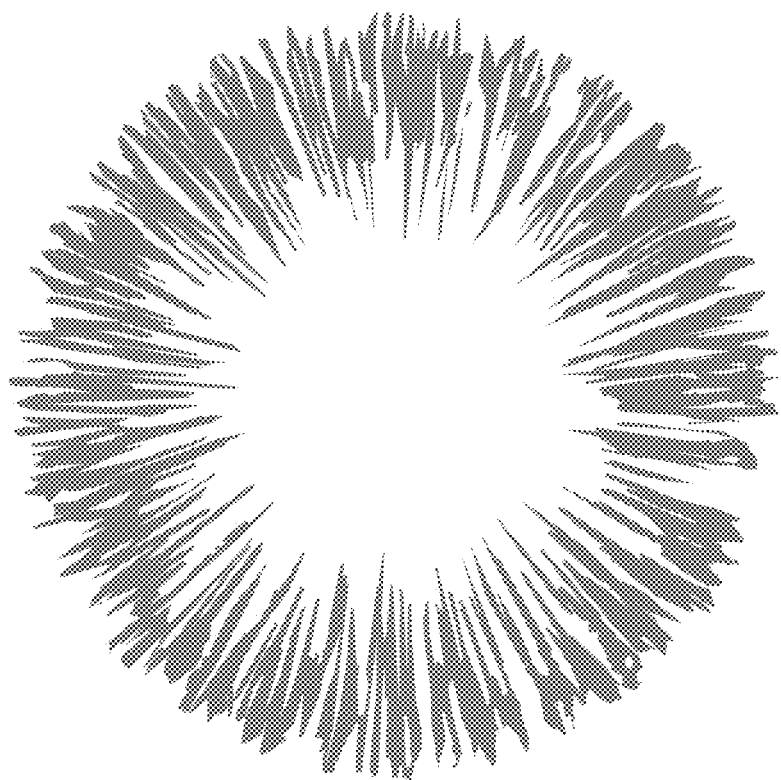
FIG. 42C is a diagrammatic representation of an effect cliché in accordance with the present invention.
Figure 42D:
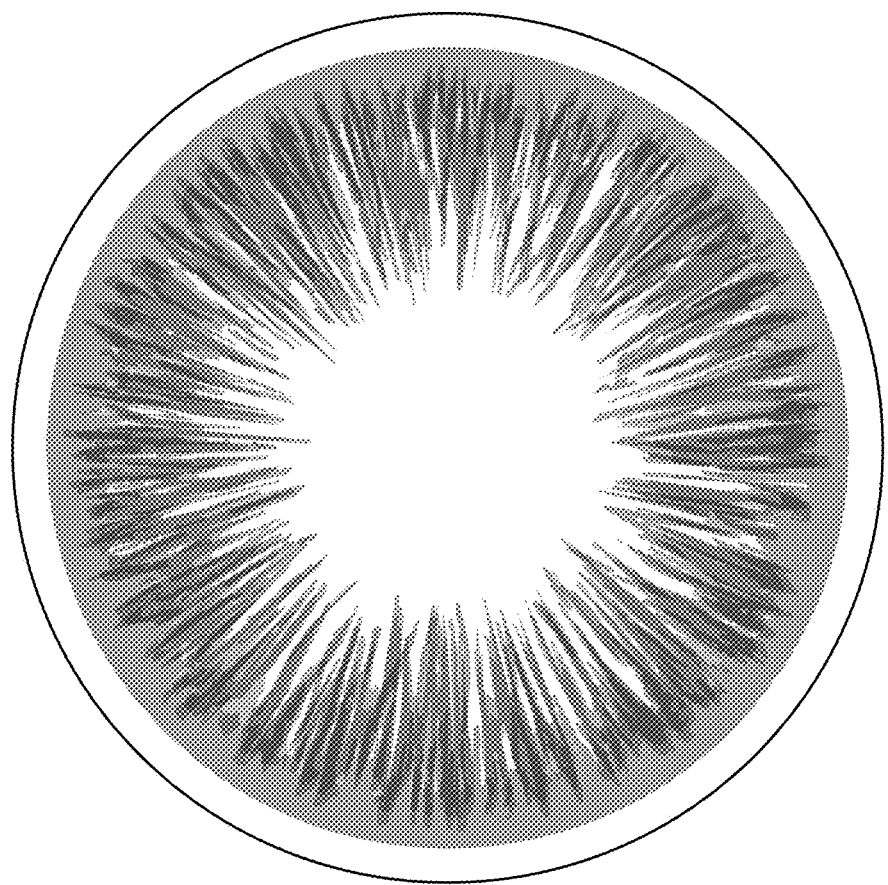
FIG. 42D is a diagrammatic representation of a printed pattern in accordance with the present invention.

Printed contact lenses were fabricated on an automated pilot manufacturing line capable of pad printing and contact lens fabrication wherein the oxygen gas level was maintained between 0.5 and 5% Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat was pad printed onto the front curve mold. The front and base curve molds can be manufactured from any polymer; however, homopolymers, copolymers, and blends of PS, PP, TT, and Z are preferred. For example, the front curve mold was made from polystyrene, and the base curve mold from Zeonor. The front and base curve molds were degassed for about twelve hours prior to use. After the clear coat was sufficiently dry (dry enough to deposit the next layer without lifting or changing the clear coat), an effect layer cliché having the pattern shown in FIG. 42A was printed onto the clear coat using gold ink #8, creating a sparkling effect. After the effect layer pattern was sufficiently dry (dry enough to deposit the next layer without lifting or changing the first print layer), a barrier layer cliché having the pattern shown in FIG. 42B was printed using white ink #9. After the barrier layer was sufficiently dry (dry enough to deposit the next layer without lifting or changing the barrier print layer), an effect layer cliché having the pattern shown in FIG. 42C was printed using pink ink #4 thereby creating the pattern shown in FIG. 42D.

Once print layers have dried, about 100 microliters of RMM listed in Table B were dosed into the printed front curve mold at ambient temperature. The RMM was prepared by dissolving the reactive components in the relative amounts listed in Table B in BAGE to make a 52:48 (w/w) solution of reactive components to diluent. The base curve mold was then placed on top of the front curve mold. The pallets containing the mold assemblies were then moved into the curing tunnel at 60-70° C. The time between dosing the RMM and entering the curing chamber was controlled to allow the RMM to diffuse into the printed layers without smearing. The RMM was photopolymerized around the printed layers using 420 nanometer LEDs which were positioned above the pallets to achieve an intensity of about 5 mW/cm$^2$ for about 4 minutes.

The printed lenses were partially de-molded with most lenses adhering to the FC and released from the BC and hydrated by submerging the lenses into DIW containing about 800 ppm Tween 80 at 70° C. for about one hour followed by equilibration in packing solutions at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses were transferred into foil heat sealed blister packages and subsequently sterilized by autoclaving at 124° C. for about 18 minutes.

Example 3

Printed contact lenses were fabricated on an automated pilot manufacturing line capable of pad printing and contact lens fabrication wherein the oxygen gas level was maintained between 0.5 and 5% Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat was pad printed onto the front curve mold. The front and base curve molds can be manufactured from any polymer; however, homopolymers, copolymers, and blends of PS, PP, TT, and Z are preferred. For example, the front curve mold was made from polystyrene, and the base curve mold from Zeonor. The front and base curve molds were degassed for about twelve hours prior to use. After the clear coat was sufficiently dry (dry enough to deposit the next layer without lifting or changing the clear coat), an effect layer cliché having the pattern shown in FIG. 15B was printed onto the clear coat using yellow ink #5. After the effect layer pattern was sufficiently dry (dry enough to deposit the next layer without lifting or changing the first print layer), a limbal pattern cliché having the pattern shown in FIG. 16A was printed onto the clear coat using brown ink #6. After the limbal pattern was sufficiently dry (dry enough to deposit the next layer without lifting or changing the limbal layer), an effect layer cliché having pattern shown in FIG. 15B was printed using green ink #7, creating a sparkling effect.

Once print layers have dried, about 100 microliters of RMM listed in Table B were dosed into the printed front curve mold at ambient temperature. The RMM was prepared by dissolving the reactive components in the relative amounts listed in Table B in BAGE to make a 52:48 (w/w) solution of reactive components to diluent. The base curve mold was then placed on top of the front curve mold. The pallets containing the mold assemblies were then moved into the curing tunnel at 60-70° C. The time between dosing the RMM and entering the curing chamber was controlled to allow the RMM to diffuse into the printed layers without smearing. The RMM was photopolymerized around the printed layers using 420 nanometer LEDs which were positioned above the pallets to achieve an intensity of about 5 mW/cm$^2$ for about 4 minutes.

The printed lenses were partially de-molded with most lenses adhering to the FC and released from the BC and hydrated by submerging the lenses into DIW containing about 800 ppm Tween 80 at 70° C. for about one hour followed by equilibration in packing solution at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses were transferred into foil heat sealed blister packages and subsequently sterilized by autoclaving at 124° C. for about 18 minutes.

Example 4

Printed contact lenses were fabricated on an automated pilot manufacturing line capable of pad printing and contact lens fabrication wherein the oxygen gas level was maintained between 0.5 and 5% Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat was pad printed onto the front curve mold. The front and base curve molds can be manufactured from any polymer; however, homopolymers, copolymers, and blends of PS, PP, TT, and Z are preferred. For example, the front curve mold was made from polystyrene, and the base curve mold from Zeonor. The front and base curve molds were degassed for about twelve hours prior to use. After the clear coat was sufficiently dry (dry enough to deposit the next layer without lifting or changing the clear coat), a limbal pattern cliché having the pattern shown in FIG. 16A was printed onto the clear coat using brown ink #6. After the limbal pattern was sufficiently dry (dry enough to deposit the next layer without lifting or changing the limbal layer), an effect layer cliché having the pattern shown in FIG. 15B was printed onto the clear coat using green ink #3. After the effect layer pattern was sufficiently dry (dry enough to deposit the next layer without lifting or changing the previous print layers), a barrier layer cliché having pattern shown in FIG. 16C was printed using grey ink #2. After the barrier layer was sufficiently dry (dry enough to deposit the next layer without lifting or changing the previous print layers), an effect layer cliché having pattern shown in FIG. 15B was printing using blue ink #3.

Once print layers have dried, about 100 microliters of RMM listed in Table B were dosed into the printed front curve mold at ambient temperature. The RMM was prepared by dissolving the reactive components in the relative amounts listed in Table B in BAGE to make a 52:48 (w/w) solution of reactive components to diluent. The base curve mold was then placed on top of the front curve mold. The pallets containing the mold assemblies were then moved into the curing tunnel at 60-70° C. The time between dosing the RMM and entering the curing chamber was controlled to allow the RMM to diffuse into the printed layers without smearing. The RMM was photopolymerized around the printed layers using 420 nanometer LEDs which were positioned above the pallets to achieve an intensity of about 5 mW/cm$^2$ for about 4 minutes.

The printed lenses were partially de-molded with most lenses adhering to the FC and released from the BC and hydrated by submerging the lenses into DIW containing about 800 ppm Tween 80 at 70° C. for about one hour followed by equilibration in packing solution at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses were transferred into foil heat sealed blister packages and subsequently sterilized by autoclaving at 124° C. for about 18 minutes.

PROPHETIC EXAMPLES

Clear Base Ink Preparation #1

A binding copolymer is made by free radical polymerization methods from HEMA and MAA using AIBN as the initiator and optionally DODT as the chain transfer agent, having about 1.4 weight percent MAA repeating units. The copolymerization conditions can be varied to control the composition, molecular weight and molecular weight distribution of the binding copolymer. A typical composition is about 1.4 weight percent MAA repeating units, about 96.6 weight percent HEMA repeating units, about 2 weight percent DODT. The binding copolymer interacts and stabilizes the pigment/dye dispersion. The binding copolymer is dissolved in a solution of 4:1 (w/w) solution of IPL:1E2P in the concentration range from about 20 weight percent to about 40 weight percent. A typical binding copolymer concentration is 30 weight percent. The solution viscosity can be adjusted as desired by dilution with 4:1 (w/w) solution of IPL:1 E2P or with 1-propanol. 1-Propanol is preferred.

Color Ink Preparations

Colored inks are prepared by mixing pigments and/or dyes into the clear base ink at certain concentrations to impart the desired colors, patterns, and/or effects in a cosmetic contact lens. The concentration of pigments and dyes may vary from about 1 weight percent to about 25 weight percent, depending on the opacity, translucency, or transparency of the printed layer. 1-Propanol can be added after the pigments and dyes have been added to adjacent viscosity or modify evaporation rates. In Table C, ten exemplary colored ink compositions are listed. The concentration of the specific pigment or dye is listed in weight percentages. The clear base ink contains about 30 weight percent of a binding copolymer composed of about 1.4 weight percent MAA repeating units, about 96.6 weight percent HEMA repeating units, about 2 weight percent DODT in a 4:1 (w/w) solution of IPL:1E2P. The Brookfield viscosities of these colored inks are reduced by adding 1-propanol to the initial pigment/dye dispersions so that the Brookfield viscosity is between about 5000 centipoise and about 8000 centipoise, preferably between about 5500 centipoise and 6500 centipoise.

TABLE C

Colored Ink Formulations
(pigment/dye concentrations in weight percentages)

| Colorant | Ink#10 Blue | Ink#12 Blue | Ink#13 Green | Ink#14 Grey | Ink#15 Orange | Ink#16 Brown | Ink#17 Blue | Ink#18 Green | Ink#19 Red | Ink#20 Black |
|---|---|---|---|---|---|---|---|---|---|---|
| Titanium Dioxide | 1 | 7 | 2 | 1.5 | 0 | 0 | 1 | 1 | 1 | 0 |
| Iron Oxide Black | 0.5 | 0 | 1 | 5 | 0 | 5.5 | 0.5 | 0 | 0 | 10 |
| Iron Oxide Brown | 0 | 0 | 5 | 0 | 0.5 | 4 | 0 | 0 | 0 | 0 |
| Iron Oxide Red | 0 | 4 | 0 | 0 | 0.3 | 0 | 0 | 0 | 0.5 | 0 |
| Trans-Oxide Red | 0 | 0 | 0 | 0 | 0.2 | 0 | 0 | 0 | 0 | 0 |
| Iron Oxide Yellow | 0 | 0 | 2.5 | 0 | 4 | 1.5 | 0 | 0.5 | 0 | 0 |
| Trans-Oxide Yellow | 0 | 0 | 0 | 0 | 1 | 0 | 0 | 0 | 0 | 0 |
| Phthalocyanine Blue | 1 | 2 | 0 | 0 | 0 | 0 | 0.5 | 0 | 0 | 0 |
| Phthalocyanine Green | 0 | 0 | 1.5 | 0 | 0 | 0 | 0 | 0.5 | 0 | 0 |
| Spectraval Blue | 0 | 0 | 0 | 0 | 0 | 0 | 3 | 0 | 0 | 0 |
| Spectraval Green | 0 | 0 | 0 | 0 | 0 | 0 | 0 | 4 | 0 | 0 |
| Spectraval Red | 0 | 0 | 0 | 0 | 0 | 0 | 0 | 0 | 5 | 0 |

Example 5

Printed contact lenses are fabricated in a glove box wherein the oxygen gas level was maintained between 0.5 and 5%. Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat is printed onto the front curve mold using a laboratory scale pad printer. The front and base curve molds can be manufactured from any polymer; however, homopolymers, copolymers, and blends of PS, PP, TT, and Z are preferred. The front and base curve molds are typically degassed for about twelve hours prior to use. After the clear coat has dried, a limbal cliché having the pattern shown in FIG. 14A is printed onto the clear coat using brown ink #16. After the limbal pattern has dried, an inner effect cliché having the pattern shown in FIG. 14B is printed onto the clear coat using orange ink #15. After the inner effect pattern has dried, an outer effect cliché having the pattern shown in FIG. 14C is printed onto the clear coat using grey ink #4 thereby creating the pattern shown in FIG. 14D. An optional barrier layer can be printed. For example, an outer effect cliché having the pattern shown in FIG. 14C can be printed onto the clear coat using black ink #20. A second clear coat can also be printed to separate the print layers for the non-inverted and inverted patterns. A limbal cliché having the pattern shown in FIG. 15A is now printed onto the clear coat using brown ink #16. After the limbal pattern has dried, an inner effect cliché having the pattern shown in FIG. 15B is printed onto the clear coat using red ink #19 which adds a different color and sparkle effect. After the inner effect pattern has dried, an outer effect cliché having the pattern shown in FIG. 15C is printed onto the clear coat using grey ink #14, thereby creating the pattern shown in FIG. 15D. The second set of print layers can also be rotationally offset from the first set of print layers so that some aspects of the first pattern can be seen through the second pattern and vice versa.

Once print layers have dried, about 100 microliters of RMM listed in Table B were dosed into the printed front curve mold at ambient temperature. The RMM is prepared by dissolving the reactive components in the relative amounts listed in Table B in BAGE to make a 52:48 (w/w) solution of reactive components to diluent. The base curve mold is then placed on top of the front curve mold. The pallets containing the mold assemblies are then moved into the curing tunnel at 60-70° C. The time between dosing the RMM and entering the curing chamber is controlled to allow the RMM to diffuse into the printed layers without smearing. The RMM is photopolymerized around the printed layers using 420 nanometer LEDs which are positioned above the pallets to achieve an intensity of about 5 mW/cm$^2$ for about 4 minutes.

The printed lenses are partially de-molded with most lenses adhering to the FC and released from the BC and hydrated by submerging the lenses into DIW containing about 800 ppm Tween 80 at 70° C. for about one hour followed by equilibration in packing solution at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses are transferred into vials and subsequently sterilized by autoclaving at 121° C. for about 30 minutes.

Example 6

Printed contact lenses are fabricated in a glove box wherein the oxygen gas level was maintained between 0.5 and 5%. Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat is printed onto the front curve mold using a laboratory scale pad printer. The front and base curve molds can be manufactured from any polymer; however, homopolymers, copolymers, and blends of PS, PP, TT, and Z are preferred. The front and base curve molds are typically degassed for about twelve hours prior to use. After the clear coat has dried, a limbal cliché having the pattern shown in FIG. 14A is printed onto the clear coat using blue ink #12. After the limbal pattern has dried, an inner effect cliché having the pattern shown in FIG. 14B is printed onto the clear coat using green ink #13. After the inner effect pattern has dried, an outer effect cliché having the pattern shown in FIG. 14C is printed onto the clear coat using grey ink #14 thereby creating the pattern shown in FIG. 14D. An optional barrier layer can be printed. For example, an outer effect cliché having the pattern shown in FIG. 14C can be printed onto the clear coat using black ink #20. A second clear coat can also be printed to separate the print layers for the non-inverted and inverted patterns. A limbal cliché having the pattern shown in FIG. 15A is now printed onto the clear coat using blue ink #10. After the limbal pattern has dried, an inner effect cliché having the pattern shown in FIG. 15B is printed onto the clear coat using green ink #18 which is a different green color and sparkle effect. After the inner effect pattern has dried, an outer effect cliché having the pattern shown in FIG. 15C is printed onto the clear coat using blue ink #12, thereby creating the pattern shown in FIG. 15D. The second set of print layers can also be rotationally offset from the first set of print layers so that some aspects of the first pattern can be seen through the second pattern and vice versa.

Once print layers have dried, about 100 microliters of RMM listed in Table B were dosed into the printed front curve mold at ambient temperature. The RMM is prepared by dissolving the reactive components in the relative amounts listed in Table B in BAGE to make a 52:48 (w/w) solution of reactive components to diluent. The base curve mold is then placed on top of the front curve mold. The pallets containing the mold assemblies are then moved into the curing tunnel at 60-70° C. The time between dosing the RMM and entering the curing chamber is controlled to allow the RMM to diffuse into the printed layers without smearing. The RMM is photopolymerized around the printed layers using 420 nanometer LEDs which are positioned above the pallets to achieve an intensity of about 5 mW/cm² for about 4 minutes.

The printed lenses are partially de-molded with most lenses adhering to the FC and released from the BC and hydrated by submerging the lenses into DIW containing about 800 ppm Tween 80 at 70° C. for about one hour followed by equilibration in packing solution at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses are transferred into vials and subsequently sterilized by autoclaving at 121° C. for about 30 minutes.

Example 7

Printed contact lenses are fabricated in a glove box wherein the oxygen gas level was maintained between 0.5 and 5%. Using front curve molds and base curve molds designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation, an annular clear coat is printed onto the front curve mold using a laboratory scale pad printer. The front and base curve molds can be manufactured from any polymer; however, homopolymers, copolymers, and blends of PS, PP, TT, and Z are preferred. The front and base curve molds are typically degassed for about twelve hours prior to use. After the clear coat has dried, a limbal cliché having the pattern shown in FIG. 14A is printed onto the clear coat using brown ink #16. After the limbal pattern has dried, an inner effect cliché having the pattern shown in FIG. 14B is printed onto the clear coat using green ink #18. After the inner effect pattern has dried, a thin clear layer is printed to render a depth or three dimensionality effect. After the clear layer has dried, an outer effect cliché having the pattern shown in FIG. 14C is printed onto the clear coat using black ink #20 thereby creating the pattern shown in FIG. 14D. An optional barrier layer can be printed. A second clear coat can also be printed to separate the print layers for the non-inverted and inverted patterns. A limbal cliché having the pattern shown in FIG. 15A is now printed onto the clear coat using grey ink #14. After the limbal pattern has dried, an inner effect cliché having the pattern shown in FIG. 15B is printed onto the clear coat using red ink #17 which is a different color while maintaining a sparkle effect. After the inner effect pattern has dried, an outer effect cliché having the pattern shown in FIG. 15C is printed onto the clear coat using black ink #20, thereby creating the pattern shown in FIG. 15D. The second set of print layers can also be rotationally offset from the first set of print layers so that some aspects of the first pattern can be seen through the second pattern and vice versa.

Once print layers have dried, about 100 microliters of RMM listed in Table B were dosed into the printed front curve mold at ambient temperature. The RMM is prepared by dissolving the reactive components in the relative amounts listed in Table B in BAGE to make a 52:48 (w/w) solution of reactive components to diluent. The base curve mold is then placed on top of the front curve mold. The pallets containing the mold assemblies are then moved into the curing tunnel at 60-70° C. The time between dosing the RMM and entering the curing chamber is controlled to allow the RMM to diffuse into the printed layers without smearing. The RMM is photopolymerized around the printed layers using TL03 light bulbs which are positioned above the pallets to achieve an intensity of about 5 mW/cm² for about 4 minutes.

The printed lenses are partially de-molded with most lenses adhering to the FC and released from the BC and hydrated by submerging the lenses into DIW containing about 800 ppm Tween 80 at 70° C. for about one hour followed by equilibration in packing solution at 70° C. for another hour. A person of ordinary skill recognizes that the exact lens release process can be varied depending on the lens formulation and mold materials. The purpose of the lens release process is to release all lenses without defects and transition from diluent swollen networks to the packing solution swollen hydrogels. The lenses are transferred into vials and subsequently sterilized by autoclaving at 121° C. for about 30 minutes.

Example 8

For silicone hydrogel RMM like senofilcon A, the binding copolymers are usually different than for conventional or HEMA based RMM. Binding copolymers made from HEMA and silicone monomers or macromers are typically required to stabilize the inks formulations and control RMM diffusion, for instance, a copolymer made from HEMA and mPDMS. Such copolymers can be random copolymers or block copolymers. Ink formulations can also contain other polymers such as poly(N-vinylpyrrolidone) to better control diffusion of the RMM through the print layers. Otherwise, the process of making a reversible cosmetic contact lens from a silicone hydrogel formulation is identical to the one described in detail for conventional hydrogels, namely sequentially printing two cosmetic patterns on the front curve mold using optimized silicone hydrogel inks, dispersing the silicone hydrogel RMM onto the printed front curve, laying the base curve mold on top of the front curve mold, and curing the RMM between the two molds, wherein the front and base curve molds are designed to make contact lenses having the dSag less than 1.3% between the non-inverted and inverted lens orientation or alternatively having the apex height as measured from an edge apex to a nearest surface of the eye is less than or equal to 0.020 millimeters in the inverted orientation. The curing conditions for silicone hydrogel formulation are usually different than for conventional hydrogel formulations. The lens release and extraction protocols are also usually different for silicone hydrogel lenses than for conventional hydrogel lenses, requiring an organic solvent or aqueous alcohol solution.

A typical silicone hydrogel lens release and extraction method is described as follows: The printed lenses were de-molded with most lenses adhering to the FC and released by submerging the lenses in 70 percent IPA for about one or two hours, followed by washing two times with 70 percent IPA, optionally two times with 25 percent IPA, two times with DIW, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were transferred into vials or packages and subsequently sterilized by autoclaving at 122° C. for 30 minutes.

What is claimed is:

1. A reversible eye enhancement contact lens, the reversible eye enhancement lens comprising:
   a. a main body, comprising a first surface and a second surface opposite the first surface, the main body having a diameter, a base curve, a peripheral thickness, and a center thickness;
   b. wherein, one or more of the diameter, the base curve, the peripheral thickness, or the center thickness are configured such that a dSag is less than 1.3% when comparing a first orientation of the main body with at least a portion of the first surface abutting an eye of a wearer and a second orientation of the main body with at least a portion of the second surface abutting the eye of the wearer;
   c. the main body also comprising a first region corresponding to the scleral region of an eye; a second region corresponding to the limbal region of an eye; a third region corresponding to an iris region of an eye;
   d. wherein colorants are incorporated into the first region, the second region, the third region, or combinations thereof in the form of at least partially overlapping printed layers with a first design observable in the first orientation that is different than a second design observable in the second orientation.

2. The reversible eye enhancement contact lens according to claim 1, wherein the printed layers comprise designs that highlight the iris, using inner and outer effect design graphics, on top of one another, wherein at least the first design or second design is opaque.

3. The reversible eye enhancement contact lens according to claim 1, wherein the printed layers comprise at least two designs as first design and a second design that highlight the iris, using inner and outer effect design graphics, on top of one another with some level of overlap and with a barrier layer in-between.

4. The reversible eye enhancement contact lens according to claim 1 or 3 wherein at least the first or second designs are translucent.

5. The reversible eye enhancement contact lens according to one of claim 1 or 3 wherein the barrier layer is at least partially opaque.

6. The reversible eye enhancement contact lens according to claim 5 wherein the barrier layer forms a common limbal design graphic with at least the first design or second design.

7. The reversible eye enhancement contact lens according to claim 1 wherein at least the first design and second design highlight the iris, using inner and outer effect design graphics, such that the inner and outer effect design graphics create a blending effect between the first design and the second design.

8. The reversible eye enhancement contact lens according to claim 7 wherein the inner or outer effect design graphics that produce the blending effect are translucent or opaque.

9. The reversible eye enhancement contact lens according to claim 7 wherein only a first design includes a blending effect, and the first design and second design are separated by a barrier layer.

10. The reversible eye enhancement contact lens according to claim 7 wherein at least the first design or second design includes limbal design graphics.

11. The reversible eye enhancement contact lens according to claim 1 or 3 wherein the printed layers further comprise one or more clear layers that produce an observable depth for the first design or second design.

12. The reversible eye enhancement contact lens according to claim 1, further comprising an annular shaped clear coat base layer overlying the first, second and third regions.

13. The reversible eye enhancement contact lens according to claim 12, further comprising a bulk lens material covering the annular shaped clear coat base layer and the first, second and third regions.

14. The reversible eye enhancement contact lens of any one of claims 1 to 3, wherein the first design and second design differ in colorant, color, limbal design graphics, inner effect design graphics, outer effect design graphics, barrier layers, clear coat base layers, or combinations thereof.

15. The reversible eye enhancement contact lens of any one of claims 1 to 3, wherein the colorants comprise metal oxide pigments, coated metal oxide pigments, organic dyes, interference pigments, and combinations thereof.

16. The reversible eye enhancement contact lens of any one of claims 1 to 3, wherein, one or more of the diameter, the base curve, the peripheral thickness, or the center thickness are configured such that a dSag is less than 1.2% when comparing a first orientation of the main body with at least a portion of the first surface abutting an eye of a wearer and a second orientation of the main body with at least a portion of the second surface abutting the eye of the wearer.

17. The reversible eye enhancement contact lens of any one of claims 1 to 3, wherein, one or more of the diameter, the base curve, the peripheral thickness, or the center thickness are configured such that a dSag is less than 1.1% when comparing a first orientation of the main body with at least a portion of the first surface abutting an eye of a wearer and a second orientation of the main body with at least a portion of the second surface abutting the eye of the wearer.

18. The reversible eye enhancement contact lens of any one of claims 1 to 3, wherein, one or more of the diameter, the base curve, the peripheral thickness, or the center thickness are configured such that a dSag is less than 1.0% when comparing a first orientation of the main body with at least a portion of the first surface abutting an eye of a wearer and a second orientation of the main body with at least a portion of the second surface abutting the eye of the wearer.

19. The reversible eye enhancement contact lens of any one of claims 1 to 3, wherein the main body exhibits a modulus of elasticity of between 150 kPa and 1000 kPa as measured in accordance with ANSI Z80.20.

20. The reversible eye enhancement contact lens of claim 19, wherein the main body exhibits a modulus of elasticity between 270 kPa and 1000 kPa as measured in accordance with ANSI Z80.20.

21. The reversible eye enhancement contact lens of claim 19, wherein the main body exhibits a modulus of elasticity between 420 kPa and 1000 kPa as measured in accordance with ANSI Z80.20.

22. The reversible eye enhancement contact lens of any one of claims 1 to 3, wherein the diameter of the main body is between 13.8 millimeters and 15 millimeters.

23. The reversible eye enhancement contact lens of claim 22, wherein the diameter of the main body is between 14.3 millimeters and 14.8 millimeters.

24. The reversible eye enhancement contact lens of any one of claims 1 to 3, wherein the base curve of the main body is between 8 millimeters and 8.6 millimeters.

25. The reversible eye enhancement contact lens of claim 24, wherein the base curve of the main body is between 8 millimeters and 8.3 millimeters.

26. The reversible eye enhancement contact lens of claim 25, wherein the base curve of the main body is between 8 millimeters and 8.1 millimeters.

27. The reversible eye enhancement contact lens of any one of claims 1 to 3, wherein the center thickness of the main body is between 0.06 millimeters and 0.2 millimeters.

28. The reversible eye enhancement contact lens of claim 27, wherein the center thickness of the main body is between 0.1 millimeters and 0.2 millimeters.

29. A pad printing method of making the reversible eye enhancement contact lens of any one of claims 1 to 3 comprising the steps of:
   a. Printing an annular clear base layer on the front curve mold;
   b. Printing at least two effect layers on the annular clear base layer, comprising limbal design graphics, inner effect design graphics, outer effect design graphics, and combinations thereof;
   c. Optionally, printing at least one barrier layer between the effect layers;
   d. Optionally, printing at least one other annular clear base layer between effect layers;
   e. Dispensing a reactive monomer mixture of the bulk lens material onto the front curve mold;
   f. Curing the reactive monomer mixture of the bulk lens material around the clear base layer and effect layers;
   g. Removing the molds from the lens;
   h. Optionally, extracting the lens with solvents; and
   i. Optionally, sterilizing the lens by autoclaving'
   wherein the effect layers are in the form of at least partially overlapping printed layers with a first design observable in the first orientation that is different than a second design observable design in the second orientation.

30. The pad printing method of claim 29 wherein the first design and second design highlight the iris, create limbal rings, brighten the sclera, and combinations thereof.

31. A reversible eye enhancement contact lens, the reversible eye enhancement lens comprising:
   a. a main body
   b. comprising a first surface and a second surface opposite the first surface, the main body having a diameter, a base curve, a peripheral thickness, and a center thickness;
   c. wherein, the edge profile and one or more of the diameter, the base curve, or the thickness profile are configured such that an apex height measured from an edge apex to a nearest surface of the eye is less than or equal to 0.020 millimeters when the lens is in an inverted orientation with at least a portion of the second surface abutting the eye of the wearer;
   d. the main body further comprising a first region corresponding to the scleral region of an eye; a second region corresponding to the limbal region of an eye; a third region corresponding to an iris region of an eye;
   e. wherein the colorants are incorporated into the first region, the second region, the third region, or combinations thereof in the form of at least partially overlapping printed layers with a first design observable in the first orientation that is different than a second design observable in the second orientation.

32. The reversible eye enhancement contact lens according to claim 31, further comprising an annular shaped clear coat base layer overlying the first, second and third regions.

33. The reversible eye enhancement contact lens according to claim 31, further comprising a bulk lens material covering both the annular shaped clear coat base layer and the first, second and third regions.

34. The reversible eye enhancement contact lens of any one of claims 31 to 33, wherein the first design and second design in the first and second orientations differ in colorant, color, limbal design graphics, inner effect design graphics, outer effect design graphics, barrier layers, clear coat base layers, or combinations thereof.

35. The reversible eye enhancement contact lens of any one of claims 31 to 33, wherein the colorants comprise metal oxide pigments, coated metal oxide pigments, organic dyes, interference pigments, and combinations thereof.

36. The reversible eye enhancement contact lens of any one of claims 31 to 33, wherein the edge profile and one or more of the diameter, the base curve, or the thickness profile are configured such that a dSag is less than 1.2% when comparing a first orientation of the main body with at least a portion of the first surface abutting an eye of a wearer and a second orientation of the main body with at least a portion of the second surface abutting the eye of the wearer.

37. The reversible eye enhancement contact lens of any one of claims 31 to 33, wherein the edge profile and one or more of the diameter, the base curve, or the thickness profile are configured such that a dSag is less than 1.1% when comparing a first orientation of the main body with at least a portion of the first surface abutting an eye of a wearer and a second orientation of the main body with at least a portion of the second surface abutting the eye of the wearer.

38. The reversible eye enhancement contact lens of any one of claims 31 to 33, wherein the edge profile and one or more of the diameter, the base curve, or the thickness profile are configured such that a dSag is less than 1.0% when comparing a first orientation of the main body with at least a portion of the first surface abutting an eye of a wearer and a second orientation of the main body with at least a portion of the second surface abutting the eye of the wearer.

39. The reversible eye enhancement contact lens of any one of claims 31-33, wherein the main body exhibits a modulus of elasticity of between 150 kPa and 1000 kPa as measured in accordance with ANSI Z80.20.

40. The reversible eye enhancement contact lens of claim 39, wherein the main body exhibits a modulus of elasticity between 270 kPa and 1000 kPa as measured in accordance with ANSI Z80.20.

41. The reversible eye enhancement contact lens of claim 40, wherein the main body exhibits a modulus of elasticity between 420 kPa and 1000 kPa as measured in accordance with ANSI Z80.20.

42. The reversible eye enhancement contact lens of any one of claims 31 to 33, wherein the diameter of the main body is between 13.8 millimeters and 15 millimeters.

43. The reversible eye enhancement contact lens of claim 42, wherein the diameter of the main body is between 14.3millimeters and 14.8 millimeters.

44. The reversible eye enhancement contact lens of claim 43, wherein the base curve of the main body is between 8 millimeters and 8.6 millimeters.

45. The reversible eye enhancement contact lens of claim 44, wherein the base curve of the main body is between 8 millimeters and 8.3 millimeters.

46. The reversible eye enhancement contact lens of claim 45, wherein the base curve of the main body is between 8 millimeters and 8.1 millimeters.

47. The reversible eye enhancement contact lens of any one of claims 31 to 33, wherein the center thickness of the main body is between 0.06 millimeters and 0.2 millimeters.

48. The reversible eye enhancement contact lens of claim 47, wherein the center thickness of the main body is between 0.1 millimeters and 0.2 millimeters.

49. A pad printing method of making the reversible eye enhancement contact lens of any one of claims 31 to 33 comprising the steps of:
  a. Printing an annular clear base layer on the front curve mold;
  b. Printing at least two effect layers on the annular clear base layer, comprising limbal design graphics, inner effect design graphics, outer effect design graphics, and combinations thereof;
  c. Optionally, printing at least one barrier layer between the effect layers;
  d. Optionally, printing at least one other annular clear base layer between effect layers;
  e. Dispensing a reactive monomer mixture of the bulk lens material onto the front curve mold;
  f. Curing the reactive monomer mixture of the bulk lens material around the clear base layer and effect layers;
  g. Removing the molds from the lens;
  h. Optionally, extracting the lens with solvents; and
  i. Optionally, sterilizing the lens by autoclaving'
  wherein the effect layers are in the form of at least partially overlapping printed layers with a first design observable in the first orientation that is different than a second design observable design in the second orientation.

50. The pad printing method of claim 49 wherein the first design and second design highlight the iris, create limbal rings, brighten the sclera, and combinations thereof.

51. A kit comprising at least one pair of reversible eye enhancement contact lens according to any one of claim 1 or 31 wherein each lens has a first design that provides a subtle change to the observed design relative to the observed eye and a second design that provides a substantial change to the observed design relative to the observed eye.

* * * * *